United States Patent
Peng et al.

(10) Patent No.: US 11,750,442 B2
(45) Date of Patent: Sep. 5, 2023

(54) FAULT DETERMINING METHOD AND APPARATUS

(71) Applicant: Huawei Technologies Co., Ltd., Shenzhen (CN)

(72) Inventors: Wenjie Peng, Shanghai (CN); Mingzeng Dai, Shenzhen (CN); Jun Wang, Shanghai (CN); Dongdong Wei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 17/345,836

(22) Filed: Jun. 11, 2021

(65) Prior Publication Data

US 2021/0344555 A1 Nov. 4, 2021

Related U.S. Application Data

(63) Continuation of application No. PCT/CN2019/125374, filed on Dec. 13, 2019.

(30) Foreign Application Priority Data

Dec. 14, 2018 (CN) .......................... 201811535528.3

(51) Int. Cl.
*H04L 41/0677* (2022.01)
*H04W 76/18* (2018.01)
*H04L 1/08* (2006.01)
*H04W 4/40* (2018.01)

(52) U.S. Cl.
CPC ............ *H04L 41/0677* (2013.01); *H04L 1/08* (2013.01); *H04W 76/18* (2018.02); *H04W 4/40* (2018.02)

(58) Field of Classification Search
None
See application file for complete search history.

(56) References Cited

U.S. PATENT DOCUMENTS

| 1,818,496 | A | * | 8/1931 | Milmoe | ................... B65B 23/18 |
| | | | | | 53/579 |
| 10,009,911 | B2 | * | 6/2018 | Zaus | ...................... H04W 24/10 |
| 10,484,926 | B2 | * | 11/2019 | Panteleev | ............. H04W 28/04 |

(Continued)

FOREIGN PATENT DOCUMENTS

| CN | 101931982 A | 12/2010 |
| CN | 105684529 A | 6/2016 |

(Continued)

OTHER PUBLICATIONS

3GPP TR 21.914 V1.1.0, "3rd Generation Partnership Project, Technical Specification Group Services and System Aspects, Release 14 Description, Summary of Rel-14 Work Items (Release 14)", Feb. 2018, 104 pages.

(Continued)

*Primary Examiner* — Deepa Belur
(74) *Attorney, Agent, or Firm* — Slater Matsil, LLP

(57) ABSTRACT

A fault determining method, includes: a first terminal device monitors a parameter of a sidelink between the first terminal device and a second terminal device, to determine whether a unicast connection on the sidelink satisfies a first condition; and when the unicast connection satisfies the first condition, the first terminal device determines that the unicast connection is faulty.

12 Claims, 9 Drawing Sheets

(56) References Cited

U.S. PATENT DOCUMENTS

| | | | |
|---|---|---|---|
| 2015/0249572 A1* | 9/2015 | Mack-Crane | H04L 45/54 709/222 |
| 2017/0324645 A1* | 11/2017 | Johnsen | H04L 69/22 |
| 2017/0331577 A1* | 11/2017 | Parkvall | H04B 7/0848 |
| 2017/0347341 A1* | 11/2017 | Zhang | H04L 12/189 |
| 2017/0353273 A1* | 12/2017 | Zhang | H04L 1/1671 |
| 2018/0206176 A1* | 7/2018 | Panteleev | H04W 72/1268 |
| 2018/0255610 A1* | 9/2018 | Adachi | H04W 8/08 |
| 2018/0324577 A1* | 11/2018 | Faccin | H04W 76/27 |
| 2019/0132778 A1* | 5/2019 | Park | H04B 7/0695 |
| 2019/0364492 A1* | 11/2019 | Azizi | H04W 52/0261 |
| 2020/0059915 A1* | 2/2020 | Lee | H04W 72/0406 |
| 2020/0092692 A1* | 3/2020 | Wang | H04W 76/14 |
| 2020/0100088 A1* | 3/2020 | Kim | H04W 48/16 |
| 2020/0136760 A1* | 4/2020 | Hahn | H04W 72/04 |
| 2020/0154511 A1* | 5/2020 | Pan | H04W 76/40 |
| 2020/0178343 A1* | 6/2020 | Kim | H04W 76/27 |
| 2020/0252989 A1* | 8/2020 | Chen | H04L 5/0048 |
| 2022/0029691 A1* | 1/2022 | Yu | H04W 76/19 |

FOREIGN PATENT DOCUMENTS

| | | | | |
|---|---|---|---|---|
| CN | 108235363 A | | 6/2018 | |
| JP | 2017026415 A | | 2/2017 | |
| TW | 201729554 A | | 8/2017 | |
| WO | 2013181421 A2 | | 12/2013 | |
| WO | WO-2017133644 A1 | * | 8/2017 | H04L 45/124 |
| WO | 2018027799 A1 | | 2/2018 | |
| WO | 2018059700 A1 | | 4/2018 | |
| WO | 2018120871 A | | 7/2018 | |

OTHER PUBLICATIONS

3GPP TS 36.331 V15.3.0, "3rd Generation Partnership Project, Technical Specification Group Radio Access Network, Evolved Universal Terrestrial Radio Access (E-UTRA), Radio Resource Control (RRC), Protocol specification (Release 15)", Sep. 2018, 918 pages.

3GPP TS 38.300 V15.3.1, "3rd Generation Partnership Project, Technical Specification Group Radio Access Network, NR, NR and NG-RAN Overall Description, Stage 2 (Release 15)", Oct. 2018, 92 pages.

3GPP TS 38.301 V15.3.0, "3rd Generation Partnership Project, Technical Specification Group Radio Access Network, NR, Radio Resource Control (RRC) protocol specification (Release 15)", Sep. 2018, 445 pages.

LG (rapporteur), "Report of [103bis#38] SL unicast/groupcast (LG)", 3GPP TSG-RAN WG2 #104, R2-1818496, Nov. 12-16, 2018, 20 pages, Spokane USA.

3GPP TS 36.300 V15.3.0 (Sep. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15), 358 pages.

* cited by examiner

FAULT DETERMINING METHOD AND APPARATUS

CROSS-REFERENCE TO RELATED APPLICATIONS

This application is a continuation of International Application No. PCT/CN2019/125374, filed on Dec. 13, 2019, which claims priority to Chinese Patent Application No. 201811535528.3, filed on Dec. 14, 2018. The disclosures of the aforementioned applications are herein incorporated by reference in their entireties.

TECHNICAL FIELD

This application relates to the field of communications technologies, and in particular, to a fault determining method and an apparatus.

BACKGROUND

Vehicle-to-everything (V2X) is a key technology of a future intelligent transport system (ITS), and includes vehicle-to-vehicle (V2V) direct communication, vehicle-to-infrastructure (V2I) direct communication, vehicle-to-pedestrian (V2P) direct communication, and vehicle-to-network (V2N) communication interaction. The V2X technology can well adapt to different application scenarios. Traffic information, such as real-time road conditions, roads, and pedestrians, can be obtained through communication, greatly improving traffic safety, reducing congestion, and improving traffic efficiency. In addition, the V2X technology provides a basic platform for easy implementation of autonomous driving, intelligent transport, and internet of vehicles innovation with low costs.

Data packets may be transmitted between terminal devices over a unicast connection on a sidelink (SL) in the V2X. If the unicast connection is faulty, a long period of time may be spent in recovering the unicast connection. Consequently, a service may be interrupted for a long period of time.

SUMMARY

Embodiments of this application provide a fault determining method and an apparatus, to monitor a unicast connection on a sidelink, so as to determine a fault as early as possible.

According to a first aspect, a first fault determining method is provided. The method includes: A first terminal device monitors a parameter of a sidelink between the first terminal device and a second terminal device, to determine whether a unicast connection on the sidelink satisfies a first condition. When the unicast connection satisfies the first condition, the first terminal device determines that the unicast connection is faulty.

The method may be performed by a first communications apparatus. The first communications apparatus may be a terminal device or a communications apparatus that can support a terminal device in implementing a required function of the method. Certainly, the first communications apparatus may alternatively be another communications apparatus, for example, a chip system. Herein, that the first communications apparatus is the first terminal device is used as an example. The first terminal device may be a vehicle, a vehicle-mounted communications apparatus, a vehicle-mounted communications chip, or the like that has a corresponding communication function.

In this embodiment of this application, the first terminal device may monitor the parameter of the sidelink, to determine whether the unicast connection on the sidelink is faulty. This is equivalent to that the fault may be determined as early as possible by monitoring the sidelink. For example, the fault may be determined at an early stage, and the fault may be resolved when data packet transmission is not severely affected. This helps reduce a probability that a service is delayed or even interrupted due to the fault of the unicast connection, and improve service transmission continuity.

With reference to the first aspect, in a possible implementation of the first aspect, the first condition includes one or any combination of the following: a measurement result of a CSI reference signal transmitted over the unicast connection on the sidelink is less than a CSI measurement threshold; a measurement result of a CBR of a resource configured for the sidelink is greater than a CBR measurement threshold; a quantity of retransmissions of a data packet transmitted over the unicast connection on the sidelink at an RLC layer is greater than or equal to a first quantity of retransmissions; a quantity of retransmissions of a data packet transmitted over the unicast connection on the sidelink at a MAC layer is greater than or equal to a second quantity of retransmissions; a quantity of times that a quantity of retransmissions of a data packet transmitted over the unicast connection on the sidelink at a MAC layer is greater than or equal to a second quantity of retransmissions is greater than or equal to a third quantity of times; a result of an integrity check performed on a data packet transmitted over the unicast connection on the sidelink indicates that the check fails; a decryption result of a data packet transmitted over the unicast connection on the sidelink indicates that the decryption fails; out-of-synchronization information of the unicast connection on the sidelink indicates that the first terminal device and the second terminal device are out of synchronization; a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

The foregoing conditions may occur when quality of the unicast connection is poor or the unicast connection is faulty. Therefore, these conditions can be used to determine whether the unicast connection is faulty. Certainly, the first condition in the embodiments of this application is not limited thereto. Any condition that can be used to determine whether the unicast connection is faulty may be included in the first condition.

With reference to the first aspect, in a possible implementation of the first aspect, the method further includes: The first terminal device sends a first message to a network device. The first message is used to indicate that the unicast connection is faulty, or the first message includes first indication information, and the first indication information is used to indicate that the unicast connection is faulty.

After determining that the unicast connection is faulty or that the unicast connection does not satisfy the first condition, the first terminal device may indicate, to the network device, that the unicast connection is faulty, so that the network device may perform processing, for example, reconfigure the unicast connection to recover the unicast connection as soon as possible.

With reference to the first aspect, in a possible implementation of the first aspect, the first message further includes second indication information, and the second indication information is used to indicate the unicast connection.

The first indication information may indicate only a unicast connection fault. If there are a plurality of unicast connections between the first terminal device and the second terminal device, the network device may not determine a specific faulty unicast connection. Therefore, in addition to the first indication information, the first message may further include the second indication information, where the second indication information is used to indicate a faulty unicast connection, so that the network device can determine the faulty unicast connection, and then perform targeted processing.

With reference to the first aspect, in a possible implementation of the first aspect, the first condition includes one or any combination of the following: the measurement result of the CSI reference signal is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the first message further includes third indication information, and the third indication information is used to indicate a resource used by the unicast connection.

For the parameters of the sidelink, for example, the measurement result of the CSI, the measurement result of the CBR, the quantity of retransmissions at the RLC layer, the quantity of retransmissions at the MAC layer, the quantity of times that the quantity of retransmissions of the data packet transmitted over the unicast connection on the sidelink at the MAC layer is greater than the second quality of retransmissions, or the QoS parameter, values may be related to the resource used by the unicast connection. If the values of the parameters of the sidelink indicate that the unicast connection is faulty, the fault may be probably caused by relatively poor quality of the resource used by the unicast connection. Therefore, if the first condition includes one or any combination of the following: the measurement result of the CSI reference signal is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter, the first message may further include the third indication information, and the third indication information may be used to indicate the resource used by the unicast connection. Therefore, after receiving the first message, the network device may determine the resource used by the unicast connection. For example, the network device may consider to recover the unicast connection by reconfiguring the resource used by the unicast connection, so that the network device performs more targeted processing, improving processing efficiency.

With reference to the first aspect, in a possible implementation of the first aspect, the first message further includes fourth indication information, and the fourth indication information includes the first condition satisfied by the unicast connection.

Because the fault of the unicast connection is indicated to the network device, the network device may be more expected to indicate to recover the unicast connection as soon as possible. Therefore, to accelerate a processing speed of the network device, the first message may further include the fourth indication information, and the fourth indication information may include the first condition satisfied by the unicast connection. After receiving the first message, the network device can determine an issue of the unicast connection based on the fourth indication information. This helps the network device determine a more targeted means for recovering the unicast connection.

With reference to the first aspect, in a possible implementation of the first aspect, the method further includes: The first terminal device stops sending a data packet over the unicast connection, and continues receiving a data packet over the unicast connection.

If the first terminal device finds, in a process of sending a data packet to the second terminal device over the unicast connection, that the unicast connection satisfies the first condition, after determining that the unicast connection is faulty or determining that the unicast connection satisfies the first condition, the first terminal device may stop sending the data packet to the second terminal device over the unicast connection, to avoid a data packet transmission failure. On the sidelink, a sending process and a receiving process are independent of each other. For the unicast connection, sending and receiving processes in different directions may correspond to different configurations. For example, a configuration of the first terminal device that corresponds to the unicast connection and that serves as a signal sending end and a configuration of the second terminal device that corresponds to the unicast connection and that serves as a signal receiving end may have an issue. Consequently, the first terminal device finds that the unicast connection is faulty. However, a configuration of the second terminal device that corresponds to the unicast connection and that serves as a signal sending end and a configuration of the first terminal device that corresponds to the unicast connection and that serves as a signal receiving end may still be normal. Therefore, if the first terminal device still receives data over the unicast connection, a process of receiving data by the first terminal device can still be performed.

With reference to the first aspect, in a possible implementation of the first aspect, the method further includes: The first terminal device obtains first configuration information, where the first configuration information is used to recover the unicast connection.

For example, the first terminal device may receive the first configuration information from the network device. For example, if the first terminal device sends the first message to the network device, the network device may determine a new configuration for the unicast connection, where the new configuration is the first configuration information for the first terminal device side. The network device may send the first configuration information to the first terminal device, and the first terminal device may recover the unicast connection based on the first configuration information. Alternatively, the first terminal device may determine the first configuration information by itself. For example, the first terminal device does not send the first message to the network device, but determines the first configuration information after determining that the unicast connection is faulty, to recover the unicast connection based on the first configuration information. In this manner, the first terminal device does not need to excessively interact with the network device. This helps reduce signaling overheads, and the first terminal device has relatively high intelligence.

With reference to the first aspect, in a possible implementation of the first aspect, the method further includes: The first terminal device sends second configuration information to the second terminal device, where the second configuration information is used to recover the unicast connection.

The first terminal device may recover the unicast connection based on the first configuration information. The second terminal device also requires corresponding configuration information to recover the unicast connection. For example, the network device may determine the first configuration information and the second configuration information for the unicast connection. The first configuration information is configuration information used by the first terminal device to recover the unicast connection, and the second configuration information is configuration information used by the second terminal device to recover the unicast connection. The network device may send both the first configuration information and the second configuration information to the first terminal device, and the first terminal device forwards the second configuration information to the second terminal device. Alternatively, the first terminal device may determine the first configuration information and the second configuration information for the unicast connection. The first configuration information is configuration information used by the first terminal device to recover the unicast connection, and the second configuration information is configuration information used by the second terminal device to recover the unicast connection. The first terminal device may send the second configuration information to the second terminal device. Alternatively, the network device may determine the first configuration information for the unicast connection. The first configuration information is configuration information used by the first terminal device to recover the unicast connection. The network device may send the first configuration information to the first terminal device. The first terminal device determines the second configuration information based on the first configuration information, and then forwards the second configuration information to the second terminal device. The second configuration information is configuration information used by the second terminal device to recover the unicast connection. Alternatively, the network device may determine the first configuration information for the unicast connection. The first configuration information is configuration information used by the first terminal device to recover the unicast connection. The network device may send the first configuration information to the first terminal device, and the first terminal device forwards the first configuration information to the second terminal device. The second terminal device performs adaptation based on the first configuration information, to obtain configuration information (which may be referred to as, for example, third configuration information) used by the second terminal device to recover the unicast connection. In this case, the first configuration information is the same as the second configuration information, the second configuration information is not the configuration information used by the second terminal device to recover the unicast connection, and the third configuration information is the configuration information used by the second terminal device to recover the unicast connection.

With reference to the first aspect, in a possible implementation of the first aspect, that the first terminal device sends second configuration information to the second terminal device includes: The first terminal device sends the second configuration information to the second terminal device through an SRB, where the SRB has a dedicated sending resource; the first terminal device sends the second configuration information to the second terminal device by using a resource used to specially process the unicast connection fault; or the first terminal device sends the second configuration information to the second terminal device through first upper layer signaling.

The first terminal device may send the second configuration information to the second terminal device through an AS layer, or may send the second configuration information to the second terminal device through an upper layer. This is not specifically limited.

With reference to the first aspect, in a possible implementation of the first aspect, the method further includes: The AS layer of the first terminal device triggers notification information to an application layer of the first terminal device, where the notification information is used to indicate that the sidelink is unavailable.

For example, the first terminal device may preferentially send the second configuration information to the second terminal device through the AS layer. If resources at the AS layer are unavailable, or the second configuration information fails to be sent at the AS layer, the first terminal device sends the second configuration information to the second terminal device through the upper layer. In this case, if a connection of the upper layer is also disconnected, for example, the first terminal device does not receive a response from the second terminal device after sending the first upper layer signaling to the second terminal device, the connection of the upper layer may be unreachable. For example, the first terminal device is excessively far away from the second terminal device. Consequently, sidelinks, including a unicast link and a broadcast link, are unreachable. In this case, the first terminal device may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. For example, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection. Alternatively, when the first terminal device sends the second configuration information to the second terminal device through the AS layer, if resources at the AS layer are unavailable, that is, a connection of the AS layer is disconnected, for example, the first terminal device does not receive a response from the second terminal device after sending the second configuration information to the second terminal device through the SRB, the connection of the AS layer may be unreachable. In this case, the first terminal device does not need to send the second configuration information through the upper layer, but may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. For example, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection. Alternatively, when the first terminal device sends the second configuration information to the second terminal device through the upper layer (not through the AS layer), if resources at the upper layer are unavailable, that is, a connection of the upper layer is disconnected, for example, the first terminal device does not receive a response from the second terminal device after sending the second configuration information to the second terminal device through the first upper layer signaling, the connection of the upper layer may be unreachable. In this case, the first terminal device may trigger an indication to the application layer of the first terminal device, to indicate that a current sidelink is unavailable. For example, an upper layer (where in this case, the upper layer is not the application layer) of the first terminal device sends the notification information to the application layer of the first terminal device, where the notification information is used to indicate that the current sidelink is unavailable. The notification information is actually a type of trigger information. After receiving the indication, the application layer may select a Uu interface to transmit a service carried on the unicast connection. Alternatively, if the first terminal device determines that the unicast connection is faulty or determines that the unicast connection satisfies the first condition, the first terminal device may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. For example, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection.

With reference to the first aspect, in a possible implementation of the first aspect, the method further includes: The first terminal device updates a configuration of the unicast connection to a default configuration. The first terminal device negotiates a new configuration of the unicast connection with the second terminal device by applying the unicast connection having the default configuration.

In this implementation, neither the first terminal device nor the network device needs to send configuration information to the second terminal device, and the network device does not need to send configuration information to the first terminal device either. For example, when determining that the unicast connection is faulty or determining that the unicast connection satisfies the first condition, the first terminal device may send an exception indication to the second terminal device, to indicate that the unicast connection between the first terminal device and the second terminal device is faulty. In this case, both the first terminal device and the second terminal device can update the configuration of the unicast connection to the default configuration. The first terminal device and the second terminal device may negotiate the new configuration of the unicast connection over the unicast connection having the default configuration. After the negotiation, the first terminal device and the second terminal device may update the unicast connection to the new configuration, to recover the unicast connection. That is, a default configuration is set for the unicast connection. The default configuration is, for example, a basic configuration. If the unicast connection is faulty, both the first terminal device and the second terminal device roll back to the default configuration, and negotiate a new configuration based on the default configuration. In this manner, neither interaction needs to be performed with the network device, nor configuration information needs to be sent to the first terminal device and the second terminal device. This helps reduce signaling overheads. In addition, the two terminal devices negotiate the new configuration by themselves, so that the negotiated new configuration better satisfies an actual requirement.

According to a second aspect, a second fault determining method is provided. The method includes: A first terminal device receives a second message from a second terminal device. The first terminal device determines, based on the second message or based on fifth indication information included in the second message, that a unicast connection on a sidelink between the first terminal device and the second terminal device is faulty.

The method may be performed by a second communications apparatus. The second communications apparatus may be a terminal device or a communications apparatus that can support a terminal device in implementing a required function of the method. Certainly, the second communications apparatus may alternatively be another communications apparatus, for example, a chip system. Herein, that the second communications apparatus is the first terminal device is used as an example. The first terminal device may be a vehicle, a vehicle-mounted communications apparatus, a vehicle-mounted communications chip, or the like that has a corresponding communication function.

In this embodiment of this application, regardless of whether a terminal device is connected to or is not connected to a network device, the terminal device may monitor the unicast connection. For example, the second terminal device may monitor a parameter of the sidelink, to determine whether the unicast connection on the sidelink is faulty. This is equivalent to that the fault may be determined as early as possible by monitoring the sidelink. For example, the fault may be determined at an early stage, and the fault may be resolved when data packet transmission is not severely affected. This helps reduce a probability that a service is delayed or even interrupted due to the fault of the unicast connection, and improve service transmission continuity.

With reference to the second aspect, in a possible implementation of the second aspect, the method further includes: The first terminal device forwards the second message to a network device, and the first terminal device receives first configuration information from the network device or generates first configuration information, where the first configuration information is used to recover the unicast connection.

For example, the first terminal device may receive the first configuration information from the network device. For example, if the first terminal device forwards the second message to the network device, the network device may determine a new configuration for the unicast connection, where the new configuration is the first configuration information for the first terminal device side. The network device may send the first configuration information to the first terminal device, and the first terminal device may recover the unicast connection based on the first configuration information. Alternatively, the first terminal device may determine the first configuration information by itself. For example, the first terminal device does not send the second message to the network device, but determines the first configuration information after determining that the unicast connection is faulty, to recover the unicast connection based on the first configuration information. In this manner, the first terminal device does not need to excessively interact with the network device. This helps reduce signaling overheads, and the first terminal device has relatively high intelligence.

With reference to the second aspect, in a possible implementation of the second aspect, the method further includes: The first terminal device sends second configuration information to the second terminal device, where the second configuration information is used to recover the unicast connection.

The first terminal device may recover the unicast connection based on the first configuration information. The second terminal device also requires corresponding configuration information to recover the unicast connection. For example, the network device may determine the first configuration information and the second configuration information for the unicast connection. The first configuration information is configuration information used by the first terminal device to recover the unicast connection, and the second configuration information is configuration information used by the second terminal device to recover the unicast connection. The network device may send both the first configuration information and the second configuration information to the first terminal device, and the first terminal device forwards the second configuration information to the second terminal device. Alternatively, the first terminal device may determine the first configuration information and the second configuration information for the unicast connection. The first configuration information is configuration information used by the first terminal device to recover the unicast connection, and the second configuration information is configuration information used by the second terminal device to recover the unicast connection. The first terminal device may send the second configuration information to the second terminal device. Alternatively, the network device may determine the first configuration information for the unicast connection. The first configuration information is configuration information used by the first terminal device to recover the unicast connection. The network device may send the first configuration information to the first terminal device. The first terminal device determines the second configuration information based on the first configuration information, and then forwards the second configuration information to the second terminal device. The second configuration information is configuration information used by the second terminal device to recover the unicast connection. Alternatively, the network device may determine the first configuration information for the unicast connection. The first configuration information is configuration information used by the first terminal device to recover the unicast connection. The network device may send the first configuration information to the first terminal device, and the first terminal device forwards the first configuration information to the second terminal device. The second terminal device performs adaptation based on the first configuration information, to obtain configuration information (which may be referred to as, for example, third configuration information) used by the second terminal device to recover the unicast connection. In this case, the first configuration information is the same as the second configuration information, the second configuration information is not the configuration information used by the second terminal device to recover the unicast connection, and the third configuration information is the configuration information used by the second terminal device to recover the unicast connection.

With reference to the second aspect, in a possible implementation of the second aspect, that the first terminal device sends second configuration information to the second terminal device includes: The first terminal device sends the second configuration information to the second terminal device through an SRB, where the SRB has a dedicated sending resource; the first terminal device sends the second configuration information to the second terminal device by using a resource used to specially process the unicast connection fault; or the first terminal device sends the second configuration information to the second terminal device through first upper layer signaling.

The first terminal device may send the second configuration information to the second terminal device through an AS layer, or may send the second configuration information to the second terminal device through an upper layer. This is not specifically limited.

With reference to the second aspect, in a possible implementation of the second aspect, the method further includes: The AS layer of the first terminal device triggers notification information to an application layer of the first terminal device, where the notification information is used to indicate that the sidelink is unavailable.

For example, the first terminal device may preferentially send the second configuration information to the second terminal device through the AS layer. If resources at the AS layer are unavailable, or the second configuration information fails to be sent at the AS layer, the first terminal device sends the second configuration information to the second terminal device through the upper layer. In this case, if a connection of the upper layer is also disconnected, for example, the first terminal device does not receive a response from the second terminal device after sending the first upper layer signaling to the second terminal device, the connection of the upper layer may be unreachable. For example, the first terminal device is excessively far away from the second terminal device. Consequently, sidelinks, including a unicast link and a broadcast link, are unreachable. In this case, the first terminal device may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. For example, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection. Alternatively, when the first terminal device sends the second configuration information to the second terminal device through the AS layer, if resources at the AS layer are unavailable, that is, a connection of the AS layer is disconnected, for example, the first terminal device does not receive a response from the second terminal device after sending the second configuration information to the second terminal device through the SRB, the connection of the AS layer may be unreachable. In this case, the first terminal device does not need to send the second configuration information through the upper layer, but may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. For example, the indication may be triggered by the AS layer of the first terminal device to the application layer, or may be triggered by an upper layer (where in this case, the upper layer is not the application layer) of the first terminal device for the application layer. After receiving the indication, the application layer may select a Uu interface to transmit a service carried on the unicast connection. Alternatively, when the first terminal device sends the second configuration information to the second terminal device through the upper layer (not through the AS layer), if resources at the upper layer are unavailable, that is, a connection of the upper layer is disconnected, for example, the first terminal device does not receive a response from the second terminal device after sending the second configuration information to the second terminal device through the first upper layer signaling, the connection of the upper layer may be unreachable. In this case, the first terminal device may trigger an indication to the application layer of the first terminal device, to indicate that a current sidelink is unavailable. For example, an upper layer (where in this case, the upper layer is not the application layer) of the first terminal device sends the notification information to the application layer of the first terminal device, where the notification information is used to indicate that the current sidelink is unavailable. The notification information is actually a type of trigger information. After receiving the indication, the application layer may select a Uu interface to transmit a service carried on the unicast connection. Alternatively, if the first terminal device determines that the unicast connection is faulty or determines that the unicast connection satisfies the first condition, the first terminal device may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. For example, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection.

With reference to the second aspect, in a possible implementation of the second aspect, the method further includes: The first terminal device updates a configuration of the unicast connection to a default configuration, where the unicast connection is the faulty unicast connection. The first terminal device negotiates a new configuration of the unicast connection with the second terminal device by applying the unicast connection having the default configuration.

In this implementation, neither the first terminal device nor the network device needs to send configuration information to the second terminal device, and the network device does not need to send configuration information to the first terminal device either. For example, when determining that the unicast connection is faulty or determining that the unicast connection satisfies the first condition, the first terminal device may send an exception indication to the second terminal device, to indicate that the unicast connection between the first terminal device and the second terminal device is faulty. In this case, both the first terminal device and the second terminal device can update the configuration of the unicast connection to the default configuration. The first terminal device and the second terminal device may negotiate the new configuration of the unicast connection over the unicast connection having the default configuration. After the negotiation, the first terminal device and the second terminal device may update the unicast connection to the new configuration, to recover the unicast connection. That is, a default configuration is set for the unicast connection. The default configuration is, for example, a basic configuration. If the unicast connection is faulty, both the first terminal device and the second terminal device roll back to the default configuration, and negotiate a new configuration based on the default configuration. In this manner, neither interaction needs to be performed with the network device, nor configuration information needs to be sent to the first terminal device and the second terminal device. This helps reduce signaling overheads. In addition, the two terminal devices negotiate the new configuration by themselves, so that the negotiated new configuration better satisfies an actual requirement.

With reference to the second aspect, in a possible implementation of the second aspect, that a first terminal device receives a second message from a second terminal device includes: The first terminal device receives the second message from the second terminal device through an SRB, where the SRB has a dedicated sending resource; the first terminal device receives the second message from the second terminal device by using a resource used to specially process the unicast connection fault; or the first terminal device receives the second message from the second terminal device through second upper layer signaling.

The second terminal device may send the second message to the first terminal device through an AS layer, or may send the second message to the first terminal device through an upper layer. This is not specifically limited.

According to a third aspect, a third fault determining method is provided. The method includes: A second terminal device monitors a parameter of a sidelink, to determine whether a unicast connection on the sidelink satisfies a first condition. When the unicast connection satisfies the first condition, the second terminal device sends a second message to a first terminal device. The second message is used to indicate that the unicast connection is faulty, or the second message includes fifth indication information, and the fifth indication information is used to indicate that the unicast connection is faulty.

The method may be performed by a third communications apparatus. The third communications apparatus may be a terminal device or a communications apparatus that can support a terminal device in implementing a required function of the method. Certainly, the third communications apparatus may alternatively be another communications apparatus, for example, a chip system. Herein, that the third communications apparatus is the second terminal device is used as an example. The second terminal device may be a vehicle, a vehicle-mounted communications apparatus, a vehicle-mounted communications chip, or the like that has a corresponding communication function.

With reference to the third aspect, in a possible implementation of the third aspect, the first condition includes one or any combination of the following: a measurement result of a CSI reference signal transmitted over the unicast connection on the sidelink is less than a CSI measurement threshold; a measurement result of a CBR of a resource configured for the sidelink is greater than a CBR measurement threshold; a quantity of retransmissions of a data packet transmitted over the unicast connection on the sidelink at an RLC layer is greater than or equal to a first quantity of retransmissions; a quantity of retransmissions of a data packet transmitted over the unicast connection on the sidelink at a MAC layer is greater than or equal to a second quantity of retransmissions; a quantity of times that a quantity of retransmissions of a data packet transmitted over the unicast connection on the sidelink at a MAC layer is greater than or equal to a second quantity of retransmissions is greater than or equal to a third quantity of times; a result of an integrity check performed on a data packet transmitted over the unicast connection on the sidelink indicates that the check fails; a decryption result of a data packet transmitted over the unicast connection on the sidelink indicates that the decryption fails; out-of-synchronization information of the unicast connection on the sidelink indicates that the first terminal device and the second terminal device are out of synchronization; a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

With reference to the third aspect, in a possible implementation of the third aspect, the second message further includes sixth indication information, and the sixth indication information is used to indicate the unicast connection.

With reference to the third aspect, in a possible implementation of the third aspect, the first condition includes one or any combination of the following: the measurement result of the CSI is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the second message further includes seventh indication information, and the seventh indication information is used to indicate a resource used by the unicast connection.

With reference to the third aspect, in a possible implementation of the third aspect, the second message further includes eighth indication information, and the eighth indication information includes the first condition satisfied by the unicast connection.

With reference to the third aspect, in a possible implementation of the third aspect, that the second terminal device sends a second message to a first terminal device includes: The second terminal device sends the second message to the first terminal device through an SRB, where the SRB has a dedicated sending resource; the second terminal device sends the second message to the first terminal device by using a resource used to specially process the unicast connection fault; or the second terminal device sends the second message to the first terminal device through second upper layer signaling.

With reference to the third aspect, in a possible implementation of the third aspect, the method further includes: The second terminal device stops sending a data packet over the unicast connection, and continues receiving a data packet over the unicast connection.

With reference to the third aspect, in a possible implementation of the third aspect, the method further includes: The second terminal device receives second configuration information from the first terminal device, where the second configuration information is used to recover the unicast connection.

With reference to the third aspect, in a possible implementation of the third aspect, that the second terminal device receives second configuration information from the first terminal device includes: The second terminal device receives the second configuration information from the first terminal device through an SRB, where the SRB has a dedicated sending resource; the second terminal device receives the second configuration information from the first terminal device by using a resource used to specially process the unicast connection fault; or the second terminal device receives the second configuration information from the first terminal device through first upper layer signaling.

With reference to the third aspect, in a possible implementation of the third aspect, the method further includes: The second terminal device updates a configuration of the unicast connection to a default configuration. The second terminal device negotiates a new configuration of the unicast connection with the first terminal device by applying the unicast connection having the default configuration.

For technical effects brought by the third aspect or the implementations of the third aspect, refer to the descriptions of technical effects of the first aspect or the related implementations of the first aspect, or refer to the descriptions of technical effects of the second aspect or the related implementations of the second aspect.

According to a fourth aspect, a first type of communications apparatus is provided. The communications apparatus is, for example, the first communications apparatus in the foregoing descriptions, for example, the first terminal device. The communications apparatus has functions of implementing the first terminal device in the method designs. The first terminal device is, for example, a vehicle, a vehicle-mounted communications apparatus, or a vehicle-mounted communications chip that has a corresponding communication function. The communications apparatus includes, for example, a processor and a transceiver that are coupled to each other. The transceiver is implemented as, for example, a communications interface. The communications interface herein may be understood as a radio frequency transceiver component in the first terminal device. The radio frequency transceiver component is implemented by using, for example, an antenna, a feeder, and a codec. The communications apparatus may further include a memory, configured to store instructions. The processor executes the instructions to implement a corresponding solution provided in the first aspect or the implementations of the first aspect. For example, the processor is configured to monitor a parameter of a sidelink between the communications apparatus and a second terminal device, to determine whether a unicast connection on the sidelink satisfies a first condition; and the processor is further configured to: when the unicast connection satisfies the first condition, determine that the unicast connection is faulty.

With reference to the fourth aspect, in a possible implementation of the fourth aspect, the first condition includes one or any combination of the following: a measurement result of a CSI reference signal transmitted over the unicast connection on the sidelink is less than a CSI measurement threshold; a measurement result of a CBR of a resource configured for the sidelink is greater than a CBR measurement threshold; a quantity of retransmissions of a data packet transmitted over the unicast connection on the sidelink at an RLC layer is greater than or equal to a first quantity of retransmissions; a quantity of retransmissions of a data packet transmitted over the unicast connection on the sidelink at a MAC layer is greater than or equal to a second quantity of retransmissions; a quantity of times that a quantity of retransmissions of a data packet transmitted over the unicast connection on the sidelink at a MAC layer is greater than or equal to a second quantity of retransmissions is greater than or equal to a third quantity of times; a result of an integrity check performed on a data packet transmitted over the unicast connection on the sidelink indicates that the check fails; a decryption result of a data packet transmitted over the unicast connection on the sidelink indicates that the decryption fails; out-of-synchronization information of the unicast connection on the sidelink indicates that the first terminal device and the second terminal device are out of synchronization; a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

With reference to the fourth aspect, in a possible implementation of the fourth aspect, the transceiver is further configured to: send a first message to a network device. The first message is used to indicate that the unicast connection is faulty, or the first message includes first indication information, and the first indication information is used to indicate that the unicast connection is faulty.

With reference to the fourth aspect, in a possible implementation of the fourth aspect, the first message further includes second indication information, and the second indication information is used to indicate the unicast connection.

With reference to the fourth aspect, in a possible implementation of the fourth aspect, the first condition includes one or any combination of the following: the measurement result of the CSI reference signal is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the first message further includes third indication information, and the third indication information is used to indicate a resource used by the unicast connection.

With reference to the fourth aspect, in a possible implementation of the fourth aspect, the first message further includes fourth indication information, and the fourth indication information includes the first condition satisfied by the unicast connection.

With reference to the fourth aspect, in a possible implementation of the fourth aspect, the transceiver is further configured to: stop sending a data packet over the unicast connection, and continue receiving a data packet over the unicast connection.

With reference to the fourth aspect, in a possible implementation of the fourth aspect, the processor is further configured to obtain first configuration information, where the first configuration information is used to recover the unicast connection.

With reference to the fourth aspect, in a possible implementation of the fourth aspect, the transceiver is further configured to send second configuration information to the second terminal device, where the second configuration information is used to recover the unicast connection.

With reference to the fourth aspect, in a possible implementation of the fourth aspect, the transceiver is configured to send the second configuration information to the second terminal device in the following manner: sending the second configuration information to the second terminal device through an SRB, where the SRB has a dedicated sending resource; sending the second configuration information to the second terminal device by using a resource used to specially process the unicast connection fault; or sending the second configuration information to the second terminal device through first upper layer signaling.

With reference to the fourth aspect, in a possible implementation of the fourth aspect, the processor is further configured to trigger notification information to an application layer of the first terminal device through an AS layer of the first terminal device, where the notification information is used to indicate that the sidelink is unavailable.

With reference to the fourth aspect, in a possible implementation of the fourth aspect, the processor is further configured to: update a configuration of the unicast connection to a default configuration, and negotiate a new configuration of the unicast connection with the second terminal device by applying the unicast connection having the default configuration.

For technical effects brought by the fourth aspect or the implementations of the fourth aspect, refer to the descriptions of technical effects of the first aspect or the related implementations of the first aspect.

According to a fifth aspect, a second type of communications apparatus is provided. The communications apparatus is, for example, the second communications apparatus in the foregoing descriptions, for example, the first terminal device. The communications apparatus has functions of implementing the first terminal device in the method designs. The first terminal device is, for example, a vehicle, a vehicle-mounted communications apparatus, or a vehicle-mounted communications chip that has a corresponding communication function. The communications apparatus includes, for example, a processor and a transceiver that are coupled to each other. The transceiver is implemented as, for example, a communications interface. The communications interface herein may be understood as a radio frequency transceiver component in the first terminal device. The radio frequency transceiver component is implemented by using, for example, an antenna, a feeder, and a codec. The communications apparatus may further include a memory, configured to store instructions. The processor executes the instructions to implement a corresponding solution provided in the second aspect or the implementations of the second aspect. For example, the transceiver is configured to receive a second message from a second terminal device; and the processor is configured to determine, based on the second message or based on fifth indication information included in the second message, that a unicast connection on a sidelink between the communications apparatus and the second terminal device is faulty.

With reference to the fifth aspect, in a possible implementation of the fifth aspect, the transceiver is further configured to forward the second message to a network device, and the first terminal device receives first configuration information from the network device or the processor is further configured to generate first configuration information.

The first configuration information is used to recover the unicast connection.

With reference to the fifth aspect, in a possible implementation of the fifth aspect, the transceiver is further configured to send second configuration information to the second terminal device, where the second configuration information is used to recover the unicast connection.

With reference to the fifth aspect, in a possible implementation of the fifth aspect, the transceiver is configured to send the second configuration information to the second terminal device in the following manner: sending the second configuration information to the second terminal device through an SRB, where the SRB has a dedicated sending resource; sending the second configuration information to the second terminal device by using a resource used to specially process the unicast connection fault; or sending the second configuration information to the second terminal device through first upper layer signaling.

With reference to the fifth aspect, in a possible implementation of the fifth aspect, the processor is further configured to trigger notification information to an application layer of the first terminal device through an AS layer of the first terminal device, where the notification information is used to indicate that the sidelink is unavailable.

With reference to the fifth aspect, in a possible implementation of the fifth aspect, the processor is further configured to: update a configuration of the unicast connection to a default configuration, where the unicast connection is the faulty unicast connection, and negotiate a new configuration of the unicast connection with the second terminal device by applying the unicast connection having the default configuration.

With reference to the fifth aspect, in a possible implementation of the fifth aspect, the transceiver is configured to receive the second message from the second terminal device in the following manner: receiving the second message from the second terminal device through an SRB, where the SRB has a dedicated sending resource; receiving the second message from the second terminal device by using a resource used to specially process the unicast connection fault; or receiving the second message from the second terminal device through second upper layer signaling.

The second type of communications apparatus provided in the fifth aspect and the first type of communications apparatus provided in the fourth aspect may be a same communications apparatus, or may be different communications apparatuses.

For technical effects brought by the fifth aspect or the implementations of the fifth aspect, refer to the descriptions of technical effects of the second aspect or the related implementations of the second aspect.

According to a sixth aspect, a third type of communications apparatus is provided. The communications apparatus is, for example, the third communications apparatus in the foregoing descriptions, for example, the second terminal device. The communications apparatus has functions of implementing the second terminal device in the method designs. The second terminal device is, for example, a vehicle, a vehicle-mounted communications apparatus, or a vehicle-mounted communications chip that has a corresponding communication function. The communications apparatus includes, for example, a processor and a transceiver that are coupled to each other. The transceiver is implemented as, for example, a communications interface. The communications interface herein may be understood as a radio frequency transceiver component in the second terminal device. The radio frequency transceiver component is implemented by using, for example, an antenna, a feeder, and a codec. The communications apparatus may further include a memory, configured to store instructions. The processor executes the instructions to implement a corresponding solution provided in the third aspect or the implementations of the third aspect. For example, the processor is configured to monitor a parameter of a sidelink, to determine whether a unicast connection on the sidelink satisfies a first condition; and the transceiver is configured to: when the processor determines that the unicast connection satisfies the first condition, send a second message to the first terminal device, where the second message is used to indicate that the unicast connection is faulty, or the second message includes fifth indication information, and the fifth indication information is used to indicate that the unicast connection is faulty.

With reference to the sixth aspect, in a possible implementation of the sixth aspect, the first condition includes one or any combination of the following: a measurement result of a CSI reference signal transmitted over the unicast connection on the sidelink is less than a CSI measurement threshold; a measurement result of a CBR of a resource configured for the sidelink is greater than a CBR measurement threshold; a quantity of retransmissions of a data packet transmitted over the unicast connection on the sidelink at an RLC layer is greater than or equal to a first quantity of retransmissions; a quantity of retransmissions of a data packet transmitted over the unicast connection on the sidelink at a MAC layer is greater than or equal to a second quantity of retransmissions; a quantity of times that a quantity of retransmissions of a data packet transmitted over the unicast connection on the sidelink at a MAC layer is greater than or equal to a second quantity of retransmissions is greater than a third quantity of times; a result of an integrity check performed on a data packet transmitted over the unicast connection on the sidelink indicates that the check fails; a decryption result of a data packet transmitted over the unicast connection on the sidelink indicates that the decryption fails; out-of-synchronization information of the unicast connection on the sidelink indicates that the first terminal device and the second terminal device are out of synchronization; a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

With reference to the sixth aspect, in a possible implementation of the sixth aspect, the second message further includes sixth indication information, and the sixth indication information is used to indicate the unicast connection.

With reference to the sixth aspect, in a possible implementation of the sixth aspect, the first condition includes one or any combination of the following: the measurement result of the CSI is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the second message further includes seventh indication information, and the seventh indication information is used to indicate a resource used by the unicast connection.

With reference to the sixth aspect, in a possible implementation of the sixth aspect, the second message further includes eighth indication information, and the eighth indication information includes the first condition satisfied by the unicast connection.

With reference to the sixth aspect, in a possible implementation of the sixth aspect, the transceiver is configured to send the second message to the first terminal device in the following manner: sending the second message to the first terminal device through an SRB, where the SRB has a dedicated sending resource; sending the second message to the first terminal device by using a resource used to specially process the unicast connection fault; or sending the second message to the first terminal device through second upper layer signaling.

With reference to the sixth aspect, in a possible implementation of the sixth aspect, the transceiver is further configured to: stop sending a data packet over the unicast connection, and continue receiving a data packet over the unicast connection.

With reference to the sixth aspect, in a possible implementation of the sixth aspect, the transceiver is further configured to receive second configuration information from the first terminal device, where the second configuration information is used to recover the unicast connection.

With reference to the sixth aspect, in a possible implementation of the sixth aspect, the transceiver is configured to receive the second configuration information from the first terminal device in the following manner: receiving the second configuration information from the first terminal device through an SRB, where the SRB has a dedicated sending resource; receiving the second configuration information from the first terminal device by using a resource used to specially process the unicast connection fault; or receiving the second configuration information from the first terminal device through first upper layer signaling.

With reference to the sixth aspect, in a possible implementation of the sixth aspect, the processor is further configured to: update a configuration of the unicast connection to a default configuration, and negotiate a new configuration of the unicast connection with the first terminal device by applying the unicast connection having the default configuration.

For technical effects brought by the sixth aspect or the implementations of the sixth aspect, refer to the descriptions of technical effects of the third aspect or the related implementations of the third aspect.

According to a seventh aspect, a fourth type of communications apparatus is provided. The communications apparatus is, for example, the first communications apparatus in the foregoing descriptions, for example, the first terminal device. Herein, an example in which the first communications apparatus is the first terminal device is used. The first terminal device is, for example, a vehicle, a vehicle-mounted communications apparatus, or a vehicle-mounted communications chip that has a corresponding communication function. The communications apparatus has functions of implementing the first terminal device in the method designs. The functions may be implemented by hardware, or may be implemented by hardware executing corresponding software. The hardware or the software includes one or more units corresponding to the foregoing functions.

In a possible design, a specific structure of the communications apparatus may include a processing module and a transceiver module. The processing module and the transceiver module may perform corresponding functions in the method according to any one of the first aspect or the possible implementations of the first aspect, where the processing module is configured to monitor a parameter of a sidelink between the communications apparatus and a second terminal device, to determine whether a unicast connection on the sidelink satisfies a first condition; and the processing module is further configured to: when the unicast connection satisfies the first condition, determine that the unicast connection is faulty.

With reference to the seventh aspect, in a possible implementation of the seventh aspect, the first condition includes one or any combination of the following: a measurement result of a CSI reference signal transmitted over the unicast connection on the sidelink is less than a CSI measurement threshold; a measurement result of a CBR of a resource configured for the sidelink is greater than a CBR measurement threshold; a quantity of retransmissions of a data packet transmitted over the unicast connection on the sidelink at an RLC layer is greater than or equal to a first quantity of retransmissions; a quantity of retransmissions of a data packet transmitted over the unicast connection on the sidelink at a MAC layer is greater than or equal to a second quantity of retransmissions; a quantity of times that a quantity of retransmissions of a data packet transmitted over the unicast connection on the sidelink at a MAC layer is greater than or equal to a second quantity of retransmissions is greater than or equal to a third quantity of times; a result of an integrity check performed on a data packet transmitted over the unicast connection on the sidelink indicates that the check fails; a decryption result of a data packet transmitted over the unicast connection on the sidelink indicates that the decryption fails; out-of-synchronization information of the unicast connection on the sidelink indicates that the first terminal device and the second terminal device are out of synchronization; a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

With reference to the seventh aspect, in a possible implementation of the seventh aspect, the transceiver module is further configured to: send a first message to a network device. The first message is used to indicate that the unicast connection is faulty, or the first message includes first indication information, and the first indication information is used to indicate that the unicast connection is faulty.

With reference to the seventh aspect, in a possible implementation of the seventh aspect, the first message further includes second indication information, and the second indication information is used to indicate the unicast connection.

With reference to the seventh aspect, in a possible implementation of the seventh aspect, the first condition includes one or any combination of the following: the measurement result of the CSI reference signal is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the first message further includes third indication information, and the third indication information is used to indicate a resource used by the unicast connection.

With reference to the seventh aspect, in a possible implementation of the seventh aspect, the first message further includes fourth indication information, and the fourth indication information includes the first condition satisfied by the unicast connection.

With reference to the seventh aspect, in a possible implementation of the seventh aspect, the transceiver module is further configured to: stop sending a data packet over the unicast connection, and continue receiving a data packet over the unicast connection.

With reference to the seventh aspect, in a possible implementation of the seventh aspect, the processing module is further configured to obtain first configuration information, where the first configuration information is used to recover the unicast connection.

With reference to the seventh aspect, in a possible implementation of the seventh aspect, the transceiver module is further configured to send second configuration information to the second terminal device, where the second configuration information is used to recover the unicast connection.

With reference to the seventh aspect, in a possible implementation of the seventh aspect, the transceiver module is configured to send the second configuration information to the second terminal device in the following manner: sending the second configuration information to the second terminal device through an SRB, where the SRB has a dedicated sending resource; sending the second configuration information to the second terminal device by using a resource used to specially process the unicast connection fault; or sending the second configuration information to the second terminal device through first upper layer signaling.

With reference to the seventh aspect, in a possible implementation of the seventh aspect, the processing module is further configured to trigger notification information to an application layer of the first terminal device through an AS layer of the first terminal device, where the notification information is used to indicate that the sidelink is unavailable.

With reference to the seventh aspect, in a possible implementation of the seventh aspect, the processing module is further configured to: update a configuration of the unicast connection to a default configuration, and negotiate a new configuration of the unicast connection with the second terminal device by applying the unicast connection having the default configuration.

For technical effects brought by the seventh aspect or the implementations of the seventh aspect, refer to the descriptions of technical effects of the first aspect or the related implementations of the first aspect.

According to an eighth aspect, a fifth type of communications apparatus is provided. The communications apparatus is, for example, the second communications apparatus in the foregoing descriptions, for example, the first terminal device. Herein, an example in which the second communications apparatus is the first terminal device is used. The first terminal device is, for example, a vehicle, a vehicle-mounted communications apparatus, or a vehicle-mounted communications chip that has a corresponding communication function. The communications apparatus has functions of implementing the first terminal device in the method designs. The functions may be implemented by hardware, or may be implemented by hardware executing corresponding software. The hardware or the software includes one or more units corresponding to the foregoing functions.

In a possible design, a specific structure of the communications apparatus may include a processing module and a transceiver module. The processing module and the transceiver module may perform corresponding functions in the method according to any one of the second aspect or the possible implementations of the second aspect, where the transceiver module is configured to receive a second message from a second terminal device; and the processing module is configured to determine, based on the second message or based on fifth indication information included in the second message, that a unicast connection on a sidelink between the communications apparatus and the second terminal device is faulty.

With reference to the eighth aspect, in a possible implementation of the eighth aspect, the transceiver module is further configured to forward the second message to a network device, and the first terminal device receives first configuration information from the network device or the processing module is further configured to generate first configuration information.

The first configuration information is used to recover the unicast connection.

With reference to the eighth aspect, in a possible implementation of the eighth aspect, the transceiver module is further configured to send second configuration information to the second terminal device, where the second configuration information is used to recover the unicast connection.

With reference to the eighth aspect, in a possible implementation of the eighth aspect, the transceiver module is configured to send the second configuration information to the second terminal device in the following manner: sending the second configuration information to the second terminal device through an SRB, where the SRB has a dedicated sending resource; sending the second configuration information to the second terminal device by using a resource used to specially process the unicast connection fault; or sending the second configuration information to the second terminal device through first upper layer signaling.

With reference to the eighth aspect, in a possible implementation of the eighth aspect, the processing module is further configured to trigger notification information to an application layer of the first terminal device through an AS layer of the first terminal device, where the notification information is used to indicate that the sidelink is unavailable.

With reference to the eighth aspect, in a possible implementation of the eighth aspect, the processing module is further configured to: update a configuration of the unicast connection to a default configuration, where the unicast connection is the faulty unicast connection, and negotiate a new configuration of the unicast connection with the second terminal device by applying the unicast connection having the default configuration.

With reference to the eighth aspect, in a possible implementation of the eighth aspect, the transceiver module is configured to receive the second message from the second terminal device in the following manner: receiving the second message from the second terminal device through an SRB, where the SRB has a dedicated sending resource; receiving the second message from the second terminal device by using a resource used to specially process the unicast connection fault; or receiving the second message from the second terminal device through second upper layer signaling.

The fifth type of communications apparatus provided in the eighth aspect and the fourth type of communications apparatus provided in the seventh aspect may be a same communications apparatus, or may be different communications apparatuses.

For technical effects brought by the eighth aspect or the implementations of the eighth aspect, refer to the descriptions of technical effects of the second aspect or the related implementations of the second aspect.

According to a ninth aspect, a sixth type of communications apparatus is provided. The communications apparatus is, for example, the third communications apparatus in the foregoing descriptions, for example, the second terminal device. Herein, an example in which the third communications apparatus is the second terminal device is used. The second terminal device is, for example, a vehicle, a vehicle-mounted communications apparatus, or a vehicle-mounted communications chip that has a corresponding communication function. The communications apparatus has functions of implementing the second terminal device in the method designs. The functions may be implemented by hardware, or may be implemented by hardware executing corresponding software. The hardware or the software includes one or more units corresponding to the foregoing functions.

In a possible design, a specific structure of the communications apparatus may include a processing module and a transceiver module. The processing module and the transceiver module may perform corresponding functions in the method according to any one of the third aspect or the possible implementations of the third aspect, where the processing module is configured to monitor a parameter of a sidelink, to determine whether a unicast connection on the sidelink satisfies a first condition; and the transceiver module is configured to: when the processing module determines that the unicast connection satisfies the first condition, send a second message to the first terminal device, where the second message is used to indicate that the unicast connection is faulty, or the second message includes fifth indication information, and the fifth indication information is used to indicate that the unicast connection is faulty.

With reference to the ninth aspect, in a possible implementation of the ninth aspect, the first condition includes one or any combination of the following: a measurement result of a CSI reference signal transmitted over the unicast connection on the sidelink is less than a CSI measurement threshold; a measurement result of a CBR of a resource configured for the sidelink is greater than a CBR measurement threshold; a quantity of retransmissions of a data packet transmitted over the unicast connection on the sidelink at an RLC layer is greater than or equal to a first quantity of retransmissions; a quantity of retransmissions of a data packet transmitted over the unicast connection on the sidelink at a MAC layer is greater than or equal to a second quantity of retransmissions; a quantity of times that a quantity of retransmissions of a data packet transmitted over the unicast connection on the sidelink at a MAC layer is greater than or equal to a second quantity of retransmissions is greater than or equal to a third quantity of times; a result of an integrity check performed on a data packet transmitted over the unicast connection on the sidelink indicates that the check fails; a decryption result of a data packet transmitted over the unicast connection on the sidelink indicates that the decryption fails; out-of-synchronization information of the unicast connection on the sidelink indicates that the first terminal device and the second terminal device are out of synchronization; a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

With reference to the ninth aspect, in a possible implementation of the ninth aspect, the second message further includes sixth indication information, and the sixth indication information is used to indicate the unicast connection.

With reference to the ninth aspect, in a possible implementation of the ninth aspect, the first condition includes one or any combination of the following: the measurement result of the CSI is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the second message further includes seventh indication information, and the seventh indication information is used to indicate a resource used by the unicast connection.

With reference to the ninth aspect, in a possible implementation of the ninth aspect, the second message further includes eighth indication information, and the eighth indication information includes the first condition satisfied by the unicast connection.

With reference to the ninth aspect, in a possible implementation of the ninth aspect, the transceiver module is configured to send the second message to the first terminal device in the following manner: sending the second message to the first terminal device through an SRB, where the SRB has a dedicated sending resource; sending the second message to the first terminal device by using a resource used to specially process the unicast connection fault; or sending the second message to the first terminal device through second upper layer signaling.

With reference to the ninth aspect, in a possible implementation of the ninth aspect, the transceiver module is further configured to: stop sending a data packet over the unicast connection, and continue receiving a data packet over the unicast connection.

With reference to the ninth aspect, in a possible implementation of the ninth aspect, the transceiver module is further configured to receive second configuration information from the first terminal device, where the second configuration information is used to recover the unicast connection.

With reference to the ninth aspect, in a possible implementation of the ninth aspect, the transceiver module is configured to receive the second configuration information from the first terminal device in the following manner: receiving the second configuration information from the first terminal device through an SRB, where the SRB has a dedicated sending resource; receiving the second configuration information from the first terminal device by using a resource used to specially process the unicast connection fault; or receiving the second configuration information from the first terminal device through first upper layer signaling.

With reference to the ninth aspect, in a possible implementation of the ninth aspect, the processing module is further configured to: update a configuration of the unicast connection to a default configuration, and negotiate a new configuration of the unicast connection with the first terminal device by applying the unicast connection having the default configuration.

For technical effects brought by the ninth aspect or the implementations of the ninth aspect, refer to the descriptions of technical effects of the third aspect or the related implementations of the third aspect.

According to a tenth aspect, a seventh type of communications apparatus is provided. The communications apparatus may be the first communications apparatus in the foregoing method designs, for example, the first terminal device or a chip disposed in the first terminal device. The communications apparatus includes: a memory, configured to store computer-executable program code; and a processor, where the processor is coupled to the memory. The program code stored in the memory includes an instruction. When the processor executes the instruction, the seventh type of communications apparatus is enabled to perform the method according to any one of the first aspect or the possible implementations of the first aspect.

The seventh type of communications apparatus may further include a communications interface. If the seventh type of communications apparatus is the first terminal device, the communications interface may be a transceiver in the first terminal device, for example, a radio frequency transceiver component in the first terminal device. Alternatively, if the seventh type of communications apparatus is the chip disposed in the first terminal device, the communications interface may be an input/output interface of the chip, for example, an input/output pin.

According to an eleventh aspect, an eighth type of communications apparatus is provided. The communications apparatus may be the second communications apparatus in the foregoing method designs, for example, the first terminal device or a chip disposed in the first terminal device. The communications apparatus includes: a memory, configured to store computer-executable program code; and a processor, where the processor is coupled to the memory. The program code stored in the memory includes an instruction. When the processor executes the instruction, the eighth type of communications apparatus is enabled to perform the method according to any one of the second aspect or the possible implementations of the second aspect.

The eighth type of communications apparatus may further include a communications interface. If the eighth type of communications apparatus is the first terminal device, the communications interface may be a transceiver in the first terminal device, for example, a radio frequency transceiver component in the first terminal device. Alternatively, if the eighth type of communications apparatus is the chip disposed in the first terminal device, the communications interface may be an input/output interface of the chip, for example, an input/output pin.

The eighth type of communications apparatus provided in the eleventh aspect and the seventh type of communications apparatus provided in the tenth aspect may be a same communications apparatus, or may be different communications apparatuses.

According to a twelfth aspect, a ninth type of communications apparatus is provided. The communications apparatus may be the third communications apparatus in the foregoing method designs, for example, the second terminal device or a chip disposed in the second terminal device. The communications apparatus includes: a memory, configured to store computer-executable program code; and a processor, where the processor is coupled to the memory. The program code stored in the memory includes an instruction. When the processor executes the instruction, the ninth type of communications apparatus is enabled to perform the method according to any one of the third aspect or the possible implementations of the third aspect.

The ninth type of communications apparatus may further include a communications interface. If the ninth type of communications apparatus is the second terminal device, the communications interface may be a transceiver in the second terminal device, for example, a radio frequency transceiver component in the second terminal device. Alternatively, if the ninth type of communications apparatus is the chip disposed in the second terminal device, the communications interface may be an input/output interface of the chip, for example, an input/output pin.

According to a thirteenth aspect, a first type of communications system is provided. The communications system may include the first type of communications apparatus according to the fourth aspect, and the fourth type of communications apparatus according to the seventh aspect or the seventh type of communications apparatus according to the tenth aspect, and include the third type of communications apparatus according to the sixth aspect, the sixth type of communications apparatus according to the ninth aspect, or the ninth type of communications apparatus according to the twelfth aspect. Optionally, the communications system may further include a network device. The network device may be connected to the first type of communications apparatus according to the fourth aspect and the fourth type of communications apparatus according to the seventh aspect or the seventh type of communications apparatus according to the tenth aspect. In addition, the network device may be connected to the third type of communications apparatus according to the sixth aspect, the sixth type of communications apparatus according to the ninth aspect, or the ninth type of communications apparatus according to the twelfth aspect, or may not be connected.

According to a fourteenth aspect, a second type of communications system is provided. The communications system may include the second type of communications apparatus according to the fifth aspect, and the fifth type of communications apparatus according to the eighth aspect or the eighth type of communications apparatus according to the eleventh aspect, and include the third type of communications apparatus according to the sixth aspect, the sixth type of communications apparatus according to the ninth aspect, or the ninth type of communications apparatus according to the twelfth aspect. Optionally, the communications system may further include a network device. The network device may be connected to the second type of communications apparatus according to the fifth aspect and the fifth type of communications apparatus according to the eighth aspect or the eighth type of communications apparatus according to the eleventh aspect. In addition, the network device may be connected to the third type of communications apparatus according to the sixth aspect, the sixth type of communications apparatus according to the ninth aspect, or the ninth type of communications apparatus according to the twelfth aspect, or may not be connected.

According to a fifteenth aspect, a computer storage medium is provided. The computer-readable storage medium stores an instruction. When the instruction is run on a computer, the computer is enabled to perform the method according to any one of the first aspect or the possible designs of the first aspect.

According to a sixteenth aspect, a computer storage medium is provided. The computer-readable storage medium stores an instruction. When the instruction is run on a computer, the computer is enabled to perform the method according to any one of the second aspect or the possible designs of the second aspect.

According to a seventeenth aspect, a computer storage medium is provided. The computer-readable storage medium stores an instruction. When the instruction is run on a computer, the computer is enabled to perform the method according to any one of the third aspect or the possible designs of the third aspect.

According to an eighteenth aspect, a computer program product including an instruction is provided. The computer program product stores the instruction. When the computer program product runs on a computer, the computer is enabled to perform the method according to any one of the first aspect or the possible designs of the first aspect.

According to a nineteenth aspect, a computer program product including an instruction is provided. The computer program product stores the instruction. When the computer program product runs on a computer, the computer is enabled to perform the method according to any one of the second aspect or the possible designs of the second aspect.

According to a twentieth aspect, a computer program product including an instruction is provided. The computer program product stores the instruction. When the computer program product runs on a computer, the computer is enabled to perform the method according to any one of the third aspect or the possible designs of the third aspect.

In the embodiments of this application, the sidelink may be monitored to determine a fault as soon as possible. This helps reduce a probability that a service is delayed or even interrupted due to a unicast connection fault, and improves service transmission continuity.

DETAILED DESCRIPTION OF ILLUSTRATIVE EMBODIMENTS

Figure 1:
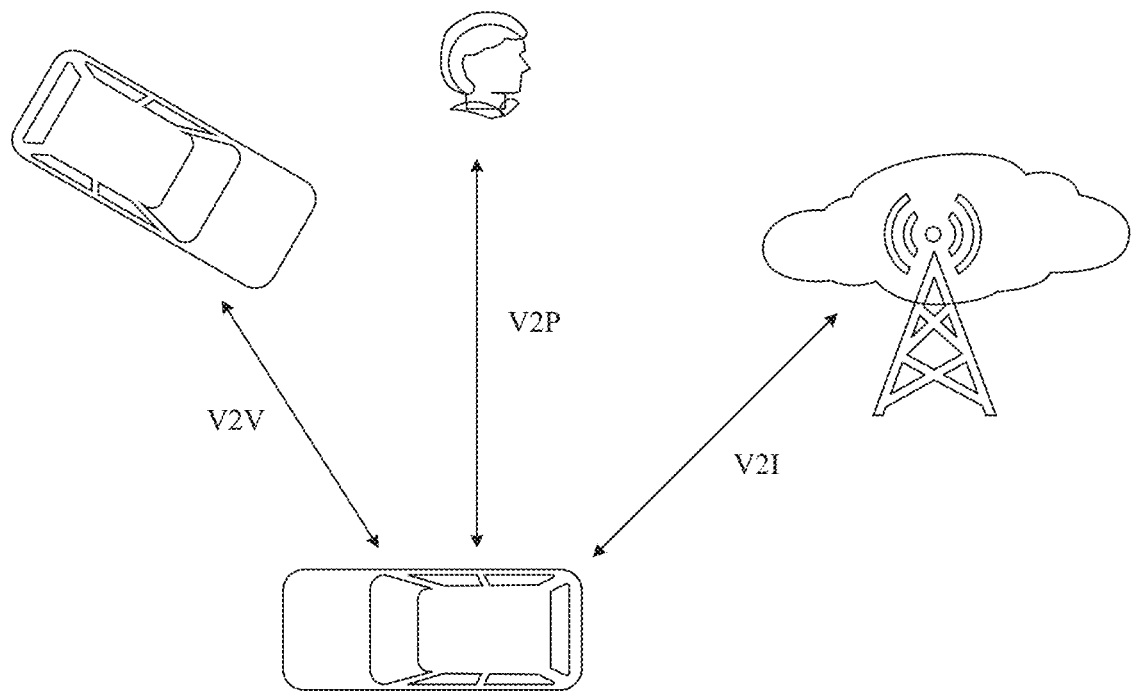
FIG. 1 is a schematic diagram of several types of V2X.

To make objectives, technical solutions and advantages of embodiments of this application clearer, the following further describes the embodiments of this application in detail with reference to the accompanying drawings.

The following describes some terms in the embodiments of this application, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange voice and/or a data packet with the RAN. The terminal device may include user equipment (UE), a wireless terminal device, a mobile terminal device, a subscriber unit, a subscriber station, a mobile station, a mobile, a remote station, an access point (AP), a remote terminal device (remote terminal), an access terminal device (access terminal), a user terminal device (user terminal), a user agent, a user device, or the like. For example, the terminal device may include a mobile phone (or referred to as a "cellular" phone), a computer having a mobile terminal device, a portable, pocket-sized, handheld, or computer-embedded mobile apparatus, or a smart wearable device. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode, radio frequency identification (RFID), a sensor, a global positioning system (GPS), or a laser scanner.

Byway of example, but not limitation, the terminal device in the embodiments of this application may alternatively be a wearable device or the like. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of the user. The wearable device is not only a hardware device, but also implements a powerful function through software support, data packet exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

However, if the various terminal devices described above are located on a vehicle (for example, placed in the vehicle or installed in the vehicle), the terminal devices may be considered as vehicle-mounted terminal devices. For example, the vehicle-mounted terminal devices are also referred to as on-board units (OBUs).

(2) A Network device includes, for example, an access network (AN) device such as a base station (for example, an access point), and may be a device that communicates with a wireless terminal device over an air interface by using one or more cells in an access network. Alternatively, for example, a network device in a V2X technology is a road side unit (RSU). The base station may be configured to mutually convert a received over-the-air frame and a received Internet Protocol (IP) packet, and serve as a router between the terminal device and a rest part of the access network, where the rest part of the access network may include an IP network. The RSU may be a fixed infrastructure entity supporting application of the V2X, and may exchange a message with another entity supporting application of the V2X. The network device may further coordinate attribute management of the air interface. For example, the network device may include an evolved NodeB (NodeB, eNB, or e-NodeB, evolutional Node B) in a long term evolution (LTE) system or long term evolution-advanced (LTE-A) system, may include a next generation NodeB (next generation node B, gNB) in a 5G NR system, or may include a centralized unit (CU) and a distributed unit (DU) in a cloud access network (CloudRAN) system. This is not limited in the embodiments of this application.

(3) For device-to-device (D2D), to improve spectrum utilization and maximize a radio frequency capability of an existing terminal device, it is considered that a spectrum resource of an existing mobile communications network is reused on a D2D communication link (which is also referred to as a sidelink). To avoid interfering with a terminal device of an existing network, in D2D communication, a spectrum resource of a downlink of the LTE-A system is not used, but only a spectrum resource of an uplink of the LTE-A system is reused because an anti-interference capability of the base station is stronger than that of the terminal device. A probability that a D2D device performs time division multiplexing on the uplink spectrum resource is relatively high. In this case, receiving and sending do not need to be simultaneously supported. Only sending or receiving needs to be performed at one moment. The downlink of the LTE-A system is a link from the eNB to the terminal device, and the uplink of the LTE-A system is a link from the terminal device to the eNB.

(4) In the Release (Rel)-14/15/16, V2X is successfully initiated as a main application of the D2D technology. On a basis of the existing D2D technology, a specific application requirement of the V2X is optimized in the V2X, to further reduce an access delay of a V2X device and resolve a resource conflict.

Further, the V2X specifically includes three application requirements: V2V, V2P, and V2I/N, as shown in FIG. 1. The V2V refers to communication between vehicles. The V2P refers to communication between a vehicle and a person (including a pedestrian, a bicycle rider, a driver, or a passenger). The V2I refers to communication between a vehicle and an RSU. In addition, another type of V2N may be included in the V2I. The V2N refers to communication between a vehicle and a base station/network.

The RSU includes two types: a terminal-type RSU and a base station-type RSU. Because the terminal-type RSU is deployed on a roadside, the terminal-type RSU is in a non-mobile state, and mobility does not need to be considered. The base station-type RSU can provide timing synchronization and resource scheduling for a vehicle that communicates with the base station-type RSU.

(5) "At least one" means one or more, and "a plurality of" means two or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, first indication information and second indication information are merely intended to distinguish between different information, but do not indicate that the two types of information are different in content, a priority, a sending sequence, importance, or the like.

The foregoing describes some concepts in the embodiments of this application. The following describes technical features in the embodiments of this application.

Figure 2A:
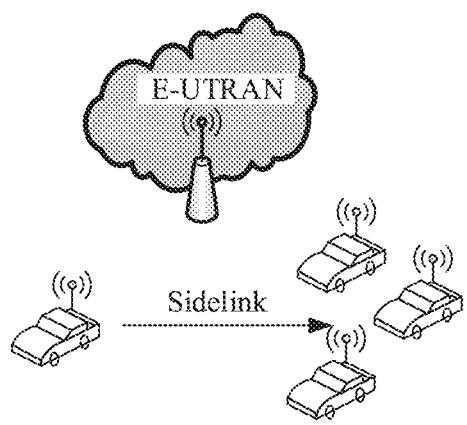
FIG. 2A to FIG. 2E are several schematic diagrams of LTE V2X services in which communication is performed through PC5 interfaces.
Figure 2B:
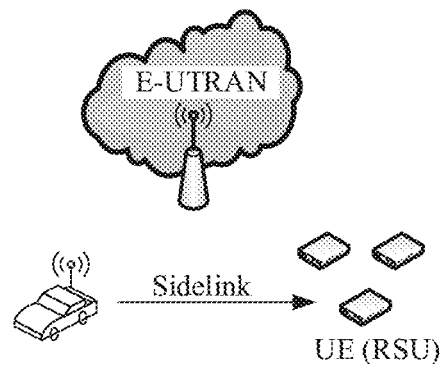
Figure 2C:
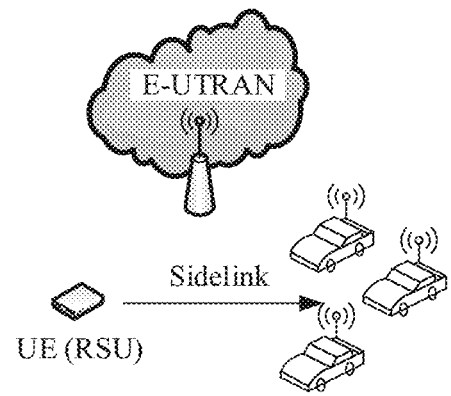
Figure 2D:
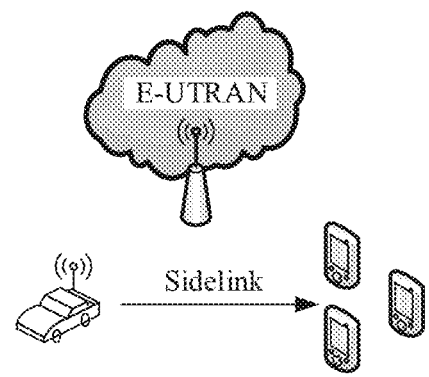
Figure 2E:
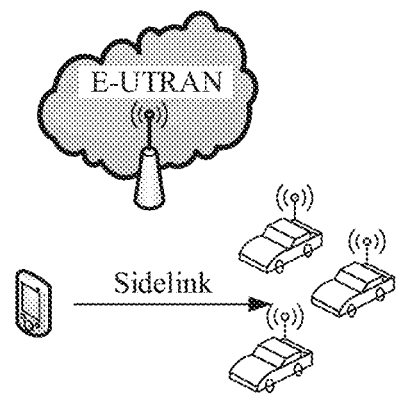

FIG. 2A to FIG. 2E are schematic diagrams of LTE V2X services in which communication is performed through PC5 interfaces (which are also referred to as sidelinks). All network devices are located in evolved universal radio access networks (evolved universal terrestrial radio access network, E-UTRAN). FIG. 2A is a schematic diagram of V2V, FIG. 2B and FIG. 2C are schematic diagrams of V2I, and FIG. 2D and FIG. 2E are schematic diagrams of V2P. In this case, terminal devices may be within a cell coverage area in which V2X is supported, or may be outside a cell coverage area in which V2X is supported.

Currently, a terminal device obtains a resource of a sidelink of the V2X in two modes. In one mode, before sending a data packet of a V2X service, the terminal device needs to first request the resource from a network device, and the network device allocates the resource of the sidelink of the V2X to the terminal device as required. This mode is referred to as a mode 3 in LTE V2X, and is referred to as a mode 1 in NR V2X. In the other mode, the terminal device may obtain a resource through contention in resources that are of the sidelink of the V2X and that are broadcast by a network device or pre-configured by a control function (CF) network element in a core network. This mode is referred to as a mode 4 in LTE V2X, and is referred to as a mode 2 in NR V2X.

Currently, a data packet may be transmitted between terminal devices over a unicast connection on a sidelink in the V2X. How to process a fault of the unicast connection is not mentioned currently. If the unicast connection is faulty, a relatively long period of time may be spent in recovering the unicast connection, or even the unicast connection may not be recovered. Consequently, a service may be interrupted for a relatively long period of time.

In view of this, the technical solution in the embodiments of this application is provided. It is proposed in the embodiments of this application that the unicast connection may be monitored. For example, a first terminal device may monitor a parameter of a sidelink, to determine whether a unicast connection on the sidelink is faulty. This is equivalent to that the fault may be determined as early as possible by monitoring the sidelink. For example, the fault may be determined at an early stage, and the fault may be resolved when data packet transmission is not severely affected. This helps reduce a probability that a service is delayed or even interrupted due to the fault of the unicast connection, and improve service transmission continuity.

The technical solution provided in the embodiments of this application may be applied to a V2X scenario, which may be an NR V2X scenario, an LTE V2X scenario, or the like, or may be applied to another scenario or another communications system. This is not specifically limited.

The following describes network architectures used in the embodiments of this application.

Figure 3A:
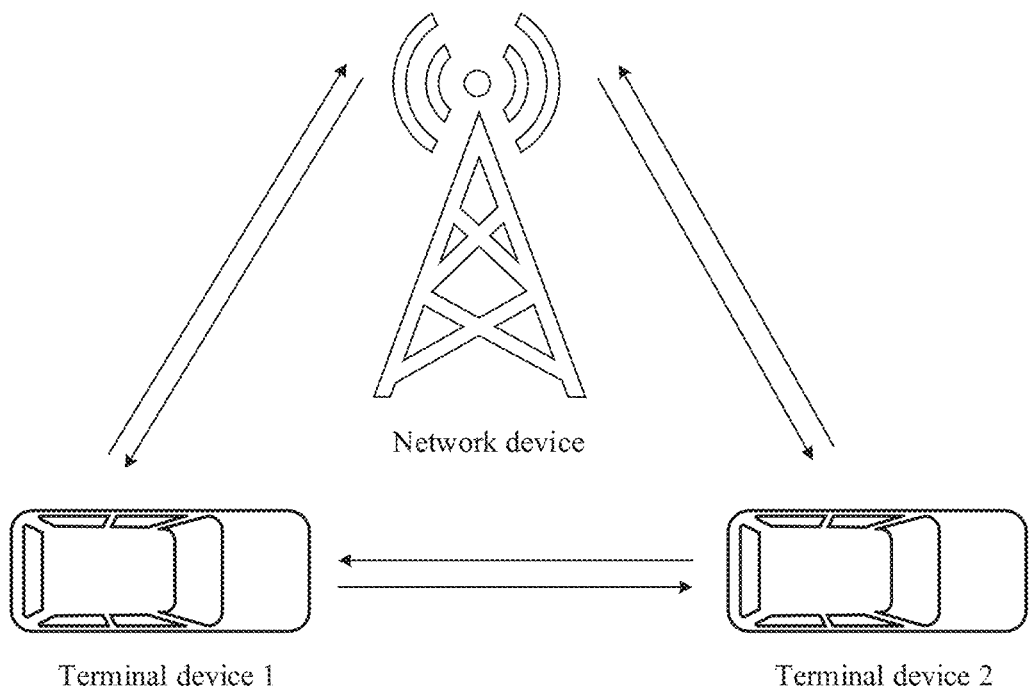
FIG. 3A is a schematic diagram of an application scenario according to an embodiment of this application.

FIG. 3A shows a network architecture used in an embodiment of this application. FIG. 3A includes a network device and two terminal devices, which are a terminal device 1 and a terminal device 2. Both the two terminal devices may be connected to the network device, or neither of the two terminal devices is connected to the network device, or only the terminal device 1 in the two terminal devices is connected to the network device, the terminal device 2 is not connected to the network device, and the two terminal devices can communicate with each other over a sidelink. In FIG. 3A, an example in which both the terminal device 1 and the terminal device 2 are connected to the network device is used. Certainly, a quantity of terminal devices in FIG. 3A is merely an example. During actual application, the network device may provide services for a plurality of terminal devices.

Figure 3B:
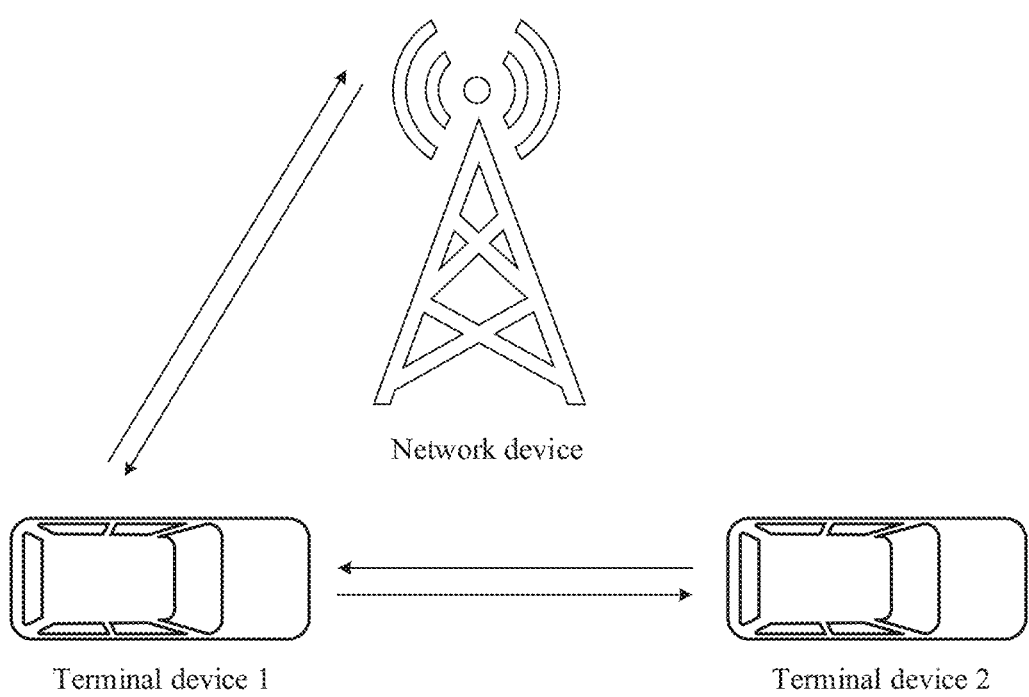
FIG. 3B is a schematic diagram of another application scenario according to an embodiment of this application.

In addition, FIG. 3B shows another network architecture used in an embodiment of this application. FIG. 3B includes a network device and two terminal devices, which are a terminal device 1 and a terminal device 2. Both the two terminal devices may be connected to the network device, or neither of the two terminal devices is connected to the network device, or only the terminal device 1 in the two terminal devices is connected to the network device, the terminal device 2 is not connected to the network device, and the two terminal devices can communicate with each other over a sidelink. In FIG. 3B, an example in which only the terminal device 1 is connected to the network device and the terminal device 2 is not connected to the network device is used. Certainly, a quantity of terminal devices in FIG. 3B is merely an example. During actual application, the network device may provide services for a plurality of terminal devices.

The network devices in FIG. 3A and FIG. 3B are, for example, access network devices such as base stations. The access network device corresponds to different devices in different systems. For example, the access network device may correspond to an eNB in a 4th generation (4th generation, 4G) system, and correspond to a 5G access network device in a 5G system, for example, a gNB or an eNB connected to a 5G core network.

Both the terminal devices in FIG. 3A and FIG. 3B are, for example, vehicle-mounted terminal devices or vehicles. The terminal devices in the embodiments of this application are not limited thereto.

With reference to the accompanying drawings, the following describes the technical solutions provided in the embodiments of this application.

Figure 4:
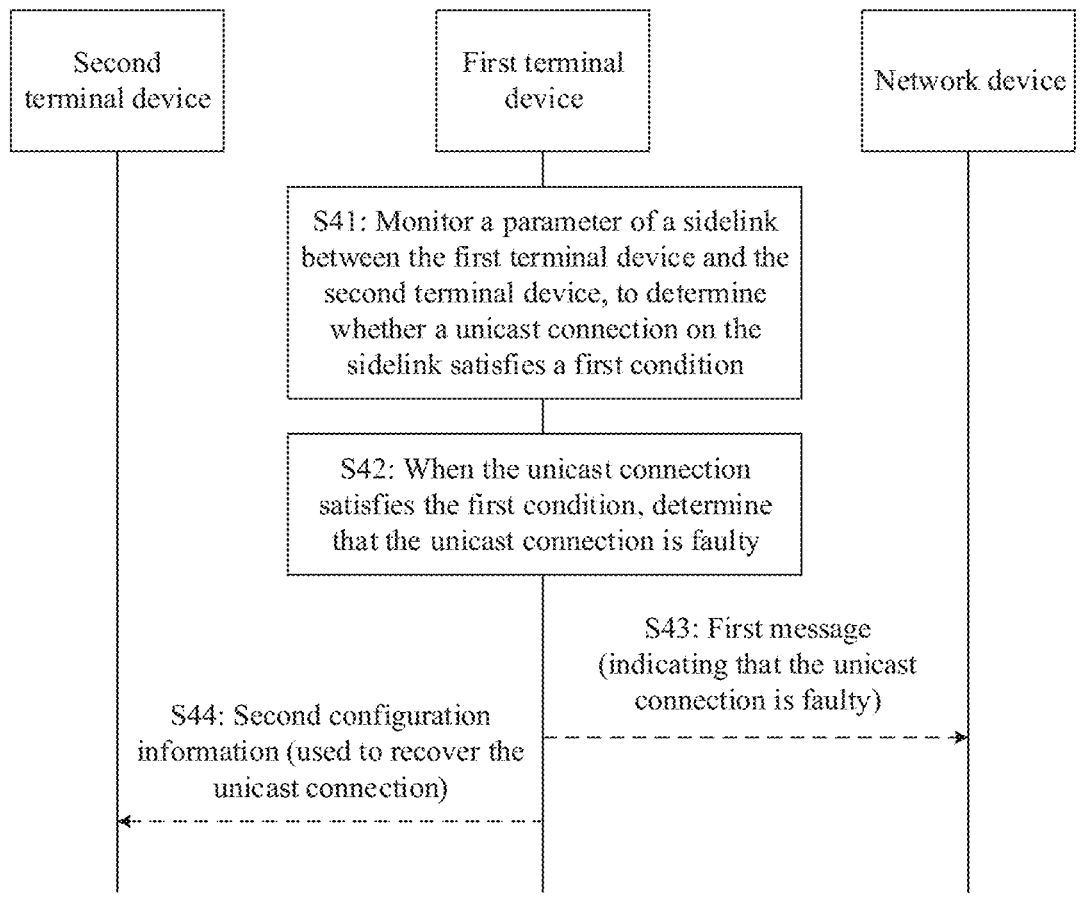
FIG. 4 is a flowchart of a first type of fault determining method according to an embodiment of this application.

An embodiment of this application provides a fault determining method. FIG. 4 is a flowchart of the method. In the following descriptions, an example in which the method is applied to the network architecture shown in FIG. 3A or FIG. 3B is used. In addition, the method may be performed by two or three communications apparatuses. If the method is performed by two communications apparatuses, the two communications apparatuses are, for example, a first communications apparatus and a second communications apparatus. If the method is performed by three communications apparatuses, the three communications apparatuses are, for example, a first communications apparatus, a second communications apparatus, and a third communications apparatus. The first communications apparatus may be a network device or a communications apparatus that can support a network device in implementing a required function of the method, or may be a terminal device or a communications apparatus that can support a terminal device in implementing a required function of the method. Certainly, the first communications apparatus may alternatively be another communications apparatus, for example, a chip system. The second communications apparatus may be a network device or a communications apparatus that can support a network device in implementing a required function of the method, or may be a terminal device or a communications apparatus that can support a terminal device in implementing a required function of the method. Certainly, the second communications apparatus may alternatively be another communications apparatus, for example, a chip system. Similarly, the third communications apparatus may be a network device or a communications apparatus that can support a network device in implementing a required function of the method, or may be a terminal device or a communications apparatus that can support a terminal device in implementing a required function of the method. Certainly, the third communications apparatus may alternatively be another communications apparatus, for example, a chip system. In addition, implementations of the first communications apparatus, the second communications apparatus, and the third communications apparatus are not limited. For example, the first communications apparatus may be a network device, the second communications apparatus is a terminal device, and the third communications apparatus is also a terminal device; the first communications apparatus is a network device, the second communications apparatus is a communications apparatus that can support a terminal device in implementing a required function of the method, and the third communications apparatus is a terminal device; or the first communications apparatus is a network device, and the second communications apparatus and the third communications apparatus are communications apparatuses that can support a terminal device in implementing a required function of the method. For example, the network device is a base station.

For ease of description, in the following descriptions, the method is performed by, for example, a network device and two terminal devices, or a terminal device and a terminal device. To be specific, for example, the first communications apparatus is a network device, and both the second communications apparatus and the third communications apparatus are terminal devices; or both the first communications apparatus and the second communications apparatus are terminal devices. For example, in this embodiment, the first network architecture shown in FIG. 3A or FIG. 3B is used. Therefore, in the following descriptions, the network device may be the network device in the network architecture shown in FIG. 3A or FIG. 3B, the first terminal device may be the terminal device 1 in the network architecture shown in FIG. 3A or FIG. 3B, and the second terminal device may be the terminal device 2 in the network architecture shown in FIG. 3A or FIG. 3B.

S41: The first terminal device monitors a parameter of a sidelink between the first terminal device and the second terminal device, to determine whether a unicast connection on the sidelink satisfies a first condition.

S42: When the unicast connection satisfies the first condition, the first terminal device determines that the unicast connection is faulty.

In this embodiment of this application, the first terminal device may monitor the parameter of the sidelink between the first terminal device and the second terminal device, to determine whether the unicast connection on the sidelink satisfies the first condition. The unicast connection is a unicast connection for communication between the first terminal device and the second terminal device. During actual application, the first terminal device may monitor one unicast connection or a plurality of unicast connections. If a plurality of unicast connections are monitored, the plurality of unicast connections may be unicast connections used for communication between the first terminal device and a plurality of terminal devices. This is not specifically limited.

The first condition may include one or any combination of a sub-condition 1, a sub-condition 2, a sub-condition 3, a sub-condition 4, a sub-condition 5, a sub-condition 6, a sub-condition 7, a sub-condition 8, a sub-condition 9, or a sub-condition 10. Certainly, in addition to the several sub-conditions, the first condition may further include another condition. For example, the first condition may not include the 10 sub-conditions, but include another condition; the first condition may include one or any combination of the sub-condition 1, the sub-condition 2, the sub-condition 3, the sub-condition 4, the sub-condition 5, the sub-condition 6, the sub-condition 7, the sub-condition 8, the sub-condition 9, or the sub-condition 10, and further include another condition; or the first condition may include only one or any combination of the sub-condition 1, the sub-condition 2, the sub-condition 3, the sub-condition 4, the sub-condition 5, the sub-condition 6, the sub-condition 7, the sub-condition 8, the sub-condition 9, or the sub-condition 10, and does not include another condition. This is not specifically limited. These sub-conditions are described below.

The sub-condition 1 is that a measurement result of a channel state information (CSI) reference signal transmitted over the unicast connection on the sidelink is less than a CSI measurement threshold. If the first condition includes the sub-condition 1, it indicates that the parameter of the sidelink monitored by the first terminal device includes the measurement result of the CSI reference signal transmitted over the unicast connection on the sidelink.

On a sidelink of V2X, a CSI reference signal is used in a unicast scenario. The CSI reference signal may be sent by a terminal device together with a data packet, or may be periodically sent. This is not limited in this embodiment of this application. When receiving the data packet, a terminal device serving as a receive end may perform measurement based on the received CSI reference signal, to obtain a measurement result of the CSI reference signal. For example, if the first terminal device needs to monitor the measurement result of the CSI reference signal, the first terminal device may serve as a receive end, and the second terminal device may send the CSI reference signal to the first terminal device over the unicast connection, so that the first terminal device may measure the CSI reference signal received from the second terminal device. Alternatively, even if the first terminal device serves as a transmit end, the first terminal device may still measure the sent CSI reference signal. This is not specifically limited. The measurement result of the CSI reference signal reflects a distance between the two terminal devices, or reflects channel quality between two the terminal devices. Generally, a larger value of the measurement result of the CSI reference signal indicates a better measurement result of the CSI reference signal, and the better measurement result of the CSI reference signal indicates a shorter distance between the two terminal devices or better channel quality between the two terminal devices.

Therefore, the CSI measurement threshold may be set. If the measurement result of the CSI reference signal is less than the CSI measurement threshold, it indicates that the measurement result of the CSI reference signal is relatively poor. This also reflects that quality of the unicast connection is relatively poor, and the unicast connection may be faulty. The CSI measurement threshold may be specified in a protocol, or configured by the network device for the terminal device. The network device is, for example, a base station, or may be a core network device. For example, when the network device is a base station, the network device may send the CSI measurement threshold to the terminal device by using a broadcast message, or may send the CSI measurement threshold to the terminal device by using radio resource control (radio resource control, RRC) signaling. The CSI measurement threshold may be applicable to the unicast connection of the first terminal device, may be applicable to a plurality of unicast connections of the first terminal device, or may be applicable to all unicast connections of the first terminal device.

The sub-condition 2 is that a measurement result of a channel busy ratio (CBR) of a resource configured for the sidelink is greater than a CBR measurement threshold. If the first condition includes the sub-condition 2, it indicates that the parameter of the sidelink monitored by the first terminal device includes the measurement result of the CBR of the resource configured for the sidelink.

In a V2X system, resources are all configured and managed based on a resource pool (resource pool). The terminal device may measure the resource configured for the sidelink. When measuring the resource configured for the sidelink, the first terminal device may measure a CBR of the resource pool, to obtain the measurement result of the CBR. A time-frequency resource on the sidelink of the V2X is configured for the terminal device in a form of a resource pool. It may be learned that if the first terminal device measures the CBR of the resource pool, the first terminal device may not depend on establishment of the unicast connection. Regardless of whether the unicast connection is established between the first terminal device and the second terminal device, the first terminal device may measure the CBR of the resource pool configured for the sidelink. The measurement result of the CBR reflects a load status of the resource pool. A higher value of the measurement result of the CBR indicates higher load of the resource pool.

Therefore, the CBR measurement threshold may be set. If the measurement result of the CBR is greater than the CBR measurement threshold, it indicates that the load of the resource pool is excessively high. This may cause poor quality of the unicast connection. The unicast connection may be faulty. The CBR measurement threshold may be specified in a protocol, or configured by the network device for the terminal device. The network device is, for example, a base station, or may be a core network device. For example, when the network device is a base station, the network device may send the CBR measurement threshold to the terminal device by using a broadcast message, or may send the CBR measurement threshold to the terminal device by using RRC signaling. The CBR measurement threshold may be applicable to the unicast connection of the first terminal device, may be applicable to a plurality of unicast connections of the first terminal device, or may be applicable to all unicast connections of the first terminal device.

The sub-condition 3 is that a quantity of retransmissions of a data packet transmitted over the unicast connection on the sidelink at a radio link control (RLC) layer is greater than or equal to a first quantity of retransmissions. If the first condition includes the sub-condition 3, it indicates that the parameter of the sidelink monitored by the first terminal device includes the quantity of retransmissions of the data packet transmitted over the unicast connection on the sidelink at the RLC layer.

If a bearer on the sidelink of the V2X supports acknowledged mode (AM) RLC, there is a data packet retransmission mechanism at the RLC layer. In this case, for a data packet transmitted over the unicast connection, a larger quantity of retransmissions at the RLC layer indicates poorer quality of the unicast connection.

Therefore, a threshold for the quantity of retransmissions may be set. The threshold for the quantity of retransmissions is referred to as, for example, a first quantity of retransmissions. If the quantity of retransmissions of the data packet transmitted over the unicast connection at the RLC layer is greater than or equal to the first quantity of retransmissions, it indicates that quality of the unicast connection is relatively poor, and the unicast connection may be faulty. The monitored data packet herein may be any data packet transmitted over the unicast connection. For example, the first terminal device may monitor each data packet in all or some data packets transmitted over the unicast connection, for example, monitor some data packets with a relatively high reliability requirement in data packets. Alternatively, the data packet may be a specific data packet transmitted over the unicast connection, for example, a test data packet used to specially monitor whether the unicast connection is faulty. The first quantity of retransmissions may be specified in a protocol, or configured by the network device for the terminal device. The network device is, for example, a base station, or may be a core network device. For example, when the network device is a base station, the network device may send the first quantity of retransmissions to the terminal device by using a broadcast message, or may send the first quantity of retransmissions to the terminal device by using RRC signaling. The first quantity of retransmissions may be applicable to the unicast connection of the first terminal device, may be applicable to a plurality of unicast connections of the first terminal device, or may be applicable to all unicast connections of the first terminal device.

The condition 4 is that a quantity of retransmissions of a data packet transmitted over the unicast connection on the sidelink at a media access control (MAC) layer is greater than or equal to a second quantity of retransmissions. If the first condition includes the sub-condition 4, it indicates that the parameter of the sidelink monitored by the first terminal device includes the quantity of retransmissions of the data packet transmitted over the unicast connection on the sidelink at the MAC layer.

At the MAC layer, a hybrid automatic repeat request (HARQ) mechanism may be usually supported. In the HARQ mechanism, if a data packet is transmitted incorrectly, the data packet may be retransmitted. In this case, for a data packet transmitted over the unicast connection, a larger quantity of retransmissions at the MAC layer indicates poorer quality of the unicast connection.

Therefore, a threshold for the quantity of retransmissions may be set. The threshold for the quantity of retransmissions is referred to as, for example, a second quantity of retransmissions. If the quantity of retransmissions of the data packet transmitted over the unicast connection at the MAC layer is greater than or equal to the second quantity of retransmissions, it indicates that quality of the unicast connection is relatively poor, and the unicast connection may be faulty. The monitored data packet herein may be any data packet transmitted over the unicast connection. For example, the first terminal device may monitor each data packet in all or some data packets transmitted over the unicast connection, for example, monitor some data packets with a relatively high reliability requirement in data packets. Alternatively, the data packet may be a specific data packet transmitted over the unicast connection, for example, a test data packet used to specially monitor whether the unicast connection is faulty. The second quantity of retransmissions may be specified in a protocol, or configured by the network device for the terminal device. The network device is, for example, a base station, or may be a core network device. For example, when the network device is a base station, the network device may send the second quantity of retransmissions to the terminal device by using a broadcast message, or may send the second quantity of retransmissions to the terminal device by using RRC signaling. The second quantity of retransmissions may be applicable to the unicast connection of the first terminal device, may be applicable to a plurality of unicast connections of the first terminal device, or may be applicable to all unicast connections of the first terminal device.

For example, the first quantity of retransmissions may be equal to or not equal to the second quantity of retransmissions. The first quantity of retransmissions may be related to implementation of the RLC layer, and the second quantity of retransmissions may be related to implementation of the MAC layer. This is not specifically limited.

The sub-condition 5 is that a quantity of times that a quantity of retransmissions of a data packet transmitted over the unicast connection on the sidelink at a MAC layer is greater than or equal to a second quantity of retransmissions is greater than or equal to a third quantity of times. If the first condition includes the sub-condition 5, it indicates that the parameter of the sidelink monitored by the first terminal device includes the quantity of times that the quantity of retransmissions of the data packet transmitted over the unicast connection on the sidelink at the MAC layer is greater than or equal to the second quantity of retransmissions.

As described in the sub-condition 4, for a data packet transmitted over the unicast connection, if the data packet is transmitted incorrectly, the data packet may be retransmitted. In this case, a larger quantity of retransmissions of the data packet at the MAC layer indicates poorer quality of the unicast connection. In the sub-condition 4, the quality of the unicast connection is determined based on the quantity of retransmissions of the data packet. Considering overall factors, for example, the quality of the unicast connection may fluctuate for a short period of time, the quality may be poor during transmission of one or several data packets, and then the quality becomes good. Therefore, an overall evaluation may be performed. Therefore, in the sub-condition 5, a plurality of data packets over the unicast connection may be monitored. If a quantity of times that a quantity of retransmissions of a data packet transmitted over the unicast connection at the MAC layer is greater than or equal to the second quantity of retransmissions is greater than or equal to the third quantity of times, it may be determined that the unicast connection may be faulty. For example, each data packet over the unicast connection in first duration may be monitored. If a quantity of times that a quantity of retransmissions of a data packet transmitted over the unicast connection at the MAC layer in the first duration is greater than or equal to the second quantity of retransmissions is greater than or equal to the third quantity of times, it may be determined that the unicast connection may be faulty. For example, that a quantity of times that a quantity of retransmissions of a data packet transmitted over the unicast connection at a MAC layer is greater than or equal to a second quantity of retransmissions is greater than or equal to a third quantity of times may also be understood as: A quantity of first-type data packets transmitted over the unicast connection is greater than or equal to a first quantity. The first-type data packet is a data packet whose quantity of retransmissions at the MAC layer is greater than or equal to the second quantity of retransmissions. Therefore, the sub-condition 5 may also be understood as: The quantity of first-type data packets transmitted over the unicast connection on the sidelink is greater than or equal to the first quantity. The first-type data packet is a data packet whose quantity of retransmissions at the MAC layer is greater than or equal to the second quantity of retransmissions. For example, there are two data packets, where a quantity of retransmissions of each of the two data packets over the unicast connection is greater than or equal to the second quantity of retransmissions. In this case, a quantity of times that a quantity of retransmissions of a data packet transmitted over the unicast connection at the MAC layer is greater than or equal to the second quantity of retransmissions is 2, and the quantity of first-type data packets is 2. Certainly, the first duration herein is merely an example. This is not specifically limited thereto. For another example, the terminal device may maintain a counter. When there is a data packet whose quantity of retransmissions at the MAC layer is greater than or equal to the second quantity of retransmissions, a value of the counter is increased by 1. An initial value of the counter is 0. When a count value of the counter is greater than or equal to the third quantity of times, it may be determined that the unicast connection may be faulty. The terminal device may maintain one counter for each unicast connection, or may maintain one counter for each logical channel in each unicast connection. In this case, a value of each counter is increased by 1 only because a quantity of retransmissions of a data packet on a corresponding logical channel at the MAC layer is greater than or equal to the second quantity of retransmissions. The sub-condition 5 may be used to perform relatively overall evaluation on the unicast connection, so that an obtained evaluation result is more accurate.

For example, the plurality of monitored data packets herein may be a plurality of data packets transmitted over the unicast connection. For example, the first terminal device may monitor a plurality of data packets in all or some data packets transmitted over the unicast connection, for example, monitor some data packets with a relatively high reliability requirement in data packets. Alternatively, the plurality of data packets may be specific data packets transmitted over the unicast connection, for example, test data packets used to specially monitor whether the unicast connection is faulty. The second quantity of retransmissions and the third quantity of times (or the first quantity) may be specified in a protocol, or configured by the network device for the terminal device. The network device is, for example, a base station, or may be a core network device. For example, when the network device is a base station, the network device may send the second quantity of retransmissions and the third quantity of times (or the first quantity) to the terminal device by using a broadcast message, or may send the second quantity of retransmissions and the third quantity of times (or the first quantity) to the terminal device by using RRC signaling. The second quantity of retransmissions and the third quantity of times (or the first quantity) may be applicable to the unicast connection of the first terminal device, may be applicable to a plurality of unicast connections of the first terminal device, may be applicable to all unicast connections of the first terminal device, or may be applicable to one or more bearers in the unicast connection of the first terminal device. In addition, if the first duration is set, the first duration may be specified in a protocol, or configured by the network device for the terminal device. The network device is, for example, a base station, or may be a core network device. For example, when the network device is a base station, the network device may send the first duration to the terminal device by using a broadcast message, or may send the first duration to the terminal device by using RRC signaling. The first duration may be applicable to the unicast connection of the first terminal device, may be applicable to a plurality of unicast connections of the first terminal device, may be applicable to all unicast connections of the first terminal device, or may be applicable to one or more bearers in the unicast connection of the first terminal.

The sub-condition 6 is that a result of an integrity check performed on a data packet transmitted over the unicast connection on the sidelink indicates that the check fails. If the first condition includes the sub-condition 6, it indicates that the parameter of the sidelink monitored by the first terminal device includes the result of the integrity check performed on the data packet transmitted over the unicast connection on the sidelink.

For transmission over the unicast connection on the sidelink of the V2X, an access stratum (AS) may be supported in performing an integrity check. To be specific, a terminal device serving as a transmit end performs integrity protection processing on a data packet when sending the data packet, and a terminal device serving as a receive end needs to perform an integrity check on the data packet when receiving the data packet. In this way, whether a current unicast connection is attacked can be identified. If an attacker exists, the integrity check of the terminal device serving as the receive end may fail. This reflects an issue of the unicast connection to some extent. Certainly, integrity protection on a data packet may alternatively be performed by an upper layer. In this case, both integrity protection and an integrity check on the data packet are performed by upper layers of the two terminal devices instead of AS layers. For example, the upper layer may be an application layer or a V2X layer above an RRC layer.

In this embodiment of this application, the sub-condition 6 may be that a result of an integrity check performed on a data packet transmitted over the unicast connection on the sidelink indicates that the check fails. The data packet may be any data packet transmitted over the unicast connection. For example, the first terminal device may monitor each data packet in all or some data packets transmitted over the unicast connection. Alternatively, the data packet may be a specific data packet transmitted over the unicast connection, for example, a test data packet used to specially monitor whether the unicast connection is faulty. Alternatively, the sub-condition 6 may be that a result of an integrity check performed on a plurality of data packets transmitted over the unicast connection on the sidelink indicates that the check fails. The plurality of data packets may be a plurality of data packets transmitted over the unicast connection. For example, the first terminal device may monitor the plurality of data packets in all or some data packets transmitted over the unicast connection. Alternatively, the plurality of data packets may be specific data packets transmitted over the unicast connection, for example, test data packets used to specially monitor whether the unicast connection is faulty. For example, a quantity threshold, for example, a second quantity, may be set. If a quantity of data packets that fail to pass the check is greater than or equal to the second quantity, the sub-condition 6 is satisfied. For example, a quantity of data packets that consecutively fail to pass the check may be greater than the second quantity, or a quantity of data packets that fail to pass the check in second duration may be greater than the second quantity.

If the second quantity needs to be used, the second quantity may be specified in a protocol, or configured by the network device for the terminal device. The network device is, for example, a base station, or may be a core network device. For example, when the network device is a base station, the network device may send the second quantity to the terminal device by using a broadcast message, or may send the second quantity to the terminal device by using RRC signaling. The second quantity may be applicable to the unicast connection of the first terminal device, may be applicable to a plurality of unicast connections of the first terminal device, may be applicable to all unicast connections of the first terminal device, or may be applicable to one or more bearers in the unicast connection of the first terminal. The second duration is also similar. If the second duration is set, the second duration may be specified in a protocol, or configured by the network device for the terminal device. The network device is, for example, a base station, or may be a core network device. For example, when the network device is a base station, the network device may send the second duration to the terminal device by using a broadcast message, or may send the second duration to the terminal device by using RRC signaling. The second duration may be applicable to the unicast connection of the first terminal device, may be applicable to a plurality of unicast connections of the first terminal device, may be applicable to all unicast connections of the first terminal device, or may be applicable to one or more bearers in the unicast connection of the first terminal.

In addition, if the unicast connection satisfies the sub-condition 6, to be specific, after the first terminal device performs the integrity check on the data packet transmitted over the unicast connection on the sidelink, the check result indicates that the check fails, the first terminal device discards the data packet that fails to pass the check.

The sub-condition 7 is that a decryption result of a data packet transmitted over the unicast connection on the sidelink indicates that the decryption fails. If the first condition includes the sub-condition 7, it indicates that the parameter of the sidelink monitored by the first terminal device includes the decryption result of the data packet transmitted over the unicast connection on the sidelink.

Similar to the integrity check, an upper layer or AS layer of the terminal device may further encrypt/decrypt the data packet transmitted over the unicast connection. For example, a terminal device serving as a transmit end may encrypt a to-be-sent data packet, and send an encrypted data packet; and a terminal device serving as a receive end may decrypt a received data packet. A data packet obtained through decryption may be considered as a decryption result. If the decryption result is correct, it indicates that the decryption is successful; and if the decryption result is incorrect, it indicates that the decryption fails. This reflects an issue of the unicast connection to some extent.

In this embodiment of this application, the sub-condition 7 may be that a result of decryption performed on a data packet transmitted over the unicast connection on the sidelink indicates that the check fails. The data packet may be any data packet transmitted over the unicast connection. For example, the first terminal device may monitor each data packet in all or some data packets transmitted over the unicast connection. Alternatively, the data packet may be a specific data packet transmitted over the unicast connection, for example, a test data packet used to specially monitor whether the unicast connection is faulty. Alternatively, the sub-condition 7 may be that a result of decryption performed on a plurality of data packets transmitted over the unicast connection on the sidelink indicates that the check fails. The plurality of data packets may be a plurality of data packets transmitted over the unicast connection. For example, the first terminal device may monitor the plurality of data packets in all or some data packets transmitted over the unicast connection. Alternatively, the plurality of data packets may be specific data packets transmitted over the unicast connection, for example, test data packets used to specially monitor whether the unicast connection is faulty. For example, a quantity threshold, for example, a third quantity, may be set. If a quantity of data packets that fail to be decrypted is greater than the third quantity, the sub-condition 7 is satisfied. For example, a quantity of data packets that consecutively fail to be decrypted may be greater than the third quantity, or a quantity of data packets that fail to be decrypted in third duration may be greater than the third quantity.

If the third quantity needs to be used, the third quantity may be specified in a protocol, or configured by the network device for the terminal device. The network device is, for example, a base station, or may be a core network device. For example, when the network device is a base station, the network device may send the third quantity to the terminal device by using a broadcast message, or may send the third quantity to the terminal device by using RRC signaling. The third quantity may be applicable to the unicast connection of the first terminal device, may be applicable to a plurality of unicast connections of the first terminal device, may be applicable to all unicast connections of the first terminal device, or may be applicable to one or more bearers in the unicast connection of the first terminal. The third duration is also similar. If the third duration is set, the third duration may be specified in a protocol, or configured by the network device for the terminal device. The network device is, for example, a base station, or may be a core network device. For example, when the network device is a base station, the network device may send the third duration to the terminal device by using a broadcast message, or may send the third duration to the terminal device by using RRC signaling. The third duration may be applicable to the unicast connection of the first terminal device, may be applicable to a plurality of unicast connections of the first terminal device, may be applicable to all unicast connections of the first terminal device, or may be applicable to one or more bearers in the unicast connection of the first terminal.

The sub-condition 8 is that out-of-synchronization information of the unicast connection on the sidelink indicates that the first terminal device and the second terminal device are out of synchronization. If the first condition includes the sub-condition 8, it indicates that the parameter of the sidelink monitored by the first terminal device includes the out-of-synchronization information of the unicast connection on the sidelink.

In the V2X, a synchronization source of the terminal device may include a base station, a global navigation satellite system (GNSS), or another terminal device. Two terminal devices having a unicast connection therebetween may be configured with different synchronization sources. In this case, out-of-synchronization may occur in the unicast connection. For example, a terminal device serving as a receive end may determine, based on a time difference between a transmit frame boundary of a terminal device serving as a transmit end and a receive frame boundary of the terminal device serving as the receive end, whether out-of-synchronization occurs in the unicast connection. The time difference may be understood as an implementation of the out-of-synchronization information. For example, if the time difference between the transmit frame boundary and the receive frame boundary is greater than a time difference threshold, it may be determined that out-of-synchronization occurs in the unicast connection. In this case, transmission of a data packet between the two terminal devices may be incorrect.

If the time difference threshold needs to be used, the time difference threshold may be specified in a protocol, or configured by the network device for the terminal device. The network device is, for example, a base station, or may be a core network device. For example, when the network device is a base station, the network device may send the time difference threshold to the terminal device by using a broadcast message, or may send the time difference threshold to the terminal device by using RRC signaling. The time difference threshold may be applicable to the unicast connection of the first terminal device, may be applicable to a plurality of unicast connections of the first terminal device, or may be applicable to all unicast connections of the first terminal device.

The sub-condition 9 is that a quality of service (QoS) parameter of the unicast connection on the sidelink does not satisfy a value condition of the QoS parameter. If the first condition includes the sub-condition 9, it indicates that the parameter of the sidelink monitored by the first terminal device includes the QoS parameter of the unicast connection on the sidelink.

For example, the terminal device may collect statistics on the QoS parameter in fourth duration, to determine whether a value of the QoS parameter in the fourth duration satisfies the value condition of the QoS parameter. The QoS parameter includes, for example, at least one of parameters such as a packet loss rate, a bit rate, or a delay in the fourth duration. In the unicast connection, these indicators usually need to be ensured. Certainly, different QoS parameters need to satisfy different value conditions of the QoS parameters. For example, when the packet loss rate in the fourth duration is greater than or equal to a packet loss rate threshold, it indicates that the packet loss rate in the fourth duration does not satisfy the value condition of the QoS parameter; when the bit rate in the fourth duration is less than or equal to a bit rate threshold, it indicates that the bit rate in the fourth duration does not satisfy the value condition of the QoS parameter; and when the delay in the fourth duration is greater than or equal to a delay threshold, it indicates that the delay in the fourth duration does not satisfy the value condition of the QoS parameter. Specifically, for statistics collected on the delay, a time stamp may be added to the data packet, that is, a sending time stamp is added to the data packet at a transmit end. A receiving time is recorded when the data packet is received at a receive end. A time difference between the receiving time and the sending time is used to identify the delay.

The fourth duration and the value condition of the QoS parameter may be specified in a protocol, or configured by the network device for the terminal device. The network device is, for example, a base station, or may be a core network device. For example, when the network device is a base station, the network device may send the fourth duration and the value condition of the QoS parameter to the terminal device by using a broadcast message, or may send the fourth duration and the value condition of the QoS parameter to the terminal device by using RRC signaling. The fourth duration and the value condition of the QoS parameter may be applicable to the unicast connection of the first terminal device, may be applicable to a plurality of unicast connections of the first terminal device, may be applicable to all unicast connections of the first terminal device, or may be applicable to one or more bearers in the unicast connection of the first terminal.

The sub-condition 10 is that no unicast connection has been established to the first terminal device by using a source layer-2 (layer 2, L2) identifier that is carried when a data packet is transmitted over the unicast connection on the sidelink. If the first condition includes the sub-condition 10, it indicates that the parameter of the sidelink monitored by the first terminal device includes the source L2 identifier that is carried when the data packet is transmitted over the unicast connection on the sidelink.

Figure 5:
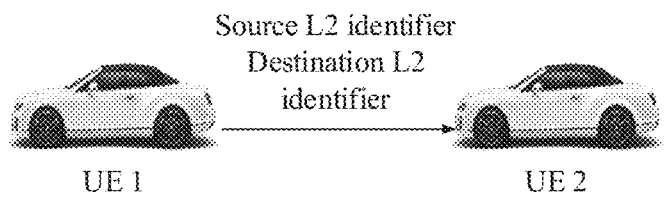
FIG. 5 is a schematic diagram of L2 identifiers that are carried when a terminal device sends a data packet according to an embodiment of this application.

In the unicast connection, a terminal device serving as a transmit end and a terminal device serving as a receive end each have an L2 identifier, to uniquely identify a corresponding terminal device or a corresponding unicast connection. In other words, an L2 identifier may be set for each terminal device, or an L2 identifier may be set for each unicast connection. The L2 identifier is, for example, an L2 identifier (ID) or an identifier in another form. For example, an L2 identifier is set for each terminal device herein. During initial establishment of the unicast connection, the terminal device serving as the transmit end and the terminal device serving as the receive end exchange their L2 identifiers, or pre-configure the L2 identifiers for each other, to complete the establishment of the unicast connection. The data packet is also subsequently processed based on the L2 identifiers. Referring to FIG. 5, when the terminal device (where UE 1 is used as an example in FIG. 5) serving as the transmit end sends a data packet, the L2 identifier of the terminal device serving as the transmit end and the L2 identifier of the terminal device (where UE 2 is used as an example in FIG. 5) serving as the receive end are carried. For example, the L2 identifier of the terminal device serving as the transmit end is used as a source L2 identifier, and the L2 identifier of the terminal device serving as the receive end is used as a destination L2 identifier. That the destination L2 identifier is carried may be that the destination L2 identifier is carried in a MAC protocol data unit (PDU) header, may be that the destination L2 identifier is used for scrambling processing, or may be that the destination L2 identifier is split into two parts, where one part is carried in a MAC PDU header, and the other part is used for scrambling processing. The terminal device serving as the receive end first determines, based on the destination L2 identifier, whether the data packet is a data packet sent to the terminal device serving as the receive end. To be specific, the terminal device serving as the receive end may determine whether the destination L2 identifier is the same as the L2 identifier of the terminal device serving as the receive end; and if the destination L2 identifier is the same as the L2 identifier of the terminal device serving as the receive end, the terminal device serving as the receive end determines that the data packet is sent to itself; or if the destination L2 identifier is different from the L2 identifier of the terminal device serving as the receive end, the terminal device serving as the receive end determines that the data packet is not sent to itself. In addition, if the destination L2 identifier is different from the L2 identifier of the terminal device serving as the receive end, it may indicate that no unicast connection has been established between the terminal device corresponding to the source L2 identifier and the terminal device serving as the receive end. If the terminal device serving as the receive end determines that the data packet is sent to itself, the terminal device may perform processing based on the source L2 identifier carried in the data packet. For example, the terminal device may transfer the data packet to a logical channel corresponding to the source L2 identifier for processing.

In another implementation, the terminal device may store L2 IDs of all terminal devices that each have established a unicast connection to the terminal device. In this case, after the terminal device receives a data packet, if a source L2 ID carried in the data packet is not in a list of the L2 IDs that are stored by the terminal device and that are of all the terminal devices that each have established the unicast connection, the terminal device may consider that the data packet should not be received. This may also indicate that no unicast connection has been established between a terminal device corresponding to the source L2 identifier carried in the data packet and the terminal device serving as the receive end.

In this embodiment of this application, the sub-condition 10 may be that no unicast connection has been established to the first terminal device by using a source layer-2 (layer 2, L2) identifier that is carried when a data packet is transmitted over the unicast connection on the sidelink. The data packet may be any data packet transmitted over the unicast connection. For example, the first terminal device may monitor each data packet in all or some data packets transmitted over the unicast connection. Alternatively, the data packet may be a specific data packet transmitted over the unicast connection, for example, a test data packet used to specially monitor whether the unicast connection is faulty. Alternatively, the sub-condition 10 may be that no unicast connection has been established to the first terminal device by using source L2 identifiers that are carried when a plurality of data packets are transmitted over the unicast connection on the sidelink. The plurality of data packets may be a plurality of data packets transmitted over the unicast connection. For example, the first terminal device may monitor a plurality of data packets in all or some data packets transmitted over the unicast connection. Alternatively, the plurality of data packets may be specific data packets transmitted over the unicast connection, for example, test data packets used to specially monitor whether the unicast connection is faulty. For example, a quantity threshold, for example, a fourth quantity, may be set. If a quantity of data packets is greater than the fourth quantity, where no unicast connection has been established to the first terminal device by using source L2 identifiers that are carried when the data packets are sent, the sub-condition 10 is satisfied. For example, the sub-condition 10 may be that the quantity of data packets is greater than or equal to the fourth quantity, where no unicast connection has been established to the first terminal device by using the source L2 identifiers that are carried when the data packets are sent; or a quantity of data packets is greater than or equal to the fourth quantity, where no unicast connection has been established to the first terminal device by using source L2 identifiers that are carried in fifth duration when the data packets are sent.

If the fourth quantity needs to be used, the fourth quantity may be specified in a protocol, or configured by the network device for the terminal device. The network device is, for example, a base station, or may be a core network device. For example, when the network device is a base station, the network device may send the fourth quantity to the terminal device by using a broadcast message, or may send the fourth quantity to the terminal device by using RRC signaling. The fourth quantity may be applicable to the unicast connection of the first terminal device, may be applicable to a plurality of unicast connections of the first terminal device, may be applicable to all unicast connections of the first terminal device, or may be applicable to one or more bearers in the unicast connection of the first terminal. The fifth duration is also similar. If the fifth duration is set, the fifth duration may be specified in a protocol, or configured by the network device for the terminal device. The network device is, for example, a base station, or may be a core network device. For example, when the network device is a base station, the network device may send the fifth duration to the terminal device by using a broadcast message, or may send the fifth duration to the terminal device by using RRC signaling. The fifth duration may be applicable to the unicast connection of the first terminal device, may be applicable to a plurality of unicast connections of the first terminal device, may be applicable to all unicast connections of the first terminal device, or may be applicable to one or more bearers in the unicast connection of the first terminal.

In addition, if the unicast connection satisfies the sub-condition 10, to be specific, the first terminal device determines that no unicast connection has been established to the first terminal device by using the source L2 identifier that is carried when the data packet is transmitted over the unicast connection on the sidelink, the first terminal device discards the data packet.

If determining that the unicast connection on the sidelink satisfies the first condition, the first terminal device may determine that the unicast connection is faulty. When the unicast connection is faulty, or when the first terminal device determines that the unicast connection satisfies the first condition, because the scenario used in this embodiment of this application is that the first terminal device is connected to the network device, the first terminal device may indicate a fault of the unicast connection to the network device, or the first terminal device may perform processing by itself.

If the first terminal device indicates the fault of the unicast connection to the network device, refer to S43 in FIG. 4. The first terminal device may send a first message to the network device, and the network device receives the first message from the first terminal device. The first message is, for example, a message used to specially indicate to the network device that the unicast connection is faulty. In this case, the first message is used to indicate that the unicast connection is faulty. In this case, provided that the terminal device sends a first message to the network device, the network device can determine that a unicast connection is faulty. Alternatively, the first message includes first indication information, and the first indication information may indicate a unicast connection fault. In this case, the first message may reuse a message in the prior art, for example, may reuse a sidelink UE information (SidelinkUEInformation) message, a UE assistance information (UEAssistenceInformation) message, or a failure information (FailureInformation) message. If the message in the prior art is reused, the first indication information may be added to the message in the prior art, to indicate the unicast connection fault by using the first indication information. S43 is only an optional step, and is not mandatory. Therefore, an arrow of S43 is represented by a dashed line.

The first indication information may indicate only a unicast connection fault. If there are a plurality of unicast connections between the first terminal device and the second terminal device, the network device may not determine a specific faulty unicast connection. Therefore, the first message may further include second indication information, and the second indication information is used to indicate the faulty unicast connection. For example, the second indication information may indicate an ID of the unicast connection, namely, a destination L2 identifier, or an index of the unicast connection, where the index corresponds to a position of the faulty unicast connection in a unicast connection information list reported by the terminal device, or other information indicating the unicast connection. In a word, the second indication information can be used to uniquely determine the unicast connection. For the sub-condition 10, a source L2 identifier is found in a data receiving process, where no connection has been established by using the source L2 identifier. In this case, to identify a specific unicast connection having a security risk, the first terminal device may configure different L2 identifiers for different connections. In this case, a destination L2 ID corresponding to a data packet received by the first terminal device is a source L2 ID allocated by the first terminal device to a unicast connection. A faulty unicast connection, namely, the unicast connection having the security risk, may be determined based on the source L2 identifier. In this way, the network device can determine the faulty unicast connection, to perform targeted processing.

In addition, it should be noted that, in addition to the first terminal device, the second terminal device may also monitor the unicast connection. A monitoring manner of the second terminal device may be the same as that of the first terminal device. For example, the second terminal device also determines whether the unicast connection satisfies the first condition. The technical solution in this embodiment of this application may be applied to the application scenario shown in FIG. 3A or the application scenario shown in FIG. 3B. When the technical solution in this embodiment of this application is applied to the application scenario shown in FIG. 3A, if the second terminal device detects a unicast connection fault, the second terminal device may also perform processing the same as that performed by the first terminal device. For example, the second terminal device may also send a corresponding indication to the network device, to indicate the unicast connection fault, or the second terminal device may determine corresponding configuration information by itself. When the technical solution in this embodiment of this application is applied to the application scenario shown in FIG. 3A, it may be considered that the first terminal device and the second terminal device are of peer ends, and processing manners may be the same. Therefore, only the first terminal device is used as an example for description.

The foregoing describes the plurality of sub-conditions, or describes the plurality of parameters of the sidelink. Detection results of some parameters may be related to a resource used by the unicast connection. For example, for the parameters of the sidelink, for example, the measurement result of the CSI, the measurement result of the CBR, the quantity of retransmissions at the RLC layer, the quantity of retransmissions at the MAC layer, the quantity of times that the quantity of retransmissions of the data packet transmitted over the unicast connection on the sidelink at the MAC layer is greater than the second quantity of retransmissions, or the QoS parameter, detection results may be related to the resource used by the unicast connection. If the detection results of the parameters of the sidelink indicate that the unicast connection is faulty, the fault may be probably caused by relatively poor quality of the resource used by the unicast connection. Therefore, if the first condition includes one or any combination of the following: the measurement result of the CSI reference signal is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter, that is, the first condition includes one or any combination of the sub-condition 1, the sub-condition 2, the sub-condition 3, the sub-condition 4, the sub-condition 5, or the sub-condition 9, the first message may further include third indication information, and the third indication information may be used to indicate the resource used by the unicast connection. Therefore, after receiving the first message, the network device may determine the resource used by the unicast connection. For example, the network device may consider to recover the unicast connection by reconfiguring the resource used by the unicast connection, that is, process the fault of the unicast connection. Certainly, in addition to the several sub-conditions, if there is another sub-condition related to the resource used by the unicast connection, and if the first condition satisfied by the unicast connection includes these sub-conditions, the first message may further include the third indication information. The third indication information indicates a resource used by the unicast connection, and may be specifically indication information of a carrier, a bandwidth part (BWP), or a resource pool. Alternatively, regardless of which type or types of sub-conditions are included in the first condition, the first message may include the third indication information, and the third indication information may be used to indicate the resource used by the unicast connection.

In addition, because the fault of the unicast connection is indicated to the network device, the network device may be more expected to indicate to recover the unicast connection as soon as possible. Therefore, to accelerate a processing speed of the network device, the first message may further include fourth indication information, and the fourth indication information may include a first condition satisfied by the unicast connection. For example, the first condition that is satisfied by the unicast connection and that is included in the fourth indication information is that the measurement result of the CSI reference signal is less than the CSI measurement threshold, or is that the measurement result of the CBR is greater than the CBR measurement threshold and the decryption result of the data packet transmitted over the unicast connection indicates the decryption failure. After receiving the first message, the network device can determine an issue of the unicast connection based on the fourth indication information. This helps the network device determine a more targeted means for recovering the unicast connection.

The first terminal device determines, based on the fourth indication information, that the unicast connection satisfies the sub-condition 10, to be specific, no unicast connection has been established to the first terminal device by using the source L2 identifier that is carried when the data packet is transmitted over the unicast connection on the sidelink. In this case, a solution that can be used by the first terminal device is: The first terminal device updates the L2 identifier of the first terminal device, and sends an updated L2 identifier of the first terminal device to the second terminal device, so that the second terminal device can learn of the updated L2 identifier of the first terminal device. In this way, when the first terminal device receives a data packet from the second terminal device over the unicast connection again, a source L2 identifier carried in the data packet has been used to establish the unicast connection to the first terminal device.

In this embodiment of this application, after determining that the unicast connection satisfies the first condition, the first terminal device may obtain first configuration information. The first configuration information may be used to recover the unicast connection, and the first configuration information may be understood as new configuration information of the unicast connection. For example, the first terminal device may obtain the first configuration information via the network device. For example, after the first terminal device sends indication information to the network device, the network device may determine the first configuration information for the unicast connection, and send the first configuration information to the first terminal device. The first terminal device may receive the first configuration information from the network device. For example, if the first terminal device is in an NR V2X mode 1 or LTE V2X mode 3, the first terminal device may obtain the first configuration information via the network device. Certainly, even if the first terminal device is in the NR V2X mode 1 or LTE V2X mode 3, the first terminal device may alternatively determine the first configuration information by itself. Alternatively, the first terminal device may determine the first configuration information by itself. For example, if the first terminal device is in an NR V2X mode 2 or LTE V2X mode 4, the first terminal device may determine the first configuration information by itself. Certainly, even if the first terminal device is in the NR V2X mode 2 or LTE V2X mode 4, the first terminal device may alternatively obtain the first configuration information via the network device. For example, the network device may broadcast configuration information, or send configuration information by using dedicated signaling. In this case, the first terminal device may receive the configuration information broadcast by the network device or sent by using the dedicated signaling, and the configuration information may be used as the first configuration information. Alternatively, if the first terminal device is not connected to the network device, for example, neither the first terminal device nor the second terminal device is connected to the network device, the first terminal device can determine the first configuration information by itself. In this case, the first terminal device is triggered to autonomously perform reconfiguration. For example, the first configuration information determined by the first terminal device may include resource configuration information. In other words, the first terminal device may select another resource for the unicast connection.

The first configuration information obtained by the first terminal device may be used by the first terminal device to configure the unicast connection. The unicast connection is a unicast connection between the first terminal device and the second terminal device. Therefore, to recover the unicast connection, the second terminal device also needs to reconfigure the unicast connection. In this case, the second terminal device also needs to obtain corresponding configuration information. For example, the configuration information obtained by the second terminal device is referred to as second configuration information. For example, the first configuration information may be the same as or different from the second configuration information.

If the technical solution provided in this embodiment of this application is applied to the application scenario shown in FIG. 3A, a manner in which the second terminal device obtains the configuration information may be the same as that of the first terminal device. That is, the second terminal device may receive the second configuration information from the network device. For example, after receiving indication information sent by the first terminal device, the network device may determine the first configuration information and the second configuration information, send the first configuration information to the first terminal device, and send the second configuration information to the second terminal device. Alternatively, the second terminal device may determine the second configuration information by itself. Alternatively, if the technical solution provided in this embodiment of this application is applied to the application scenario shown in FIG. 3A, a manner in which the second terminal device obtains the configuration information may be different from that of the first terminal device. For example, the first terminal device may send the second configuration information to the second terminal device, and the second terminal device may receive the second configuration information from the first terminal device. In FIG. 4, an example in which the first terminal device sends the second configuration information to the second network device is used. For this, refer to S44. Because S44 is only an optional step and is not mandatory, an arrow representing S44 is drawn as a dashed line. If the first terminal device sends the second configuration information to the second terminal device, the network device may send both the first configuration information and the second configuration information to the first terminal device, and the first terminal device may send the second configuration information to the second terminal device; or the first terminal device may send the first configuration information to the second terminal device, and after receiving the first configuration information, the second terminal device performs adaptation based on the first configuration information, to determine configuration information applicable to the second terminal device. In this case, the first configuration information is the same as the second configuration information, and the second configuration information is not the configuration information applicable to the second terminal device. In another case, the first configuration information may be different from the second configuration information, and the second configuration information is the configuration information applicable to the second terminal device. Alternatively, the first terminal device may determine the second configuration information by itself, and send the second configuration information to the second terminal device, and the second terminal device does not need to perform adaptation based on the first configuration information.

If the technical solution provided in this embodiment of this application is applied to the application scenario shown in FIG. 3B, the first terminal device may send the second configuration information to the second terminal device. In this case, the second terminal device may receive the second configuration information from the first terminal device. If the first terminal device sends the second configuration information to the second terminal device, the network device may send both the first configuration information and the second configuration information to the first terminal device, and the first terminal device may send the second configuration information to the second terminal device; or the first terminal device may send the first configuration information to the second terminal device, and after receiving the first configuration information, the second terminal device performs adaptation based on the first configuration information, to determine configuration information applicable to the second terminal device. In this case, the first configuration information is the same as the second configuration information, and the second configuration information is not the configuration information applicable to the second terminal device. In another case, the first configuration information may be different from the second configuration information, and the second configuration information is the configuration information applicable to the second terminal device. Alternatively, the first terminal device may determine the second configuration information by itself, and send the second configuration information to the second terminal device, and the second terminal device does not need to perform adaptation based on the first configuration information.

In addition, if the network device sends the first configuration information to the first terminal device, the network device needs to obtain a Uu interface identifier of the first terminal device in advance. Similarly, if the network device sends the second configuration information to the second terminal device, the network device needs to obtain a Uu interface identifier of the second terminal device in advance. For example, in a process in which the first terminal device and the second terminal device initially establish the unicast connection, the first terminal device may send the Uu interface identifier of the second terminal device to the network device.

If the first terminal device sends the second configuration information to the second terminal device, the first terminal device may send the second configuration information in a plurality of manners.

Figure 6A:
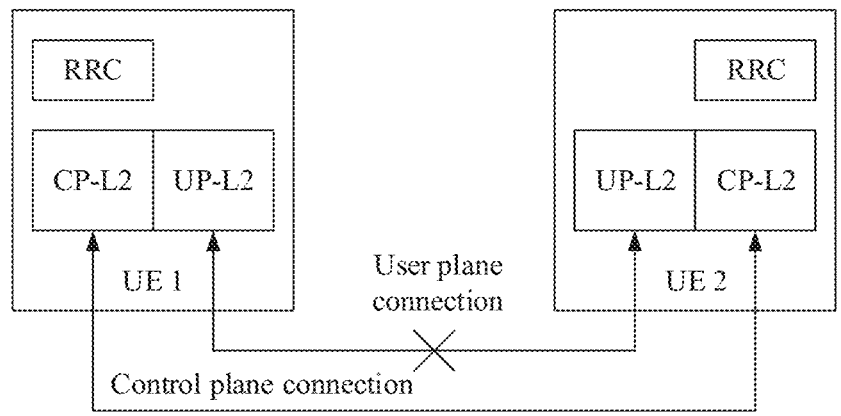
FIG. 6A is a schematic diagram of sending second configuration information by a first terminal device to a second terminal device through an SRB having a dedicated sending resource according to an embodiment of this application.

For example, if a resource allocated to a signaling radio bearer (SRB) is different from a resource allocated to a data radio bearer (DRB), that is, the SRB has a dedicated sending resource, the unicast connection is faulty, which usually means that the DRB is faulty, but the SRB may still work normally. Therefore, the first terminal device may send the second configuration information to the second terminal device through the SRB, and the second terminal device receives the second configuration information from the first terminal device through the SRB. For this, refer to FIG. 6A. It may be learned from FIG. 6A that, if the unicast connection is faulty, a user plane (UP) connection of a layer 2 (L2) is faulty. In this case, the first terminal device (where UE 1 is used as an example in FIG. 6A) may send the second configuration information to the second terminal device (where UE 2 is used as an example in FIG. 6A) over a control plane (CP) connection of the layer 2.

Figure 6B:
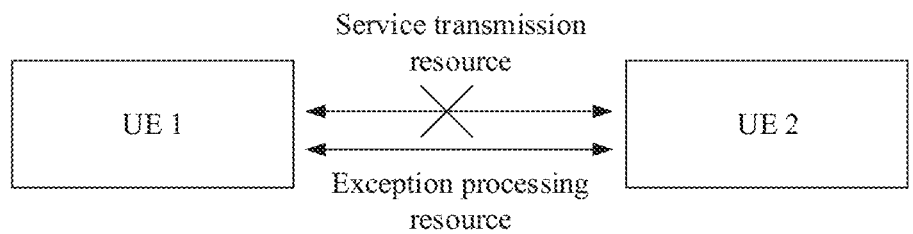
FIG. 6B is a schematic diagram of sending second configuration information by a first terminal device to a second terminal device by using a resource used to specially process a unicast connection fault according to an embodiment of this application.

Alternatively, from a perspective of the entire unicast connection, a resource allocated to an SRB is the same as a resource allocated to a DRB. In this case, if the unicast connection is faulty, a corresponding SRB may also be faulty. In this case, if the second configuration information is sent through the SRB, the second configuration information may fail to be sent. Therefore, in this case, a resource may be reserved to specially process the unicast connection fault, so that the first terminal device may send the second configuration information to the second terminal device by using the resource used to specially process the unicast connection fault, and the second terminal device may also receive the second configuration information from the first terminal device by using the resource used to specially process the unicast connection fault. For example, the resource used to specially process the unicast connection fault may be specified in a protocol, or may be configured by the network device. For this, refer to FIG. 6B. It may be learned from FIG. 6B that, if the unicast connection is faulty, that is, a service transmission resource cannot be continuously used, the first terminal device may send the second configuration information to the second terminal device by using an exception processing resource. The exception processing resource is a resource used to specially process the unicast connection fault. For example, the resource used to specially process the unicast connection fault may alternatively be configured for the SRB. In other words, in this case, the first terminal device may still send the second configuration information through the SRB.

The foregoing two manners may also be combined. For example, an attempt is first made to recover the unicast connection by using a resource of an SRB, and if the unicast connection fails to be recovered, the unicast connection is recovered by using a resource used to specially process the unicast connection fault. The foregoing two manners of sending the second configuration information are both completed at the AS layer, and the second configuration information is sent through the SRB. In this way, processes such as recovery of the unicast connection may be completed at the AS layer if possible, and do not need to be performed at more layers. This reduces processing processes.

Figure 6C:
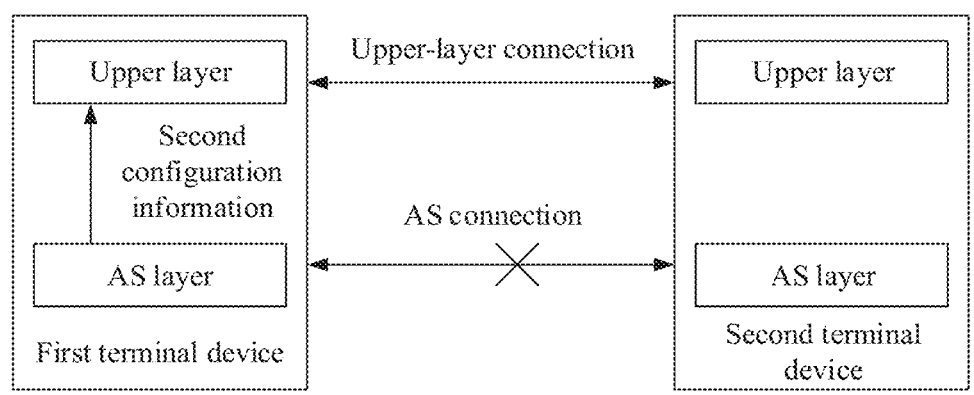
FIG. 6C is a schematic diagram of sending second configuration information by a first terminal device to a second terminal device through upper layer signaling according to an embodiment of this application.

Alternatively, the first terminal device may send the second configuration information to the second terminal device through upper layer signaling. For example, the upper layer signaling is referred to as first upper layer signaling. As described above, the upper layer is, for example, a V2X layer or an application layer, and the upper layer signaling is, for example, PC5-S signaling or other signaling. For example, referring to FIG. 6C, after determining that the unicast connection is faulty, the AS layer of the first terminal device may obtain corresponding second configuration information. The AS layer of the first terminal device delivers the second configuration information to an upper layer of the first terminal device. The upper layer of the first terminal device triggers PC5-S signaling, and sends the second configuration information through the PC5-S signaling.

Figure 7:
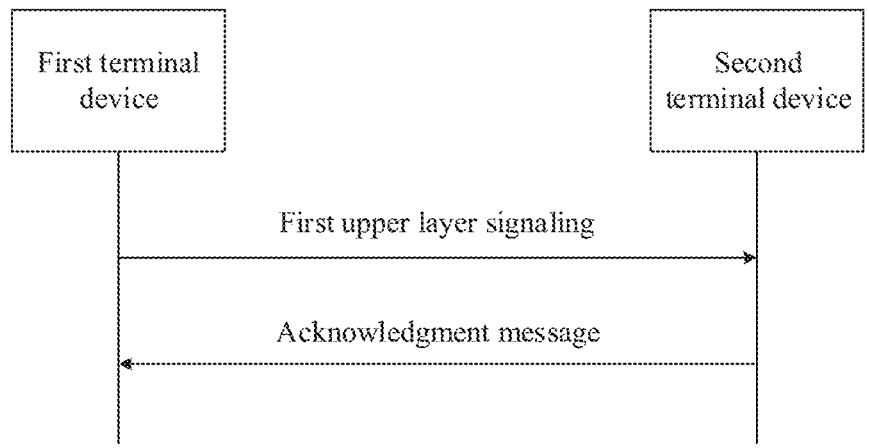
FIG. 7 is a schematic interaction diagram of sending first upper layer signaling by a first terminal device to a second terminal device according to an embodiment of this application.

For example, the first upper layer signaling may be sent in a broadcast manner or in a unicast manner. For example, the first upper layer signaling is sent in a broadcast manner. For a signaling exchange manner, refer to FIG. 7. In FIG. 7, the first terminal device sends the first upper layer signaling to the second terminal device. After receiving the first upper layer signaling, the second terminal device may recover the unicast connection based on the second configuration information, and may send an acknowledgment message to the first terminal device. The acknowledgment message may be understood as an acknowledgment of the first upper layer signaling. The acknowledgment message may be replied in a broadcast manner, or may be sent to the first terminal device over the unicast connection after the unicast connection is recovered.

In conclusion, the first terminal device may send the second configuration information to the second terminal device through the AS layer or the upper layer. The two sending manners may be independent of each other. During specific implementation, one of the two sending manners may be selected for application, and a specific sending manner may be specified in a protocol or configured by the network device in advance. Alternatively, the two sending manners may be combined for application. For example, the second configuration information is preferentially sent through the AS layer. If a resource of the AS layer is unavailable, or sending of the second configuration information through the AS layer fails, the second configuration information is sent through the upper layer. In this case, if a connection of the upper layer is also disconnected, for example, the first terminal device does not receive a response from the second terminal device after sending the first upper layer signaling to the second terminal device, the connection of the upper layer may be unreachable. For example, the first terminal device is excessively far away from the second terminal device. Consequently, sidelinks, including a unicast link and a broadcast link, are unreachable. In this case, the first terminal device may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. Specifically, the indication may be triggered by the AS layer of the first terminal device to the application layer, or may be triggered by an upper layer (where in this case, the upper layer is not the application layer) of the first terminal device for the application layer. After receiving the indication, the application layer may select a Uu interface to transmit a service carried on the unicast connection. For details about how to perform transmission through the Uu interface, refer to the prior art. Alternatively, when the first terminal device sends the second configuration information to the second terminal device through the AS layer, if resources at the AS layer are unavailable, that is, a connection of the AS layer is disconnected, for example, the first terminal device does not receive a response from the second terminal device after sending the second configuration information to the second terminal device through the SRB, the connection of the AS layer may be unreachable. In this case, the first terminal device does not need to send the second configuration information through the upper layer, but may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. Specifically, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection. Alternatively, when the first terminal device sends the second configuration information to the second terminal device through the upper layer (not through the AS layer), if resources at the upper layer are unavailable, that is, a connection of the upper layer is disconnected, for example, the first terminal device does not receive a response from the second terminal device after sending the second configuration information to the second terminal device through the first upper layer signaling, the connection of the upper layer may be unreachable. In this case, the first terminal device may trigger an indication to the application layer of the first terminal device, to indicate that a current sidelink is unavailable. For example, an upper layer (where in this case, the upper layer is not the application layer) of the first terminal device sends the notification information to the application layer of the first terminal device, where the notification information is used to indicate that the current sidelink is unavailable. The notification information is actually a type of trigger information. After receiving the indication, the application layer may select a Uu interface to transmit a service carried on the unicast connection.

Both the first configuration information and the second configuration information may include at least one of a bearer configuration, a security configuration, or a resource configuration, and certainly, may further include another configuration. The resource configuration includes, for example, at least one of a resource pool configuration, a bandwidth part (BWP) configuration, or a carrier configuration, and certainly, may further include another resource configuration. The bearer configuration includes, for example, at least one of a packet data convergence protocol (PDCP) configuration, a radio link control (RLC) configuration, a media access control (MAC) configuration, or a service data adaptation protocol (SDAP) configuration. The security configuration includes, for example, at least one of configurations such as a security key, a security algorithm, or a security capability. The first terminal device may recover the unicast connection based on the first configuration information, and the second terminal device may recover the unicast connection based on the second configuration information, so that the first terminal device and the second terminal device may continue to transmit data over the recovered unicast connection.

In addition, in this embodiment of this application, if the first terminal device finds, in a process of sending a data packet to the second terminal device over the unicast connection, that the unicast connection satisfies the first condition, after determining that the unicast connection is faulty or determining that the unicast connection satisfies the first condition, the first terminal device may stop sending a data packet to the second terminal device over the unicast connection. On the sidelink, a sending process and a receiving process are independent of each other. Therefore, if the first terminal device still receives data over the unicast connection, the first terminal device may continue the process of receiving the data. Similarly, if the first terminal device finds, in a process of receiving a data packet from the second terminal device over the unicast connection, that the unicast connection satisfies the first condition, after determining that the unicast connection is faulty or determining that the unicast connection satisfies the first condition, if the first terminal device still sends a data packet to the second terminal device over the unicast connection, the first terminal device may stop sending the data packet to the second terminal device over the unicast connection. The first terminal device finds the fault when the first terminal device serves as a receive end. Therefore, if the second terminal device still sends a data packet to the first terminal device over the unicast connection, the first terminal device possibly cannot indicate the second terminal device to stop sending the data packet, and the first terminal device may still continue receiving the data packet over the unicast connection. Certainly, after determining that the unicast connection is faulty, the second terminal device also stops sending a data packet to the first terminal device over the unicast connection. In this case, the first terminal device may stop receiving the data packet over the unicast connection. Optionally, if the first terminal device detects the condition 6 or the condition 10 in a process of receiving a data packet, the first terminal device further needs to discard the data packet.

In the solution described above, the first terminal device may send the second configuration information to the second terminal device, or the network device may send the second configuration information to the second terminal device. In addition, there may be another implementation. In this implementation, neither the first terminal device nor the network device needs to send configuration information to the second terminal device. For example, when determining that the unicast connection is faulty or determining that the unicast connection satisfies the first condition, the first terminal device may send an exception indication to the second terminal device, to indicate that the unicast connection between the first terminal device and the second terminal device is faulty. In this case, both the first terminal device and the second terminal device can roll back the configuration of the unicast connection to the default configuration. The first terminal device and the second terminal device may negotiate the new configuration of the unicast connection over the unicast connection having the default configuration. After the negotiation, the first terminal device and the second terminal device may update the unicast connection to the new configuration, to recover the unicast connection. The default configuration may be specified in a protocol, or may be pre-configured by the core network device. That is, a default configuration is set for the unicast connection. The default configuration is, for example, a basic configuration. If the unicast connection is faulty, both the first terminal device and the second terminal device roll back to the default configuration, and negotiate a new configuration based on the default configuration. In this manner, neither interaction needs to be performed with the network device, nor configuration information needs to be sent to the first terminal device and the second terminal device. This helps reduce signaling overheads. In addition, the two terminal devices negotiate the new configuration by themselves, so that the negotiated new configuration better satisfies an actual requirement.

Alternatively, in this embodiment of this application, if the first terminal device determines that the unicast connection is faulty or determines that the unicast connection does not satisfy the first condition, the first terminal device may further trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. Specifically, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection.

In this embodiment of this application, the unicast connection may be monitored. For example, the first terminal device may monitor the parameter of the sidelink, to determine whether the unicast connection on the sidelink is faulty. This is equivalent to that the fault may be determined as early as possible by monitoring the sidelink. For example, the fault may be determined at an early stage, and the fault may be resolved when data packet transmission is not severely affected. This helps reduce a probability that a service is delayed or even interrupted due to the fault of the unicast connection, and improve service transmission continuity.

In the embodiment shown in FIG. 4, an example in which the first terminal device monitors the unicast connection and determines that the unicast connection is faulty is used. To resolve the same technical problem, the following further provides a fault determining method. In this method, an example in which a second terminal device monitors a unicast connection and determines that the unicast connection is faulty is used.

Figure 8:
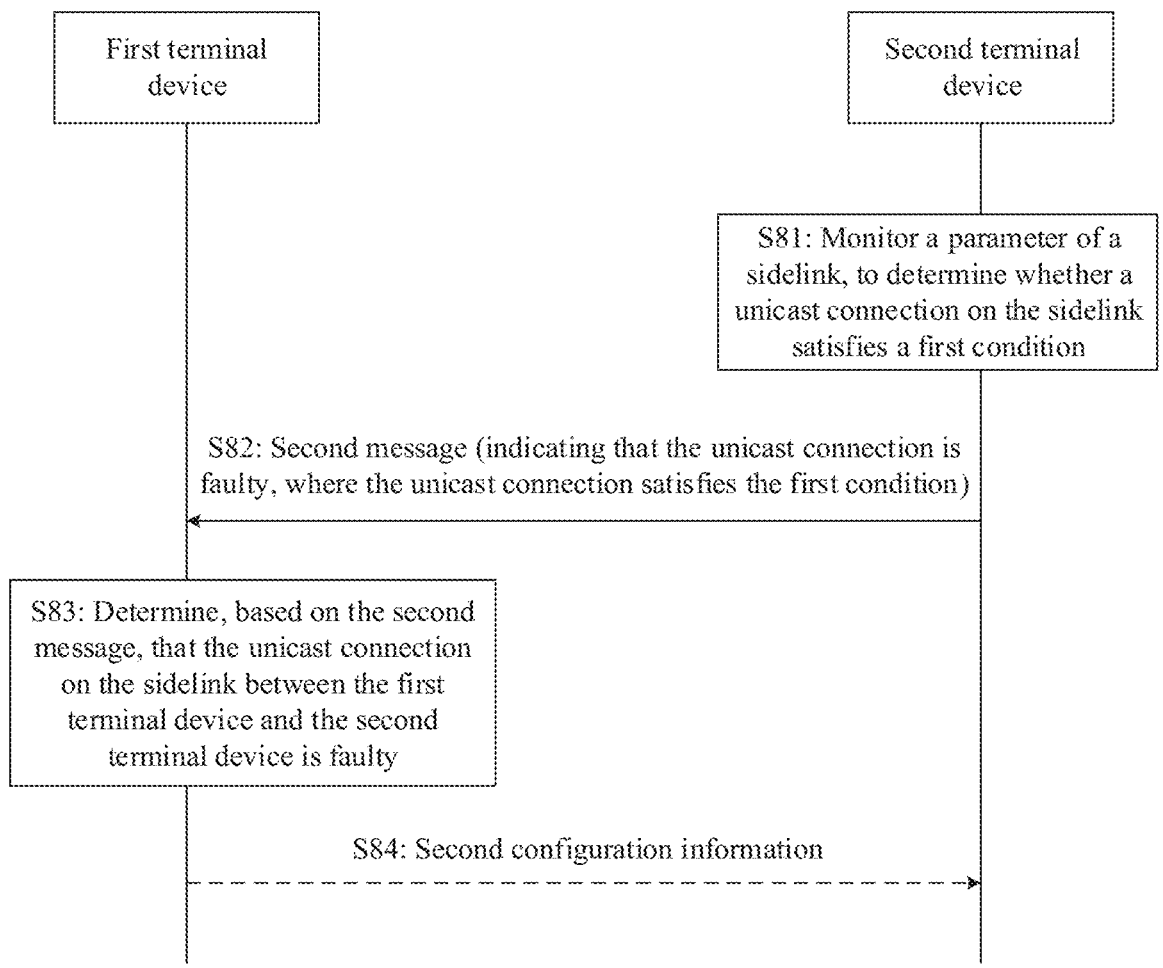
FIG. 8 is a flowchart of a second type of fault determining method according to an embodiment of this application.

FIG. 8 is a flowchart of the method. For the application scenario shown in FIG. 3A, the first terminal device and the second terminal device may be considered as equivalents. Therefore, if the second terminal device monitors a unicast connection and determines that the unicast connection is faulty in this application scenario, a processing manner of the second terminal device may be the same as that of the first terminal device described in the embodiment shown in FIG. 4, and details are not described herein again. Therefore, in the following descriptions, an example in which a second fault determining method is applied to the network architecture shown in FIG. 3B is mainly used. In addition, the method may be performed by two or three communications apparatuses. If the method is performed by two communications apparatuses, the two communications apparatuses are, for example, a first communications apparatus and a second communications apparatus. If the method is performed by three communications apparatuses, the three communications apparatuses are, for example, a first communications apparatus, a second communications apparatus, and a third communications apparatus. The first communications apparatus may be a network device or a communications apparatus that can support a network device in implementing a required function of the method, or may be a terminal device or a communications apparatus that can support a terminal device in implementing a required function of the method. Certainly, the first communications apparatus may alternatively be another communications apparatus, for example, a chip system. The second communications apparatus may be a network device or a communications apparatus that can support a network device in implementing a required function of the method, or may be a terminal device or a communications apparatus that can support a terminal device in implementing a required function of the method. Certainly, the second communications apparatus may alternatively be another communications apparatus, for example, a chip system. Similarly, the third communications apparatus may be a network device or a communications apparatus that can support a network device in implementing a required function of the method, or may be a terminal device or a communications apparatus that can support a terminal device in implementing a required function of the method. Certainly, the third communications apparatus may alternatively be another communications apparatus, for example, a chip system. In addition, implementations of the first communications apparatus, the second communications apparatus, and the third communications apparatus are not limited. For example, the first communications apparatus may be a network device, the second communications apparatus is a terminal device, and the third communications apparatus is also a terminal device; the first communications apparatus is a network device, the second communications apparatus is a communications apparatus that can support a terminal device in implementing a required function of the method, and the third communications apparatus is a terminal device; or the first communications apparatus is a network device, and the second communications apparatus and the third communications apparatus are communications apparatuses that can support a terminal device in implementing a required function of the method. For example, the network device is a base station.

For ease of description, in the following descriptions, the method is performed by, for example, a network device and two terminal devices, or a terminal device and a terminal device. To be specific, for example, the first communications apparatus is a network device, and both the second communications apparatus and the third communications apparatus are terminal devices; or both the first communications apparatus and the second communications apparatus are terminal devices. For example, in this embodiment, the network architecture shown in FIG. 3B is used. Therefore, in the following descriptions, the network device may be the network device in the network architecture shown in FIG. 3B, the first terminal device may be the terminal device 1 in the network architecture shown in FIG. 3B, and the second terminal device may be the terminal device 2 in the network architecture shown in FIG. 3B.

S81: The second terminal device monitors a parameter of a sidelink to determine whether a unicast connection on the sidelink satisfies a first condition. The second terminal device monitors the parameter of the sidelink between the second terminal device and the first terminal device, to determine whether the unicast connection on the sidelink satisfies the first condition.

S82: When the unicast connection satisfies the first condition, the second terminal device sends a second message to the first terminal device, and the first terminal device receives the second message from the second terminal device. The second message is used to indicate that the unicast connection is faulty, or the second message includes fifth indication information, and the fifth indication information is used to indicate that the unicast connection is faulty.

S83: The first terminal device determines, based on the second message, that the unicast connection on the sidelink between the first terminal device and the second terminal device is faulty. For example, the first terminal device determines, based on the second message or the fifth indication information included in the second message, that the unicast connection is faulty.

For example, the second terminal device monitors the parameter of the sidelink, to determine whether the unicast connection satisfies the first condition. For this process, refer to the content that is described in the embodiment shown in FIG. 4 and in which the first terminal device monitors the parameter of the sidelink to determine whether the unicast connection satisfies the first condition, and details are not described herein again.

This embodiment of this application is applied to the application scenario shown in FIG. 3B, and there is no connection between the second terminal device and the network device. Therefore, when determining that the unicast connection satisfies the first condition, the second terminal device may send the second message to the first terminal device, to indicate that the unicast connection is faulty.

The second message is, for example, a message used to specially indicate a unicast connection fault to the first terminal device. In this case, the first message is used to indicate the unicast connection fault. In this case, provided that the second terminal device sends the second message to the first terminal device, the first terminal device can determine that a unicast connection is faulty. Alternatively, the second message includes fifth indication information, and the fifth indication information may indicate a unicast connection fault. In this case, the second message may reuse a message in the prior art, for example, may reuse a sidelink UE information message, a UE assistance information message, or a failure information message. If the message in the prior art is reused, the fifth indication information may be added to the message in the prior art, to indicate the unicast connection fault by using the fifth indication information.

The fifth indication information may indicate only a unicast connection fault. If there are a plurality of unicast connections between the first terminal device and the second terminal device, the first terminal device may not determine a specific faulty unicast connection. Therefore, the second message may further include sixth indication information, and the sixth indication information is used to indicate the faulty unicast connection. For example, the sixth indication information may indicate an ID of the unicast connection, namely, a destination L2 identifier, or an index of the unicast connection, where the index corresponds to a position of the faulty unicast connection in a unicast connection information list reported by the terminal device, or other information indicating the unicast connection. In a word, the sixth indication information can be used to uniquely determine the unicast connection. For the condition 10, a source L2 identifier is found in a data receiving process, where no connection has been established by using the source L2 identifier. In this case, to identify a specific unicast connection having a security risk, the first terminal device may configure different L2 identifiers for different connections. In this case, a destination L2 ID corresponding to a data packet received by the first terminal device is a source L2 ID allocated by the first terminal device to a unicast connection. A faulty unicast connection, namely, the unicast connection having the security risk, may be determined based on the source L2 identifier. In this way, the first terminal device can determine the faulty unicast connection, to perform targeted processing.

A plurality of sub-conditions or a plurality of parameters of a sidelink are described in the embodiment shown in FIG. 4. Detection results of some parameters may be related to a resource used by the unicast connection. For example, for the parameters of the sidelink, for example, a measurement result of CSI, a measurement result of a CBR, a quantity of retransmissions at an RLC layer, a quantity of retransmissions at a MAC layer, a quantity of times that a quantity of retransmissions of a data packet transmitted over the unicast connection on the sidelink at a MAC layer is greater than a second quantity of retransmissions, or a QoS parameter, detection results may be related to the resource used by the unicast connection. If the detection results of the parameters of the sidelink indicate that the unicast connection is faulty, the fault may be probably caused by relatively poor quality of the resource used by the unicast connection. Therefore, if the first condition includes one or any combination of the following: the measurement result of the CSI reference signal is less than a CSI measurement threshold, the measurement result of the CBR is greater than a CBR measurement threshold, the quantity of retransmissions at the RLC layer is greater than or equal to a first quantity of retransmissions, the quantity of retransmissions at the MAC layer is greater than or equal to a second quantity of retransmissions, the quantity of times that the quantity of retransmissions of the data packet transmitted over the unicast connection on the sidelink at the MAC layer is greater than or equal to a second quantity of retransmissions is greater than or equal to the third quantity of times, or the QoS parameter does not satisfy the value condition of the QoS parameter, that is, the first condition includes one or any combination of a sub-condition 1, a sub-condition 2, a sub-condition 3, a sub-condition 4, a sub-condition 5, or a sub-condition 9, the second message may further include seventh indication information, and the seventh indication information may be used to indicate the resource used by the unicast connection. Therefore, after receiving the second message, the first terminal device may determine the resource used by the unicast connection. For example, the network device may consider to recover the unicast connection by reconfiguring the resource used by the unicast connection, that is, process the fault of the unicast connection. Certainly, in addition to the several sub-conditions, if there is another sub-condition related to the resource used by the unicast connection, and the first condition satisfied by the unicast connection includes these sub-conditions, the second message may further include the seventh indication information. The seventh indication information may also indicate the resource used by the unicast connection, and may be specifically indication information of a carrier, BWP, or resource pool. Alternatively, regardless of which type or types of sub-conditions are included in the first condition, the second message may include the seventh indication information, and the seventh indication information may be used to indicate the resource used by the unicast connection.

In addition, because the fault of the unicast connection is indicated to the first terminal device, the first terminal device or the network device may be more expected to indicate to recover the unicast connection as soon as possible. Therefore, to accelerate a processing speed of the first terminal device or the network device, the second message may further include eighth indication information, and the eighth indication information may include the first condition satisfied by the unicast connection. For example, the first condition that is satisfied by the unicast connection and that is included in the eighth indication information is that the measurement result of the CSI reference signal is less than the CSI measurement threshold, or is that the measurement result of the CBR is greater than the CBR measurement threshold and the decryption result of the data packet transmitted over the unicast connection indicates the decryption failure. After receiving the second message, the first terminal device may process the second message by itself, or may forward the second message to the network device. In this case, the first terminal device or the network device can determine, based on the eighth indication information, an issue that occurs on the unicast connection. This helps determine a more targeted means for recovering the unicast connection.

For example, the first terminal device determines, based on the eighth indication information, that the unicast connection satisfies the sub-condition 10, to be specific, no unicast connection has been established to the first terminal device by using the source L2 identifier that is carried when the data packet is transmitted over the unicast connection on the sidelink. In this case, a solution that can be used by the first terminal device is: The first terminal device updates the L2 identifier of the first terminal device, and sends an updated L2 identifier of the first terminal device to the second terminal device, so that the second terminal device can learn of the updated L2 identifier of the first terminal device. In this way, when the first terminal device receives a data packet from the second terminal device over the unicast connection again, a source L2 identifier carried in the data packet has been used to establish the unicast connection to the first terminal device.

In this embodiment of this application, the second terminal device may send the second message to the first terminal device through an AS layer or an upper layer.

For example, if a resource allocated to an SRB is different from a resource allocated to a DRB, that is, the SRB has a dedicated sending resource, the unicast connection is faulty, which usually means that the DRB is faulty, but the SRB may still work normally. Therefore, the second terminal device may send the second message to the first terminal device through the SRB, and the first terminal device receives the second message from the second terminal device through the SRB.

Alternatively, from a perspective of the entire unicast connection, a resource allocated to an SRB is the same as a resource allocated to a DRB. In this case, if the unicast connection is faulty, a corresponding SRB may also be faulty. In this case, if the second message is sent through the SRB, the second message may fail to be sent. Therefore, in this case, a resource may be reserved to specially process the unicast connection fault, so that the second terminal device may send the second message to the first terminal device by using the resource used to specially process the unicast connection fault, and the first terminal device may also receive the second message from the second terminal device by using the resource used to specially process the unicast connection fault. For example, the resource used to specially process the unicast connection fault may be specified in a protocol, or may be configured by the network device.

The foregoing two manners may also be combined. For example, an attempt is first made to recover the unicast connection by using a resource of an SRB, and if the unicast connection fails to be recovered, the unicast connection is recovered by using a resource used to specially process the unicast connection fault. The foregoing two manners of sending the second message are both completed at the AS layer, and the second message is sent through the SRB. In this way, processes such as recovery of the unicast connection may be completed at the AS layer if possible, and do not need to be performed at more layers. This reduces processing processes.

Alternatively, the second terminal device may send the second message to the first terminal device through upper layer signaling. For example, the upper layer signaling is referred to as second upper layer signaling. As described above, the upper layer may be, for example, a V2X layer or an application layer above the RLC layer, and the upper layer signaling may be, for example, PC5-S signaling or other signaling. For example, after determining that the unicast connection is faulty, the AS layer of the second terminal device may generate the second message. The AS layer of the second terminal device delivers the second message to an upper layer of the second terminal device. The upper layer of the second terminal device triggers PC5-S signaling, and sends the second message through the PC5-S signaling.

For example, the second upper layer signaling may be sent in a broadcast manner or in a unicast manner. This is not specifically limited.

After receiving the second message, the first terminal device may directly forward the second message to the network device, and the network device performs processing. For example, after receiving the second message forwarded by the first terminal device, the network device may determine first configuration information used by the first terminal device to recover the unicast connection and second configuration information used by the second terminal device to recover the unicast connection, and send both the first configuration information and the second configuration information to the first terminal device. Then, the first terminal device forwards the second configuration information to the second terminal device. Alternatively, after receiving the second message forwarded by the first terminal device, the network device may determine first configuration information used by the first terminal device to recover the unicast connection, and send the first configuration information to the first terminal device. After receiving the first configuration information, the first terminal device may generate, based on the first configuration information, second configuration information used by the second terminal device to recover the unicast connection, and send the second configuration information to the second terminal device. In the foregoing cases, the first configuration information may be different from the second configuration information, and the second configuration information is configuration information used by the second terminal device to recover the unicast connection. Alternatively, after receiving the second message forwarded by the first terminal device, the network device may determine first configuration information used by the first terminal device to recover the unicast connection, and send the first configuration information to the first terminal device. After receiving the first configuration information, the first terminal device may forward the first configuration information to the second terminal device, and the second terminal device performs adaptation based on the first configuration information, to obtain configuration information used by the second terminal device to recover the unicast connection. In this case, the first configuration information is the same as second configuration information, and the second configuration information is not the configuration information used by the second terminal device to recover the unicast connection.

Alternatively, after receiving the second message, the first terminal device may perform processing by itself. For example, the first terminal device may determine first configuration information used by the first terminal device to recover the unicast connection and second configuration information used by the second terminal device to recover the unicast connection, and send the second configuration information to the second terminal device, so that the second terminal device may receive the second configuration information from the first terminal device. In this case, the first configuration information may be different from the second configuration information, and the second configuration information is configuration information used by the second terminal device to recover the unicast connection. Alternatively, the first terminal device may determine first configuration information used by the first terminal device to recover the unicast connection, and the first terminal device may forward the first configuration information to the second terminal device. The second terminal device performs adaptation based on the first configuration information, to obtain configuration information used by the second terminal device to recover the unicast connection. In this case, the first configuration information is the same as second configuration information, and the second configuration information is not the configuration information used by the second terminal device to recover the unicast connection.

For sending of the second configuration information by the first terminal device to the second terminal device, refer to S84 in FIG. 8. Because this step is an optional step and is not mandatory, an arrow used to represent S84 is drawn as a dashed line.

For example, the first terminal device may send the second configuration information to the second terminal device in a plurality of manners. For this, refer to the related descriptions in the embodiment shown in FIG. 4. For example, the first terminal device may send the second configuration information to the second terminal device through an SRB, where the SRB has a dedicated sending resource; and the second terminal device may send the second message to the first terminal device through an SRB, where the SRB has a dedicated sending resource. The two SRBs may be different SRBs. For example, an SRB has dedicated sending resources, the first terminal device sends the second configuration information to the second terminal device by using a first part of the dedicated sending resources configured for the SRB, and the second terminal device sends the second message to the first terminal device by using a second part of the dedicated sending resources configured for the SRB. Alternatively, the first terminal device may send the second configuration information to the second terminal device by using a resource used to specially process the unicast connection fault, and the second terminal device may send the second message to the first terminal device by using a resource used to specially process the unicast connection fault. The two resources used to specially process the unicast connection fault may be different resources. For example, resources used to specially process the unicast connection fault are reserved, the first terminal device may send the second configuration information to the second terminal device by using a first part of the resources used to specially process the unicast connection fault, and the second terminal device may send the second message to the first terminal device by using a second part of resources used to specially process the unicast connection fault.

In conclusion, the first terminal device may send the second configuration information to the second terminal device through the AS layer or the upper layer. The two sending manners may be independent of each other. During specific implementation, one of the two sending manners may be selected for application, and a specific sending manner may be specified in a protocol or configured by the network device in advance. Alternatively, the two sending manners may be combined for application. For example, the second configuration information is preferentially sent through the AS layer. If a resource of the AS layer is unavailable, or sending of the second configuration information through the AS layer fails, the second configuration information is sent through the upper layer. In this case, if a connection of the upper layer is also disconnected, for example, the first terminal device does not receive a response from the second terminal device after sending the first upper layer signaling to the second terminal device, the connection of the upper layer may be unreachable. For example, the first terminal device is excessively far away from the second terminal device. Consequently, sidelinks, including a unicast link and a broadcast link, are unreachable. In this case, the first terminal device may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. For example, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection. For details about how to perform transmission through the Uu interface, refer to the prior art.

Alternatively, when the first terminal device sends the second configuration information to the second terminal device through the AS layer, if resources at the AS layer are unavailable, that is, a connection of the AS layer is disconnected, for example, the first terminal device does not receive a response from the second terminal device after sending the second configuration information to the second terminal device through the SRB, the connection of the AS layer may be unreachable. In this case, the first terminal device does not need to send the second configuration information through the upper layer, but may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. For example, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection.

Alternatively, when the first terminal device sends the second configuration information to the second terminal device through the upper layer (not through the AS layer), if resources at the upper layer are unavailable, that is, a connection of the upper layer is disconnected, for example, the first terminal device does not receive a response from the second terminal device after sending the second configuration information to the second terminal device through the first upper layer signaling, the connection of the upper layer may be unreachable. In this case, the first terminal device may trigger an indication to the application layer of the first terminal device, to indicate that a current sidelink is unavailable. For example, an upper layer (where in this case, the upper layer is not the application layer) of the first terminal device sends the notification information to the application layer of the first terminal device, where the notification information is used to indicate that the current sidelink is unavailable. The notification information is actually a type of trigger information. After receiving the indication, the application layer may select a Uu interface to transmit a service carried on the unicast connection.

Both the first configuration information and the second configuration information may include at least one of a bearer configuration, a security configuration, or a resource configuration, and certainly, may further include another configuration. The resource configuration includes, for example, at least one of a resource pool configuration, a BWP configuration, or a carrier configuration, and certainly, may further include another resource configuration. The bearer configuration includes, for example, at least one of a PDCP configuration, an RLC configuration, a MAC configuration, or an SDAP configuration. The security configuration includes, for example, at least one of configurations such as a security key, a security algorithm, or a security capability. The first terminal device may recover the unicast connection based on the first configuration information, and the second terminal device may recover the unicast connection based on the second configuration information, so that the first terminal device and the second terminal device may continue to transmit data over the recovered unicast connection.

In addition, in this embodiment of this application, if the second terminal device finds, in a process of sending a data packet to the first terminal device over the unicast connection, that the unicast connection satisfies the first condition, after determining that the unicast connection is faulty or determining that the unicast connection satisfies the first condition, the second terminal device may stop sending a data packet to the first terminal device over the unicast connection. On the sidelink, a sending process and a receiving process are independent of each other. Therefore, if the second terminal device still receives data over the unicast connection, the second terminal device may continue the process of receiving the data. Similarly, if the second terminal device finds, in a process of receiving a data packet from the first terminal device over the unicast connection, that the unicast connection satisfies the first condition, after determining that the unicast connection is faulty or determining that the unicast connection satisfies the first condition, if the second terminal device still sends a data packet to the first terminal device over the unicast connection, the second terminal device may stop sending the data packet to the first terminal device over the unicast connection. The second terminal device finds the fault when the second terminal device serves as a receive end. Therefore, if the first terminal device still sends a data packet to the second terminal device over the unicast connection, the second terminal device may not indicate the first terminal device to stop sending the data packet, and the second terminal device may still continue receiving the data packet over the unicast connection. Certainly, after determining that the unicast connection is faulty, the first terminal device also stops sending a data packet to the second terminal device over the unicast connection. In this case, the second terminal device may stop receiving the data packet over the unicast connection. Optionally, if the first terminal device detects the condition 6 or the condition 10 in a process of receiving a data packet, the first terminal device further needs to discard the data packet.

In the solution described above, the first terminal device may send the second configuration information to the second terminal device. In addition, there may be another implementation. In this implementation, the first terminal device does not need to send the configuration information to the second terminal device. For example, when determining that the unicast connection is faulty or determining that the unicast connection satisfies the first condition, the second terminal device may send an exception indication to the first terminal device, to indicate that the unicast connection between the second terminal device and the first terminal device is faulty. In this case, both the first terminal device and the second terminal device can roll back the configuration of the unicast connection to the default configuration. The first terminal device and the second terminal device may negotiate the new configuration of the unicast connection over the unicast connection having the default configuration. After the negotiation, the first terminal device and the second terminal device may update the unicast connection to the new configuration, to recover the unicast connection. The default configuration may be specified in a protocol, or may be pre-configured by the core network device. That is, a default configuration is set for the unicast connection. The default configuration is, for example, a basic configuration. If the unicast connection is faulty, both the first terminal device and the second terminal device roll back to the default configuration, and negotiate a new configuration based on the default configuration. In this manner, neither interaction needs to be performed with the network device, nor configuration information needs to be sent to the first terminal device and the second terminal device. This helps reduce signaling overheads. In addition, the two terminal devices negotiate the new configuration by themselves, so that the negotiated new configuration better satisfies an actual requirement.

Alternatively, in this embodiment of this application, if the first terminal device receives the second message from the second terminal device or determines that the unicast connection is faulty, the first terminal device may trigger an indication to the application layer of the first terminal device, to indicate that a current sidelink is unavailable. For example, the AS layer of the first terminal device sends the notification information to the application layer of the first terminal device, where the notification information is used to indicate that the current sidelink is unavailable. The notification information is actually a type of trigger information. For example, the indication may be triggered by the AS layer of the first terminal device to the application layer, or may be triggered by an upper layer (where in this case, the upper layer is not the application layer) of the first terminal device to the application layer. After receiving the indication, the application layer may select a Uu interface to transmit a service carried on the unicast connection.

In this embodiment of this application, regardless of whether a terminal device is connected to or is not connected to a network device, the terminal device may monitor the unicast connection. For example, the second terminal device may monitor a parameter of the sidelink, to determine whether the unicast connection on the sidelink is faulty. This is equivalent to that the fault may be determined as early as possible by monitoring the sidelink. For example, the fault may be determined at an early stage, and the fault may be resolved when data packet transmission is not severely affected. This helps reduce a probability that a service is delayed or even interrupted due to the fault of the unicast connection, and improve service transmission continuity.

The following describes, with reference to the accompanying drawings, apparatuses configured to implement the foregoing methods in the embodiments of this application. Therefore, all the foregoing content may be used in subsequent embodiments, and repeated content is not described again.

Figure 9:
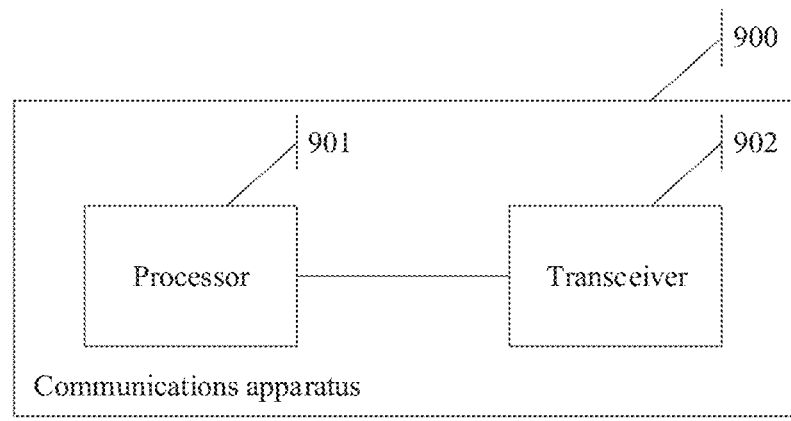
FIG. 9 is a schematic diagram of a communications apparatus that can implement a function of a first terminal device according to an embodiment of this application.

FIG. 9 is a schematic structural diagram of a communications apparatus 900. The communications apparatus 900 may implement a function of the first terminal device described above. The communications apparatus 900 may be the first terminal device described above, or may be a chip disposed in the first terminal device described above. The communications apparatus 900 may include a processor 901 and a transceiver 902. The processor 901 may be configured to: perform S41 and S42 in the embodiment shown in FIG. 4, and/or support another process of the technology described in this specification, for example, perform all or some of other processes than the receiving process and the sending process that are performed by the first terminal device. The transceiver 902 may be configured to: perform S43 and S44 in the embodiment shown in FIG. 4, and/or support another process of the technology described in this specification, for example, perform all or some of the receiving process and the sending process that are performed by the first terminal device. The transceiver 902 may include a transceiver component that communicates with a network device and a transceiver component that communicates with another terminal device.

For example, the processor 901 is configured to monitor a parameter of a sidelink between the communications apparatus and a second terminal device, to determine whether a unicast connection on the sidelink satisfies a first condition; and the processor 901 is further configured to: when the unicast connection satisfies the first condition, determine that the unicast connection is faulty.

In a possible implementation, the first condition includes one or any combination of the following:

a measurement result of a CSI reference signal transmitted over the unicast connection on the sidelink is less than a CSI measurement threshold;

a measurement result of a CBR of a resource configured for the sidelink is greater than a CBR measurement threshold;

a quantity of retransmissions of a data packet transmitted over the unicast connection on the sidelink at an RLC layer is greater than or equal to a first quantity of retransmissions;

a quantity of retransmissions of a data packet transmitted over the unicast connection on the sidelink at a MAC layer is greater than or equal to a second quantity of retransmissions;

a quantity of times that a quantity of retransmissions of a data packet transmitted over the unicast connection on the sidelink at a MAC layer is greater than or equal to a second quantity of retransmissions is greater than or equal to a third quantity of times;

a result of an integrity check performed on a data packet transmitted over the unicast connection on the sidelink indicates that the check fails;

a decryption result of a data packet transmitted over the unicast connection on the sidelink indicates that the decryption fails;

out-of-synchronization information of the unicast connection on the sidelink indicates that the first terminal device and the second terminal device are out of synchronization;

a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

In a possible implementation, the transceiver 902 is further configured to: send a first message to a network device. The first message is used to indicate that the unicast connection is faulty, or the first message includes first indication information, and the first indication information is used to indicate that the unicast connection is faulty.

In a possible implementation, the first message further includes second indication information, and the second indication information is used to indicate the unicast connection.

In a possible implementation, the first condition includes one or any combination of the following: the measurement result of the CSI reference signal is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the first message further includes third indication information, and the third indication information is used to indicate a resource used by the unicast connection.

In a possible implementation, the first message further includes fourth indication information, and the fourth indication information includes the first condition satisfied by the unicast connection.

In a possible implementation, the transceiver 902 is further configured to: stop sending a data packet over the unicast connection, and continue receiving a data packet over the unicast connection.

In a possible implementation, the processor 901 is further configured to obtain first configuration information, where the first configuration information is used to recover the unicast connection.

In a possible implementation, the transceiver 902 is further configured to send second configuration information to the second terminal device, where the second configuration information is used to recover the unicast connection.

In a possible implementation, the transceiver 902 is configured to send the second configuration information to the second terminal device in the following manners: sending the second configuration information to the second terminal device through an SRB, where the SRB has a dedicated sending resource; sending the second configuration information to the second terminal device by using a resource used to specially process the unicast connection fault; or sending the second configuration information to the second terminal device through first upper layer signaling.

In a possible implementation, the processor 901 is further configured to: update a configuration of the unicast connection to a default configuration; and negotiate a new configuration of the unicast connection with the second terminal device by applying the unicast connection having the default configuration.

All related content of the steps in the foregoing method embodiments may be cited in function descriptions of a corresponding function module, and details are not described herein again.

Figure 10:
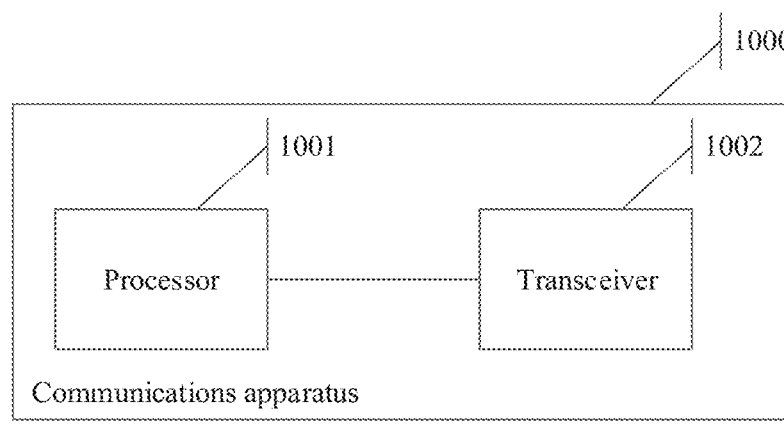
FIG. 10 is a schematic diagram of a communications apparatus that can implement a function of a first terminal device according to an embodiment of this application.

FIG. 10 is a schematic structural diagram of a communications apparatus 1000. The communications apparatus 1000 may implement a function of the first terminal device described above. The communications apparatus 1000 may be the first terminal device described above, or may be a chip disposed in the first terminal device described above. The communications apparatus 1000 may include a processor 1001 and a transceiver 1002. The processor 1001 may be configured to: perform S83 in the embodiment shown in FIG. 8, and/or support another process of the technology described in this specification, for example, perform all or some of other processes than the receiving process and the sending process that are performed by the first terminal device. The transceiver 1002 may be configured to: perform S82 and S84 in the embodiment shown in FIG. 8, and/or support another process of the technology described in this specification, for example, perform all or some of the receiving process and the sending process that are performed by the first terminal device. The transceiver 1002 may include a transceiver component that communicates with a network device and a transceiver component that communicates with another terminal device.

For example, the transceiver 1002 is configured to receive a second message from a second terminal device; and the processor 1001 is configured to determine, based on the second message or based on fifth indication information included in the second message, that a unicast connection on a sidelink between the communications apparatus and the second terminal device is faulty.

In a possible implementation, the transceiver 1002 is further configured to: forward the second message to the network device, and receive first configuration information from the network device; or the processor 1001 is further configured to generate first configuration information.

The first configuration information is used to recover the unicast connection.

In a possible implementation, the transceiver 1002 is further configured to send second configuration information to the second terminal device, where the second configuration information is used to recover the unicast connection.

In a possible implementation, the transceiver 1002 is configured to send the second configuration information to the second terminal device in the following manners: sending the second configuration information to the second terminal device through an SRB, where the SRB has a dedicated sending resource; sending the second configuration information to the second terminal device by using a resource used to specially process the unicast connection fault; or sending the second configuration information to the second terminal device through first upper layer signaling.

In a possible implementation, the processor 1001 is further configured to: update a configuration of the unicast connection to a default configuration, where the unicast connection is a faulty unicast connection; and negotiate a new configuration of the unicast connection with the second terminal device by applying the unicast connection having the default configuration.

In a possible implementation, the transceiver 1002 is configured to receive the second message from the second terminal device in the following manners: receiving the second message from the second terminal device through an SRB, where the SRB has a dedicated sending resource; receiving the second message from the second terminal device by using a resource used to specially process the unicast connection fault; or receiving the second message from the second terminal device through second upper layer signaling.

All related content of the steps in the foregoing method embodiments may be cited in function descriptions of a corresponding function module, and details are not described herein again.

Figure 11:
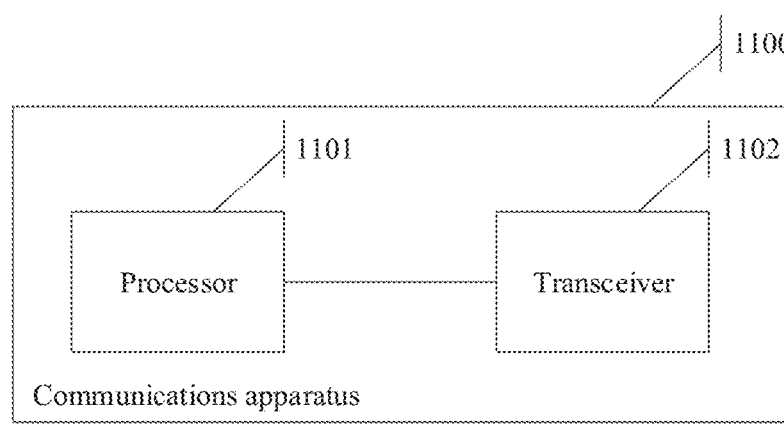
FIG. 11 is a schematic diagram of a communications apparatus that can implement a function of a second terminal device according to an embodiment of this application.

FIG. 11 is a schematic structural diagram of a communications apparatus 1100. The communications apparatus 1100 may implement a function of the second terminal device described above. The communications apparatus 1100 may be the second terminal device described above, or may be a chip disposed in the second terminal device described above. The communications apparatus 1100 may include a processor 1101 and a transceiver 1102. The processor 1101 may be configured to: perform S81 in the embodiment shown in FIG. 8, and/or support another process of the technology described in this specification, for example, perform all or some of other processes than the receiving process and the sending process that are performed by the second terminal device. The transceiver 1102 may be configured to: perform S82 and S84 in the embodiment shown in FIG. 8, and/or support another process of the technology described in this specification, for example, perform all or some of the receiving process and the sending process that are performed by the second terminal device. The transceiver 1102 may include a transceiver component that communicates with a network device and a transceiver component that communicates with another terminal device.

For example, the processor 1101 is configured to monitor a parameter of a sidelink, to determine whether a unicast connection on the sidelink satisfies a first condition; and the transceiver 1102 is configured to: when the processor 1101 determines that the unicast connection satisfies the first condition, send a second message to the first terminal device, where the second message is used to indicate that the unicast connection is faulty, or the second message includes fifth indication information, and the fifth indication information is used to indicate that the unicast connection is faulty.

In a possible implementation, the first condition includes one or any combination of the following:

a measurement result of a CSI reference signal transmitted over the unicast connection on the sidelink is less than a CSI measurement threshold;

a measurement result of a CBR of a resource configured for the sidelink is greater than a CBR measurement threshold;

a quantity of retransmissions of a data packet transmitted over the unicast connection on the sidelink at an RLC layer is greater than or equal to a first quantity of retransmissions;

a quantity of retransmissions of a data packet transmitted over the unicast connection on the sidelink at a MAC layer is greater than or equal to a second quantity of retransmissions;

a quantity of times that a quantity of retransmissions of a data packet transmitted over the unicast connection on the sidelink at a MAC layer is greater than or equal to a second quantity of retransmissions is greater than or equal to a third quantity of times;

a result of an integrity check performed on a data packet transmitted over the unicast connection on the sidelink indicates that the check fails;

a decryption result of a data packet transmitted over the unicast connection on the sidelink indicates that the decryption fails;

out-of-synchronization information of the unicast connection on the sidelink indicates that the first terminal device and the second terminal device are out of synchronization;

a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

In a possible implementation, the second message further includes sixth indication information, and the sixth indication information is used to indicate the unicast connection.

In a possible implementation, the first condition includes one or any combination of the following: the measurement result of the CSI is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the second message further includes seventh indication information, and the seventh indication information is used to indicate a resource used by the unicast connection.

In a possible implementation, the second message further includes eighth indication information, and the eighth indication information includes the first condition satisfied by the unicast connection.

In a possible implementation, the transceiver 1102 is configured to send the second message to the first terminal device in the following manners: sending the second message to the first terminal device through an SRB, where the SRB has a dedicated sending resource; sending the second message to the first terminal device by using a resource used to specially process the unicast connection fault; or sending the second message to the first terminal device through second upper layer signaling.

In a possible implementation, the transceiver 1102 is further configured to: stop sending a data packet over the unicast connection, and continue receiving a data packet over the unicast connection.

In a possible implementation, the transceiver 1102 is further configured to receive second configuration information from the first terminal device, where the second configuration information is used to recover the unicast connection.

In a possible implementation, the transceiver 1102 is configured to receive the second configuration information from the first terminal device in the following manners: receiving the second configuration information from the first terminal device through an SRB, where the SRB has a dedicated sending resource; receiving the second configuration information from the first terminal device by using a resource used to specially process the unicast connection fault; or receiving the second configuration information from the first terminal device through first upper layer signaling.

In a possible implementation, the processor 1101 is further configured to: update a configuration of the unicast connection to a default configuration; and negotiate a new configuration of the unicast connection with the first terminal device by applying the unicast connection having the default configuration.

All related content of the steps in the foregoing method embodiments may be cited in function descriptions of a corresponding function module, and details are not described herein again.

Figure 12A:
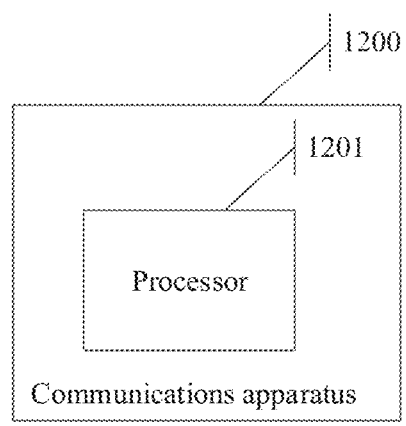
FIG. 12A and FIG. 12B are two schematic diagrams of a communications apparatus according to an embodiment of this application.

In a simple embodiment, a person skilled in the art can figure out that the communications apparatus 900, the communications apparatus 1000, or the communications apparatus 1100 may alternatively be implemented by using a structure of a communications apparatus 1200 shown in FIG. 12A. The communications apparatus 1200 may implement a function of the first terminal device or second terminal device described above. The communications apparatus 1200 may include a processor 1201.

When the communications apparatus 1200 is configured to implement a function of the first terminal device in the foregoing descriptions, the processor 1201 may be configured to: perform S41 and S42 in the embodiment shown in FIG. 4, and/or support another process of the technology described in this specification, for example, perform all or some of other processes than the receiving process and the sending process that are performed by the first terminal device. Alternatively, when the communications apparatus 1200 is configured to implement a function of the first terminal device in the foregoing descriptions, the processor 1201 may be configured to: perform S83 in the embodiment shown in FIG. 8, and/or support another process of the technology described in this specification, for example, all or some of other processes than the receiving process and the sending process that are performed by the first terminal device. Alternatively, when the communications apparatus 1200 is configured to implement a function of the second terminal device in the foregoing descriptions, the processor 1201 may be configured to: perform S81 in the embodiment shown in FIG. 8, and/or support another process of the technology described in this specification, for example, all or some of other processes than the receiving process and the sending process that are performed by the first terminal device.

The communications apparatus 1200 may be implemented by a field-programmable gate array (FPGA), an application-specific integrated circuit (application specific integrated circuit, ASIC), a system on chip (SoC), a central processing unit (CPU), a network processor (NP), a digital signal processing circuit (digital signal processor, DSP), a micro controller unit (MCU), a programmable logic device (PLD), or another integrated chip. The communications apparatus 1200 may be disposed in the first terminal device or second terminal device in the embodiments of this application, so that the first terminal device or the second terminal device implements the method provided in the embodiments of this application.

In an optional implementation, the communications apparatus 1200 may include a transceiver component, configured to communicate with another device via a device in which the communications apparatus 1200 is located. When the communications apparatus 1200 is configured to implement a function of the first terminal device or second terminal device described above, the transceiver component may be configured to perform S43 and S44 in the embodiment shown in FIG. 4, and/or support another process of the technology described in this specification. Alternatively, when the communications apparatus 1200 is configured to implement a function of the first terminal device or second terminal device described above, the transceiver component may be configured to perform S82 and S84 in the embodiment shown in FIG. 8, and/or support another process of the technology described in this specification. For example, the transceiver component is a communications interface. If the communications apparatus 1200 is the first terminal device or the second terminal device, the communications interface may be a transceiver in the first terminal device or the second terminal device, for example, the transceiver 902, the transceiver 1002, or the transceiver 1102. The transceiver is, for example, a radio frequency transceiver component in the first terminal device or the second terminal device. Alternatively, if the communications apparatus 1200 is a chip disposed in the first terminal device or the second terminal device, the communications interface may be an input/output interface of the chip, for example, an input/output pin.

Figure 12B:
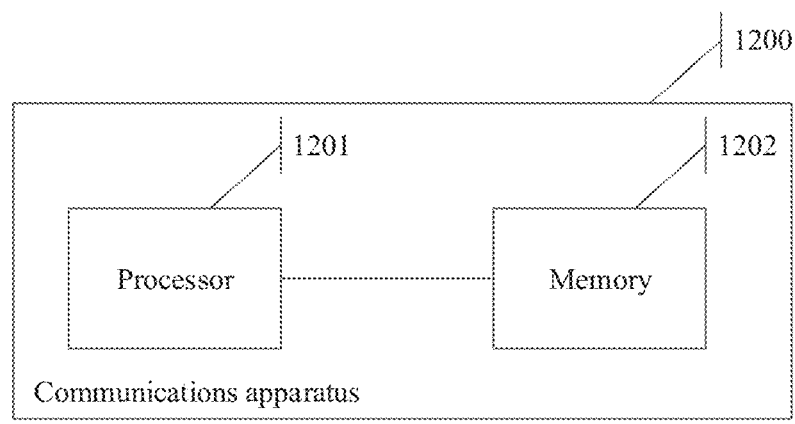

In an optional implementation, referring to FIG. 12B, the communications apparatus 1200 may further include a memory 1202. The memory 1202 is configured to store computer programs or instructions, and the processor 1201 is configured to decode and execute the computer programs or the instructions. It should be understood that the computer programs or the instructions may include a function program of the first terminal device or the second terminal device. When the function program of the first terminal device is decoded and executed by the processor 1201, the first terminal device may be enabled to implement a function of the first terminal device in the method provided in the embodiment shown in FIG. 4 or in the embodiment shown in FIG. 8 in the embodiments of this application. When the function program of the second terminal device is decoded and executed by the processor 1201, the second terminal device may be enabled to implement a function of the second terminal device in the method provided in the embodiment shown in FIG. 4 or in the embodiment shown in FIG. 8 in the embodiments of this application.

In another optional implementation, the function program of the first terminal device or the second terminal device is stored in an external memory of the communications apparatus 1200. When the function program of the first terminal device is decoded and executed by the processor 1201, the memory 1202 temporarily stores a part or all of content of the function program of the first terminal device. When the function program of the second terminal device is decoded and executed by the processor 1201, the memory 1202 temporarily stores a part or all of content of the function program of the second terminal device.

In still another optional implementation, the function program of the first terminal device or the second terminal device is set in an internal memory 1202 of the communications apparatus 1200. When the internal memory 1202 of the communications apparatus 1200 stores the function program of the first terminal device, the communications apparatus 1200 may be disposed in the first terminal device in the embodiments of this application. When the internal memory 1202 of the communications apparatus 1200 stores the function program of the second terminal device, the communications apparatus 1200 may be disposed in the second terminal device in the embodiments of this application.

In yet another optional implementation, partial content of the function program of the first terminal device is stored in an external memory of the communications apparatus 1200, and the other content of the function program of the first terminal device is stored in an internal memory 1202 of the communications apparatus 1200. Alternatively, partial content of the function program of the second terminal device is stored in an external memory of the communications apparatus 1200, and the other content of the function program of the second terminal device is stored in an internal memory 1202 of the communications apparatus 1200.

In the embodiments of this application, the communications apparatus 900, the communications apparatus 1000, the communications apparatus 1100, and the communications apparatus 1200 are presented in a form in which each function module is obtained through division for each function, or may be presented in a form in which each function module is obtained through division in an integrated manner. The "module" herein may be an ASIC, a processor and a memory that execute one or more software or firmware programs, an integrated logic circuit, and/or another component that can provide the foregoing functions.

In addition, the communications apparatus 900 provided in the embodiment shown in FIG. 9 may alternatively be implemented in another form. For example, the communications apparatus includes a processing module and a transceiver module. For example, the processing module may be implemented by the processor 901, and the transceiver module may be implemented by the transceiver 902. The processing module may be configured to: perform S41 and S42 in the embodiment shown in FIG. 4, and/or support another process of the technology described in this specification, for example, perform all or some of other processes than the receiving process and the sending process that are performed by the first terminal device. The transceiver module may be configured to: perform S43 and S44 in the embodiment shown in FIG. 4, and/or support another process of the technology described in this specification, for example, perform all or some of the receiving process and the sending process that are performed by the first terminal device. The transceiver 902 may include a transceiver component that communicates with a network device and a transceiver component that communicates with another terminal device.

For example, the processing module is configured to monitor a parameter of a sidelink between the communications apparatus and a second terminal device, to determine whether a unicast connection on the sidelink satisfies a first condition; and the processing module is further configured to: when the unicast connection satisfies the first condition, determine that the unicast connection is faulty.

In a possible implementation, the first condition includes one or any combination of the following:

a measurement result of a CSI reference signal transmitted over the unicast connection on the sidelink is less than a CSI measurement threshold;

a measurement result of a CBR of a resource configured for the sidelink is greater than a CBR measurement threshold;

a quantity of retransmissions of a data packet transmitted over the unicast connection on the sidelink at an RLC layer is greater than or equal to a first quantity of retransmissions;

a quantity of retransmissions of a data packet transmitted over the unicast connection on the sidelink at a MAC layer is greater than or equal to a second quantity of retransmissions;

a quantity of times that a quantity of retransmissions of a data packet transmitted over the unicast connection on the sidelink at a MAC layer is greater than or equal to a second quantity of retransmissions is greater than or equal to a third quantity of times;

a result of an integrity check performed on a data packet transmitted over the unicast connection on the sidelink indicates that the check fails;

a decryption result of a data packet transmitted over the unicast connection on the sidelink indicates that the decryption fails;

out-of-synchronization information of the unicast connection on the sidelink indicates that the first terminal device and the second terminal device are out of synchronization;

a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

In a possible implementation, the transceiver module is further configured to: send a first message to a network device. The first message is used to indicate that the unicast connection is faulty, or the first message includes first indication information, and the first indication information is used to indicate that the unicast connection is faulty.

In a possible implementation, the first message further includes second indication information, and the second indication information is used to indicate the unicast connection.

In a possible implementation, the first condition includes one or any combination of the following: the measurement result of the CSI reference signal is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the first message further includes third indication information, and the third indication information is used to indicate a resource used by the unicast connection.

In a possible implementation, the first message further includes fourth indication information, and the fourth indication information includes the first condition satisfied by the unicast connection.

In a possible implementation, the transceiver module is further configured to: stop sending a data packet over the unicast connection, and continue receiving a data packet over the unicast connection.

In a possible implementation, the processing module is further configured to obtain first configuration information, where the first configuration information is used to recover the unicast connection.

In a possible implementation, the transceiver module is further configured to send second configuration information to the second terminal device, where the second configuration information is used to recover the unicast connection.

In a possible implementation, the transceiver module is configured to send the second configuration information to the second terminal device in the following manners: sending the second configuration information to the second terminal device through an SRB, where the SRB has a dedicated sending resource; sending the second configuration information to the second terminal device by using a resource used to specially process the unicast connection fault; or sending the second configuration information to the second terminal device through first upper layer signaling.

In a possible implementation, the processing module is further configured to: update a configuration of the unicast connection to a default configuration; and negotiate a new configuration of the unicast connection with the second terminal device by applying the unicast connection having the default configuration.

All related content of the steps in the foregoing method embodiments may be cited in function descriptions of a corresponding function module, and details are not described herein again.

The communications apparatus 1000 provided in the embodiment shown in FIG. 10 may alternatively be implemented in another form. For example, the communications apparatus includes a processing module and a transceiver module. For example, the processing module may be implemented by the processor 1001, and the transceiver module may be implemented by the transceiver 1002. The processing module may be configured to: perform S83 in the embodiment shown in FIG. 8, and/or support another process of the technology described in this specification, for example, perform all or some of other processes than the receiving process and the sending process that are performed by the first terminal device. The transceiver module may be configured to: perform S82 and S84 in the embodiment shown in FIG. 8, and/or support another process of the technology described in this specification, for example, perform all or some of the receiving process and the sending process that are performed by the first terminal device. The transceiver module may include a transceiver component that communicates with a network device and a transceiver component that communicates with another terminal device.

For example, the transceiver module is configured to receive a second message from a second terminal device; and the processing module is configured to determine, based on the second message or based on fifth indication information included in the second message, that a unicast connection on a sidelink between the communications apparatus and the second terminal device is faulty.

In a possible implementation, the transceiver module is further configured to: forward the second message to the network device, and receive first configuration information from the network device; or the processing module is further configured to generate first configuration information.

The first configuration information is used to recover the unicast connection.

In a possible implementation, the transceiver module is further configured to send second configuration information to the second terminal device, where the second configuration information is used to recover the unicast connection.

In a possible implementation, the transceiver module is configured to send the second configuration information to the second terminal device in the following manners: sending the second configuration information to the second terminal device through an SRB, where the SRB has a dedicated sending resource; sending the second configuration information to the second terminal device by using a resource used to specially process the unicast connection fault; or sending the second configuration information to the second terminal device through first upper layer signaling.

In a possible implementation, the processing module is further configured to: update a configuration of the unicast connection to a default configuration, where the unicast connection is a faulty unicast connection; and negotiate a new configuration of the unicast connection with the second terminal device by applying the unicast connection having the default configuration.

In a possible implementation, the transceiver module is configured to receive the second message from the second terminal device in the following manners: receiving the second message from the second terminal device through an SRB, where the SRB has a dedicated sending resource; receiving the second message from the second terminal device by using a resource used to specially process the unicast connection fault; or receiving the second message from the second terminal device through second upper layer signaling.

All related content of the steps in the foregoing method embodiments may be cited in function descriptions of a corresponding function module, and details are not described herein again.

The communications apparatus 1100 provided in the embodiment shown in FIG. 11 may alternatively be implemented in another form. For example, the communications apparatus includes a processing module and a transceiver module. For example, the processing module may be implemented by the processor 1101, and the transceiver module may be implemented by the transceiver 1102. The processing module may be configured to: perform S81 in the embodiment shown in FIG. 8, and/or support another process of the technology described in this specification, for example, perform all or some of other processes than the receiving process and the sending process that are performed by the first terminal device. The transceiver module may be configured to: perform S82 and S84 in the embodiment shown in FIG. 8, and/or support another process of the technology described in this specification, for example, perform all or some of the receiving process and the sending process that are performed by the first terminal device. The transceiver module may include a transceiver component that communicates with a network device and a transceiver component that communicates with another terminal device.

For example, the processing module is configured to monitor a parameter of a sidelink, to determine whether a unicast connection on the sidelink satisfies a first condition; and the transceiver module is configured to: when the processing module determines that the unicast connection satisfies the first condition, send a second message to the first terminal device, where the second message is used to indicate that the unicast connection is faulty, or the second message includes fifth indication information, and the fifth indication information is used to indicate that the unicast connection is faulty.

In a possible implementation, the first condition includes one or any combination of the following:

a measurement result of a CSI reference signal transmitted over the unicast connection on the sidelink is less than a CSI measurement threshold;

a measurement result of a CBR of a resource configured for the sidelink is greater than a CBR measurement threshold;

a quantity of retransmissions of a data packet transmitted over the unicast connection on the sidelink at an RLC layer is greater than or equal to a first quantity of retransmissions;

a quantity of retransmissions of a data packet transmitted over the unicast connection on the sidelink at a MAC layer is greater than or equal to a second quantity of retransmissions;

a quantity of times that a quantity of retransmissions of a data packet transmitted over the unicast connection on the sidelink at a MAC layer is greater than or equal to a second quantity of retransmissions is greater than or equal to a third quantity of times;

a result of an integrity check performed on a data packet transmitted over the unicast connection on the sidelink indicates that the check fails;

a decryption result of a data packet transmitted over the unicast connection on the sidelink indicates that the decryption fails;

out-of-synchronization information of the unicast connection on the sidelink indicates that the first terminal device and the second terminal device are out of synchronization;

a QoS parameter of the unicast connection on the sidelink does not satisfy a value condition of the QoS parameter; or no unicast connection has been established to the first terminal device by using a source layer-2 identifier that is carried when a data packet is transmitted over the unicast connection on the sidelink.

In a possible implementation, the second message further includes sixth indication information, and the sixth indication information is used to indicate the unicast connection.

In a possible implementation, the first condition includes one or any combination of the following: the measurement result of the CSI is less than the CSI measurement threshold, the measurement result of the CBR is greater than the CBR measurement threshold, the quantity of retransmissions at the RLC layer is greater than or equal to the first quantity of retransmissions, the quantity of retransmissions at the MAC layer is greater than or equal to the second quantity of retransmissions, the quantity of times that the quantity of retransmissions of the data packet transmitted over the unicast connection on the sidelink at the MAC layer is greater than or equal to the second quantity of retransmissions is greater than or equal to the third quantity of times, or the QoS parameter does not satisfy the value condition of the QoS parameter; and the second message further includes seventh indication information, and the seventh indication information is used to indicate a resource used by the unicast connection.

In a possible implementation, the second message further includes eighth indication information, and the eighth indication information includes the first condition satisfied by the unicast connection.

In a possible implementation, the transceiver module is configured to send the second message to the first terminal device in the following manners: sending the second message to the first terminal device through an SRB, where the SRB has a dedicated sending resource; sending the second message to the first terminal device by using a resource used to specially process the unicast connection fault; or sending the second message to the first terminal device through second upper layer signaling.

In a possible implementation, the transceiver module is further configured to: stop sending a data packet over the unicast connection, and continue receiving a data packet over the unicast connection.

In a possible implementation, the transceiver module is further configured to receive second configuration information from the first terminal device, where the second configuration information is used to recover the unicast connection.

In a possible implementation, the transceiver module is configured to receive the second configuration information from the first terminal device in the following manners: receiving the second configuration information from the first terminal device through an SRB, where the SRB has a dedicated sending resource; receiving the second configuration information from the first terminal device by using a resource used to specially process the unicast connection fault; or receiving the second configuration information from the first terminal device through first upper layer signaling.

In a possible implementation, the processing module is further configured to: update a configuration of the unicast connection to a default configuration; and negotiate a new configuration of the unicast connection with the first terminal device by applying the unicast connection having the default configuration.

All related content of the steps in the foregoing method embodiments may be cited in function descriptions of a corresponding function module, and details are not described herein again.

The communications apparatus 900, the communications apparatus 1000, the communications apparatus 1100, and the communications apparatus 1200 provided in the embodiments of this application may be configured to perform the method provided in the embodiment shown in FIG. 4 or in the embodiment shown in FIG. 8. Therefore, for a technical effect that can be achieved by the method, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (solid state disk, SSD)), or the like.

It is clear that a person skilled in the art can make various modifications and variations to the embodiments of this application without departing from the spirit and scope of this application. In this case, this application is intended to cover these modifications and variations in the embodiments of this application, provided that they fall within the scope of the following claims and their equivalent technologies.

What is claimed is:

1. A method applied for a first terminal device, comprising:
monitoring a parameter of a sidelink between the first terminal device and a second terminal device, to determine whether a unicast connection on the sidelink satisfies a first condition; and
when the unicast connection satisfies the first condition, determining, by the first terminal device, that the unicast connection is faulty; and wherein
notification information is transmitted from an access stratum (AS) of the first terminal device to an upper layer of the first terminal device, the notification information indicating that the sidelink is unavailable.

2. The method according to claim 1, wherein the first condition comprises:
a quantity of retransmissions of a data packet transmitted over the unicast connection on the sidelink at a radio link control (RLC) layer is greater than or equal to a first quantity of retransmissions.

3. The method according to claim 2, wherein the method further comprises:
sending a first message to a network device, wherein the first message comprises first indication information, and the first indication information indicates that the unicast connection is faulty.

4. The method according to claim 3, wherein the first message further comprises second indication information, and the second indication information indicates the unicast connection.

5. An apparatus, applied for a first terminal device, comprising:
at least one processor, and a non-transitory memory storing instructions for execution by the at least one processor; and
wherein, when executed, the instructions cause the apparatus to perform operations comprising:
monitoring a parameter of a sidelink between the apparatus and a second terminal device, to determine whether a unicast connection on the sidelink satisfies a first condition; and
when the unicast connection satisfies the first condition, determining that the unicast connection is faulty; and wherein notification information is transmitted from an access stratum (AS) of the first terminal device to an upper layer of the first terminal device, the notification information indicating that the sidelink is unavailable.

6. The apparatus according to claim 5, wherein the first condition comprises:
a quantity of retransmissions of a data packet transmitted over the unicast connection on the sidelink at a radio link control (RLC) layer is greater than or equal to a first quantity of retransmissions.

7. The apparatus according to claim 6, wherein the operations further comprises:
sending a first message to a network device, wherein the first message comprises first indication information, and the first indication information indicates that the unicast connection is faulty.

8. The apparatus according to claim 7, wherein the first message further comprises second indication information, and the second indication information indicates the unicast connection.

9. A system, comprising a first terminal device and a second terminal device, wherein, the first terminal device is configured to monitor a parameter of a sidelink between the first terminal device and the second terminal device to determine whether a unicast connection on the sidelink satisfies a first condition; and
when the unicast connection satisfies the first condition, the first terminal device is configured to determine that the unicast connection is faulty, an access stratum (AS) of the first terminal device is configured to send notification information to an upper layer of the first terminal device, the notification information indicating that the sidelink is unavailable.

10. The system according to claim 9, wherein the first condition comprises:
a quantity of retransmissions of a data packet transmitted over the unicast connection on the sidelink at a radio link control (RLC) layer is greater than or equal to a first quantity of retransmissions.

11. The system according to claim 10, wherein the system further comprises a network device, the network device is configured to receive a first message, wherein the first message comprises first indication information, and the first indication information indicates that the unicast connection is faulty.

12. The system according to claim 11, wherein the first message further comprises second indication information, and the second indication information indicates the unicast connection.

* * * * *

UNITED STATES PATENT AND TRADEMARK OFFICE
CERTIFICATE OF CORRECTION

PATENT NO. : 11,750,442 B2
APPLICATION NO. : 17/345836
DATED : September 5, 2023
INVENTOR(S) : Peng et al.

Page 1 of 1

It is certified that error appears in the above-identified patent and that said Letters Patent is hereby corrected as shown below:

In the Specification

In Column 29, Line 12, delete "Byway" and insert -- By way --.

Signed and Sealed this
Fifth Day of December, 2023

Katherine Kelly Vidal
*Director of the United States Patent and Trademark Office*